United States Patent [19]
Lynch et al.

[11] Patent Number: 6,002,854
[45] Date of Patent: *Dec. 14, 1999

[54] METHOD AND APPARATUS FOR CONFIGURING SYSTEMS

[75] Inventors: John Lynch; David Franke, both of Austin, Tex.

[73] Assignee: Trilogy Developmetn Group, Inc., Austin, Tex.

[*] Notice: This patent is subject to a terminal disclaimer.

[21] Appl. No.: 08/815,399

[22] Filed: Mar. 10, 1997

Related U.S. Application Data

[63] Continuation of application No. 08/484,947, Jun. 7, 1995, which is a continuation of application No. 08/039,949, Mar. 29, 1993, Pat. No. 5,515,524.

[51] Int. Cl.⁶ ........................................................ G06F 9/455
[52] U.S. Cl. ................................. 395/500.01; 395/500.23; 395/500.27; 395/500.34
[58] Field of Search ................................. 395/500, 800.15

[56] References Cited

U.S. PATENT DOCUMENTS

| | | | |
|---|---|---|---|
| 4,591,983 | 5/1986 | Bennett et al. | 364/403 |
| 4,870,591 | 9/1989 | Cicciarelli et al. | 395/468 |
| 5,220,654 | 6/1993 | Benaon et al. | 395/800.15 |
| 5,226,160 | 7/1993 | Waldron | 395/650 |
| 5,257,387 | 10/1993 | Richek et al. | 395/800.15 |
| 5,604,892 | 2/1997 | Nutall et al. | 395/500 |

Primary Examiner—Kevin J. Teska
Assistant Examiner—Samuel Broda
Attorney, Agent, or Firm—Hecker & Harriman

[57] ABSTRACT

The present invention employs a generative approach for configuring systems such that a system may be configured based on component or resource requests, or input in the form of need. The present invention provides a constraint-based configuration system using a structural model hierarchy. The structural aspects of the model provide the ability to define a model element as being contained in, or by, another model element. In addition, the structural model provides the ability to identify logical datatype and physical interconnections between elements and establish connections between elements. To configure a system, the present invention accepts input in the form of requests (e.g., component or resource) or needs, such as an expression of a need for a desktop computer system to be used in a CAD (i.e., computer-aided design) environment. Using this information, the present invention configures a system by identifying the resource and component needs, constraints imposed on or by the resources or components identified, and the structural aspects of the system.

54 Claims, 24 Drawing Sheets

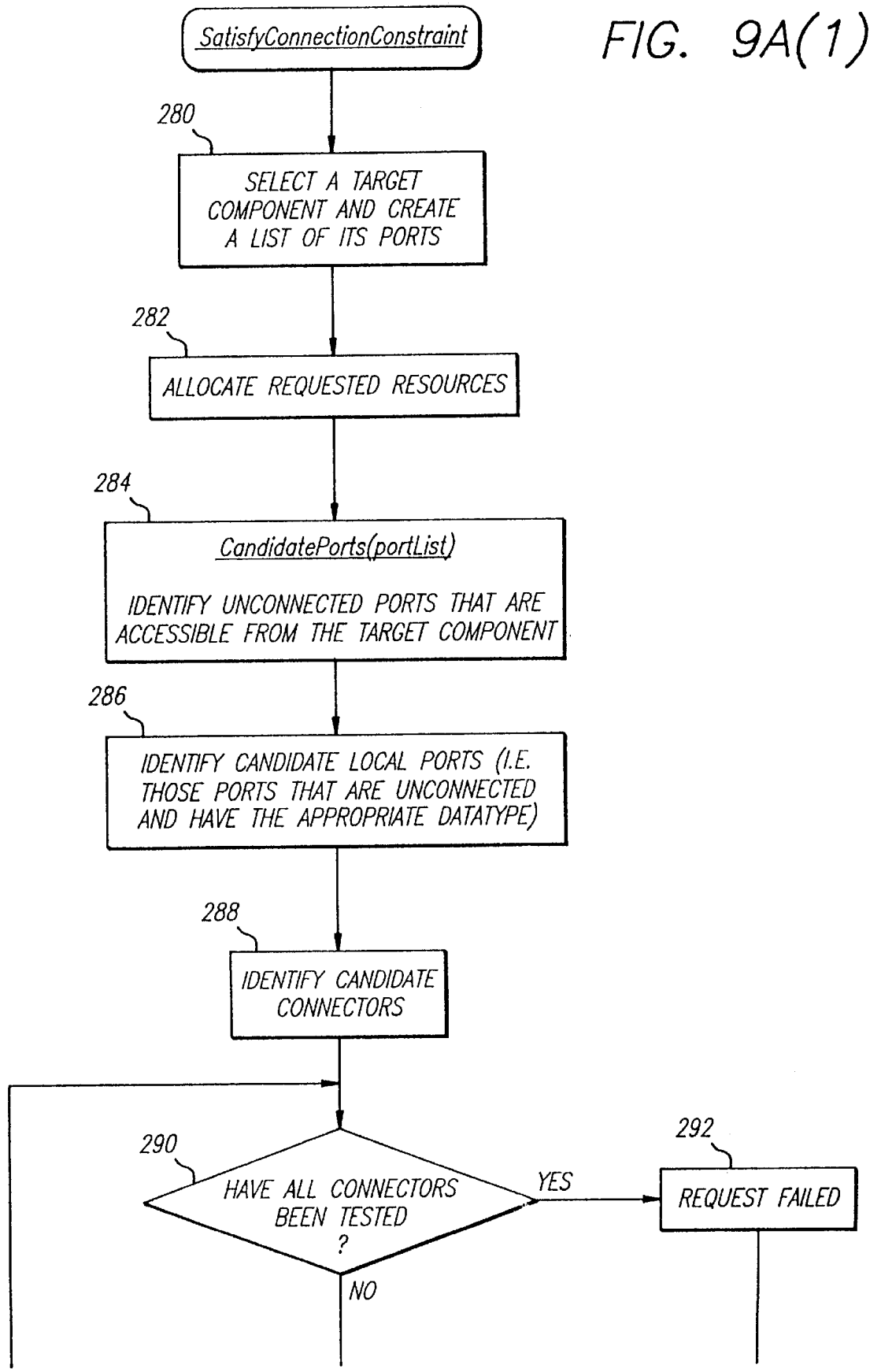
FIG. 9A(1)

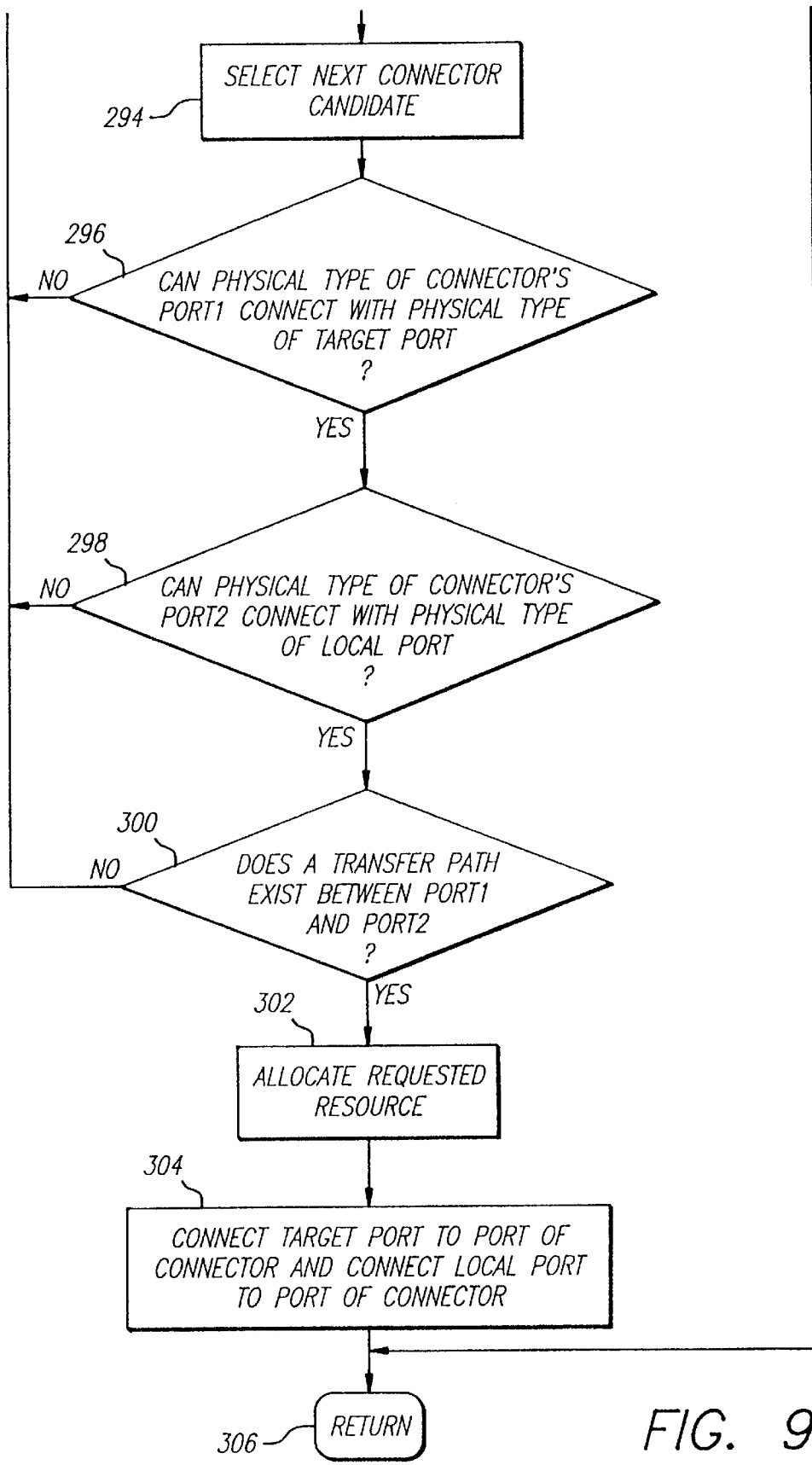
FIG. 9A(2)

METHOD AND APPARATUS FOR CONFIGURING SYSTEMS

This is a continuation of application Ser. No. 08/484,947, filed Jun. 7, 1995, which is a continuation of 08/039,949 filed Mar. 29, 1993 issued as U.S. Pat. No. 5,515,524 on May 7, 1996.

BACKGROUND OF THE INVENTION

1. Field of the Invention

This invention relates to the field of computer-based system configuration.

2. Background Art

Configuring a system refers to the process of selecting and connecting components to satisfy a particular need or request. If a system is based on a limited number of components, the process of configuring the system can be relatively straightforward. For example, the purchase of an automobile requires a salesperson to configure a system (automobile and assorted options) to satisfy a customer's request. After selecting from a plurality of models, the salesperson completes the transaction by selecting options to configure and price an automobile. The configuring of such a simple system can be accomplished with a pencil and paper.

As system specifications become more customized and varied, configuration alternatives increase and the task of configuring a system becomes more complex. This increased complexity has resulted in a need for computer-based assistance with the configuration process. Early computer-based systems expand independently-generated configuration orders for systems into manufacturing orders. They do not address the actual need for computer-based tools prior to the order expansion. That is, they do not address the actual generation of a system configuration based on needs and/or request input.

An example of a complex system is a desktop computer system. The available configuration alternatives of a computer system are numerous and varied, including alternatives available when choosing the microprocessor, motherboard, monitor, video controller, memory chips, power supply, storage devices, storage device controllers, modems, and software.

Configuring a desktop computer system requires that a selected component is compatible with the other components in the configured system. For example, a power supply must be sufficient to supply power to all of the components of the system. In addition, the monitor must be compatible with the video controller (e.g., resolution), and the storage device must be compatible with its controller (e.g., SCSI interface). A motherboard must have enough slots to handle all of the boards installed in the system.

The physical constraints of the cabinet that houses the system's components are also considered. The cabinet has a fixed number of bays available for storage devices (e.g., floppy disk drives, hard disk drives, or tape backup units). These bays have additional attributes that further define their use. For example, the bay may be located in the front of the cabinet and provide access from the front of the cabinet. Another bay may be located behind the front-accessible bays, and be limited to devices that do not need to be accessed (e.g., hard disk drive). Bays may be full-height or half-height. Before a storage device can be added to the configuration, a configuration system must identify a bay into which the storage device will be housed. This requires that at least the accessibility and height of the storage device must be examined to determine compatibility with an available cabinet bay.

The connection between a storage device and its controller must be determined based on the location of each. The cable that connects the storage device and its controller must provide compatible physical interfaces (e.g., 24-pin male to a 24-pin female).

A method of establishing a communication pathway in a computer system is known as daisy chaining. Daisy chaining provides the ability to interconnect components such that the signal passes through one component to the next. Determining whether a daisy chain may be established requires that the available logical (e.g., IDE or SCSI) and physical interfaces (e.g., 24-pin) of all elements in a daisy chain be known. In addition, it is important to know whether conversions from the source datatype to the destination datatype are allowed. When a daisy chaining candidate is added to the system, the interconnections and conversions between existing components may be checked to determine whether the new component should be an element of the daisy chain.

The power supply and storage device component examples illustrate the need to define the structural interrelationships between components (i.e., physical and spatial relationships). To further illustrate this notion, consider placing components requiring electrical power such as computer, telecommunication, medical or consumer electronic components into two cabinets. Further, each cabinet has an associated power supply that supplies electrical power to the components inside the associated cabinet. To account for electrical power consumption and the requirement that no power supply is overloaded, the model must comprehend the specific cabinet in which each component is placed and update the consumed power for each cabinet. While the total power available in the two cabinets may be sufficient for all of the components to be placed in both of the cabinet, a component cannot be included in a cabinet if its inclusion would cause the cabinet's power supply to overload. Therefore, the physical placement of the component in a cabinet must be known to make a determination if the subsequent placement of a component is valid. Similarly, any physical connections between these components must be taken into account. Each component's position in the structural hierarchy is used to determine minimal or optimal lengths for the connecting components.

Early computer-based configuration systems employed an approach referred to as the rule-based approach. Rule-based configuration systems define rules (i.e., "if A, then B" to validate a selection of configuration alternatives. Digital Equipment Corporation's system, called R1/SCON (described in McDermott, John, "R1: A Rule-Based Configurer of Computer Systems", *Artificial Intelligence* 19, (1982), pp. 39–88) is an example of a rule-based configuration system. R1/SCON evaluates an existing independently-generated system order and identifies any required modifications to the system to satisfy the model's configuration rules. The rules used to perform the configuration and validation processes are numerous, interwoven, and interdependent. Before any modification can be made to these rules, the spider's web created by these rules must be understood. Any changes to these rules must be made by an individual that is experienced and knowledgeable regarding the effect that any modifications will have to the entire set of rules. Therefore, it is difficult and time-consuming to maintain these rules.

A possible solution to the problems associated with rule-based systems is a constraint-based system. A constraint-based system places constraints on the use of a component in a configuration. For example, a hard disk drive cannot be added to the configuration unless a compatible storage device controller is available for use by the request storage device. The requirement of a controller is a "constraint" on the hard disk drive.

While existing constraint-based systems address some of the shortcomings of rule-based systems, they do not provide a complete configuration tool. Pure constraint-solving systems do not employ a generative approach to configuration (i.e., they do not generate a system configuration based on needs, component requests, and/or resource requests). Existing constraint-based systems use a functional hierarchy that does not address structural aspects associated with the physical placement of a component in a configuration (e.g., memory chip on motherboard or memory expansion board, storage device in cabinet bay, or controller in motherboard slot).

Bennett et al., U.S. Letters Pat. No. 4,591,983 provides an example of a constraint-based system that employs a recognition or verification approach to system configuration instead of a generative approach. That is, Bennett merely validates an independently-configured system. In essence, an order is generated by an independent source such as a salesperson, and Bennett is used to verify that the system contained in the order does not violate any constraints. Bennett does not generate a system configuration based on needs or component requests (i.e., a generative approach). Thus, Bennett does not provide the capability to interactively configure a system by interactively selecting its components.

A model consists of all of the elements that may be included in a configured system. In Bennett, the model elements are grouped into an aggregation hierarchy. An aggregation hierarchy creates hierarchical levels that represent a group of elements. Branches from one entry in the current level expand the entry, and the entry is "composed of" the elements in the lower level branches. For example, a desktop computer system is "composed of" a keyboard, a monitor, and a system box. A system box is "composed of" a power supply, motherboard, cards, and storage devices. The "composed of" relationship merely describes the elements that comprise another element. However, the "composed of" relationship does not define the structural relationships between the model elements. The "composed of" relationship does not describe the physical, structural relationships among the elements such as "physically contained inside," "physically subordinate part of," and "physically connected to." Using the desktop computer system previously described, it cannot be determined whether or not a monitor is "physically contained inside" a desktop computer system. A system box is "composed of" storage devices, however it cannot be determined whether one or more of the storage devices are "physically contained inside" the system box.

A functional hierarchy organizes the components of a model based on the purpose or function performed by the components in the model. Each entry in the hierarchy can be further broken down into more specific functional entries. Thus, an entry's parentage defines its functionality, and progression from one level to the next particularizes the functionality of a hierarchy entry.

As used in current configuration system, a functional hierarchy does not define the structural interrelationships or the physical and spatial interconnections among elements. A functional hierarchy cannot place a storage device in a cabinet bay, a controller card in a particular slot on the motherboard, or a memory chip in a slot on the memory expansion board.

FIG. 2 illustrates an example of a functional hierarchy. HardwareComponent 30 is the root element of the hierarchy. The next level below HardwareComponent 30 (i.e., the second level 49) identifies general functions in the model. For example, ROM 31, Processor Unit 31, Processor 32, Memory 34, Cage 35, Board 36, Connector 37, and Storage Device 38 all perform the function of Hardware Component 30 in addition to their own specialized functions. Processor 33 can be specialized to the function of a SpecialPurpose 40 or GeneralPurpose 41. SpecialPurpose 40 can be specialized to ArithmeticProcessor 51.

Referring to FIG. 2, it can be seen that a functional hierarchy does not provide the ability to define the structural aspects of the system. For example, there is no capability to determine the contents of Cage 35. The physical and spatial location of MotherBoardSlot 54 descending from Slot 46, in turn descending from Connector 37 cannot be determined from the functional hierarchy. There is no way of determining that MotherBoardSlot 54 is contained by the motherboard. It is not clear from the functional hierarchy definition whether ArithmeticProcessor 51 is located on the MotherBoard 44 or another model element. It cannot be determined whether MemoryChip 42 and ROM 31 are located on MotherBoard 44, MemoryBoard 52, or another model element.

A functional hierarchy does not provide the ability to define actual interconnections between configured instances or the data transfer. That is, that one component is connected to another with compatible logical datatypes (e.g., serial interface) and compatible physical interconnections (e.g., 24 pin). A functional hierarchy only defines the function that a component performs.

Because it does not define the actual connections between the components selected for a configuration, it cannot establish a daisy chain between configured components. Referring to FIG. 2, a functional hierarchy defines Connector 37, Storage Device Controller 53, Floppy Drive 48, and Hard Drive 49 as types of components. To conserve resources, a user may wish to configure a system such that an occurrence of Floppy Drive 48 is daisy chained to an occurrence of Storage Device Controller 53 through Hard Drive 49. However, the functional hierarchy can only reflect that fact that a configuration system may contain the functionality provided by Storage Device Controller 53, Hard Drive 49, and Floppy Drive 48. It cannot reflect the fact that an occurrence of Floppy Drive 48 is connected to an occurrence of Storage Device Controller 53 through an occurrence of Hard Drive 49.

Therefore, a functional hierarchy can not traverse a connection pathway to identify structural interrelationships among configured instances. Thus, a functional hierarchy cannot establish a daisy chain. Therefore, a functional hierarchy can not provide the ability to daisy chain components.

Another example of a constraint-based system using a functional hierarchy is provided in the following articles: Mittal and Frayman, "Towards a Generic Model of Configuration Task," in Proceedings of the Ninth IJCAI (IJCAI-89), pp. 1395–1401; and Frayman and Mittal, "COSSACK: A Constraints-Based Expert System for Configuration Tasks," in Sriram and Adey, *Knowledge-Based Expert Systems in Engineering: Planning and Design*, September 1987, pp. 143–66.

The Cossack system employs a functional hierarchy-based configuration system. According to Cossack, a system using a functional hierarchy must identify a configured system's required functions. Once the required functions are identified, Cossack must identify some particular components, or components, that are crucial, or key, to the implementation of these required functions. The Cossack representation does not make structure explicit. Further, Cossack does not provide mechanisms for reasoning about or with structural information. Therefore, Cossack cannot make any structure-based inferences. For example, the internal data transfer paths within components are not represented. Therefore, there is no ability to trace data transfer within a component, and no ability to establish a data connection with another element.

A configuration system, whether used to configure a computer system or other system, should provide a tool to interactively: define and maintain a model; define and maintain (i.e., upgrade) a configured system; generate marketing bundles; generate a graphic representation of the physical and spatial locations of the components of the configured system; use the graphic representation to modify or upgrade a configured system; and generate configuration reports (e.g., failed requests, quotations, and bill of materials). Such a system must define the components of a system, the structural relationships among the components (i.e., spatial and physical locations), the actual physical and spatial interconnections of the components, and the constraints imposed by each component.

SUMMARY OF THE INVENTION

The present invention employs a generative approach for configuring systems such that a system may be configured based on component or resource requests, or input in the form of need. The present invention provides a constraint-based configuration system using a functional hierarchy that comprehends hierarchical and non-hierarchical structure, and associated constraints that can reason about and generate structural relationships. The structural aspects of the model provide the ability to define a model element as being contained in, or by, another model element. In addition, the structural model provides the ability to identify logical datatype and physical interconnections between elements and establish connections between elements.

To configure a system, the present invention accepts input in the form of requests (e.g., component or resource) or needs, such as an expression of a need for a desktop computer system to be used in a CAD (i.e., computer-aided design) environment. Using this information, the present invention configures a system by identifying the resource and component needs, constraints imposed on or by the resources or components identified, and the structural aspects of the system.

The system configuration can be based on a general definition of a system (i.e., desktop computer system to operate in a CAD environment), or at any level of increased specificity (e.g., disk drive by manufacturer and model number). The system configuration can be based on specific component requests (e.g., laser printer), or by need (e.g., printing capability). Once the system is configured, the configured system can be bundled into products, and a quote can be generated. The bundling process may include the specification of heuristics to control the product-to-component mapping. For example, the product that covers the largest number of components can be selected over other possible product selections that cover a lesser amount of components.

The functional, structural hierarchy of the present invention provides the ability to define the structure of the configuration model and the systems configured from the model. The structural hierarchy includes a container structure. A container provides the ability to specify that one component is contained by, or in, another component. Thus, it is possible, for example, to identify that a component request for a disk drive cannot be satisfied because there are no empty cabinet bays in the cabinet specified to contain the component requested.

The structure hierarchy notion provides the ability to pool resources. Explicity representation of structure, specifically hierarchical structure, provides the ability to define and access inherited resources. For example, computer, telecommunication, medical, or consumer electronic components can be placed in a cabinet that provides power to those components. These individual components can inherit the electrical power resource from a structural superior (i.e., a hierarchical entry that resides one or more levels above the components in the model hierarchy). Further, the structural superior can pool resources and provide an homogeneous resource to its structural inferiors (i.e., a hierarchical entry that resides one or more levels below the structural superior in the model hierarchy). For example, a cabinet might contain more than one electrical power source, however, the resource is presented to structurally inferior components as a single resource pool. Thus, if a component requires a particular resource, this resource can be supplied by a resource pool. For example, if a desktop computer system's cabinet contains multiple power supplies, a disk drive component may draw from resource pool without any knowledge that the resource need is satisfied by multiple power sources.

In addition, the structural specification provides the ability to specify the connections between components of a configured system. As components are added to a configuration, the physical and logical interconnections that are required to assemble the system components may be verified. For example, before adding a printer with a serial logical connection and a 24 pin physical connection to the configuration, a serial port must be available in the configured system. In addition, a physical connection must be made between the printer and a serial port. If the serial port is a 9-pin female physical connection and the printer has a 24-pin female connection, a cable must be available to physically connect the printer and the serial port. In addition, the actual connection is created in the configuration and can be examined in subsequent connection processing. Connection processing provided the ability to identify any criteria for satisfying a connection request. For example, connection criteria may include the cheapest, longest, or optimal throughput connection.

Connection processing may also be used to optimize the use of the configured system's resources. For example, a controller's resources can be optimized by daisy chaining other components together. By connecting one component to another via multiple intervening components, multiple components may be connected to a single component via a single port or connection.

In the present invention, a modeling language is used to define a model hierarchy. The model hierarchy is structural and functional. The modeling language provides the ability to define a Product Base that may be grouped into Product Lines. The structural hierarchy model includes the Component, Composite, Container, Port, and Connector base classes. These base classes may branch into derived classes (i.e., system-specific classes) and terminate at leaf-descendants. Leaf-descendants define the type of components in the functional, structural hierarchy model.

Attributes, datatypes, resources, and constraints further define the model.

A model language provides the format for defining the elements, the constraints placed on the elements, and the structure of the model. The model language may be used directly, or generated based on input from an interactive model maintenance system used to facilitate the creation and maintenance of the model.

The maintenance system graphically displays the model, and provides the interface for the selection of model elements to be updated. Once the desired updates have been made, the maintenance system provides the ability to test the new model, or verify that the new model can be successfully compiled.

Once a model has been successfully defined, the present invention provides the ability to configure a system using the functional, structural hierarchical model. An interactive interface provides the ability to express a configuration in terms of a model element (i.e., components request, resource request, and/or needs (i.e., requirements) request. A configuration engine is invoked to satisfy these requests.

The configuration engine accesses the Product Base to satisfy the requests in a defined priority. A request is processed by adding components to the configuration, or identifying existing components that can satisfy the request. Further, the interconnections, data transfer pathways, and dynamically-determined structural relationships are defined. When a request is successfully processed, the configuration modifications are "committed." Failed requests are reported.

A graphical depiction illustrates the configured system and its structural characteristics. The elements of the configured system are illustrated in terms of their physical and spatial location relative to other elements. Elements are contained in other elements, comprised of other elements, or connected to each other. This graphical depiction further provides an interface to modify and maintain elements of the configured system.

The configured system's elements are bundled into available marketing and manufacturing packages for system quotation and manufacturing purposes. The bundling process performs a product-component mapping based on product definitions.

BRIEF DESCRIPTION OF THE DRAWINGS

FIGS. 9A(1) and 9A(2) illustrate the SatisfyConnectionConstraint process flow.

DETAILED DESCRIPTION OF THE INVENTION

A method and apparatus for configuring systems is described. In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

The present invention provides a tool for configuring systems that has application to a wide range of domains including the following: computer hardware, computer software, computer networks, telecommunication systems (e.g., PBX and voice mail), copiers, medical imaging systems, vehicles (e.g., fire trucks and construction equipment), electronic control systems, buildings, modular furniture, manufacturing equipment, manufacturing systems, consumer electronic equipment, and electronic systems.

Figure 1:
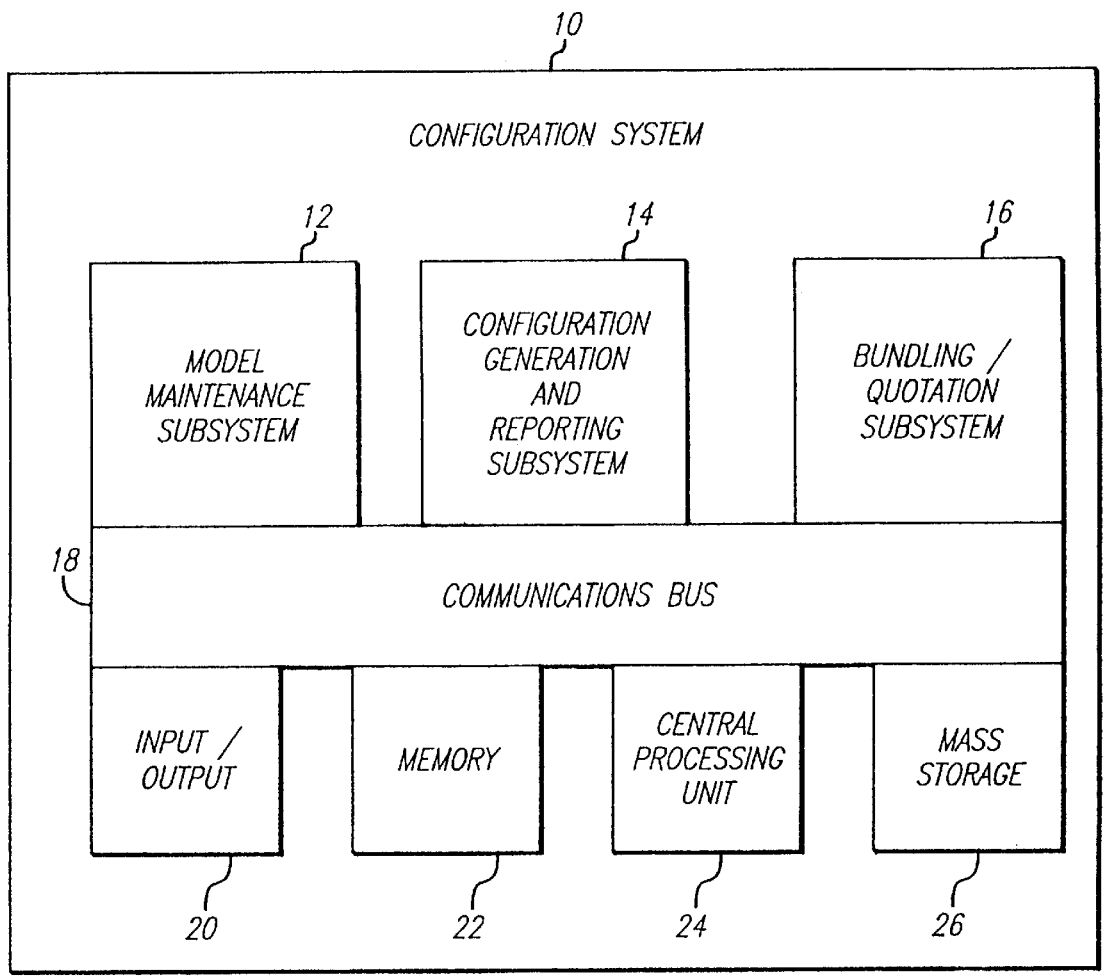
FIG. 1 is a block diagram of the configuration computer system.
Figure 2:
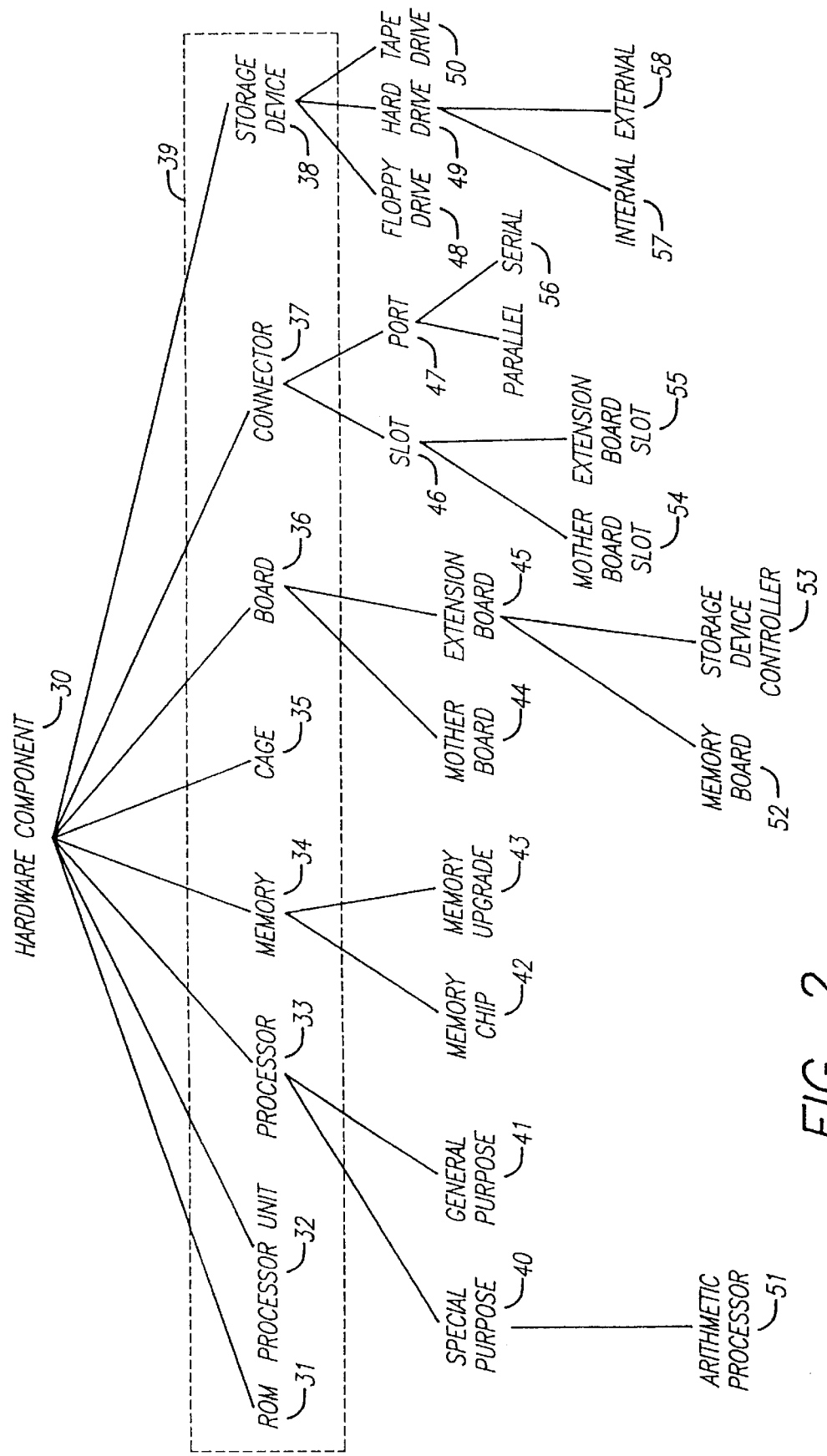
FIG. 2 illustrates a functional hierarchy.

FIG. 1 is block diagram of the configuration system of this invention. The configuration system 10 is comprised of the Model Maintenance Subsystem 12, the Configuration Generation and Reporting Subsystem 14, the Bundling/Quotation Subsystem, Communications Bus 18, Input/Output 20, Memory 22, Central Processing Unit 24, and Mass Storage 26.

Figure 12:
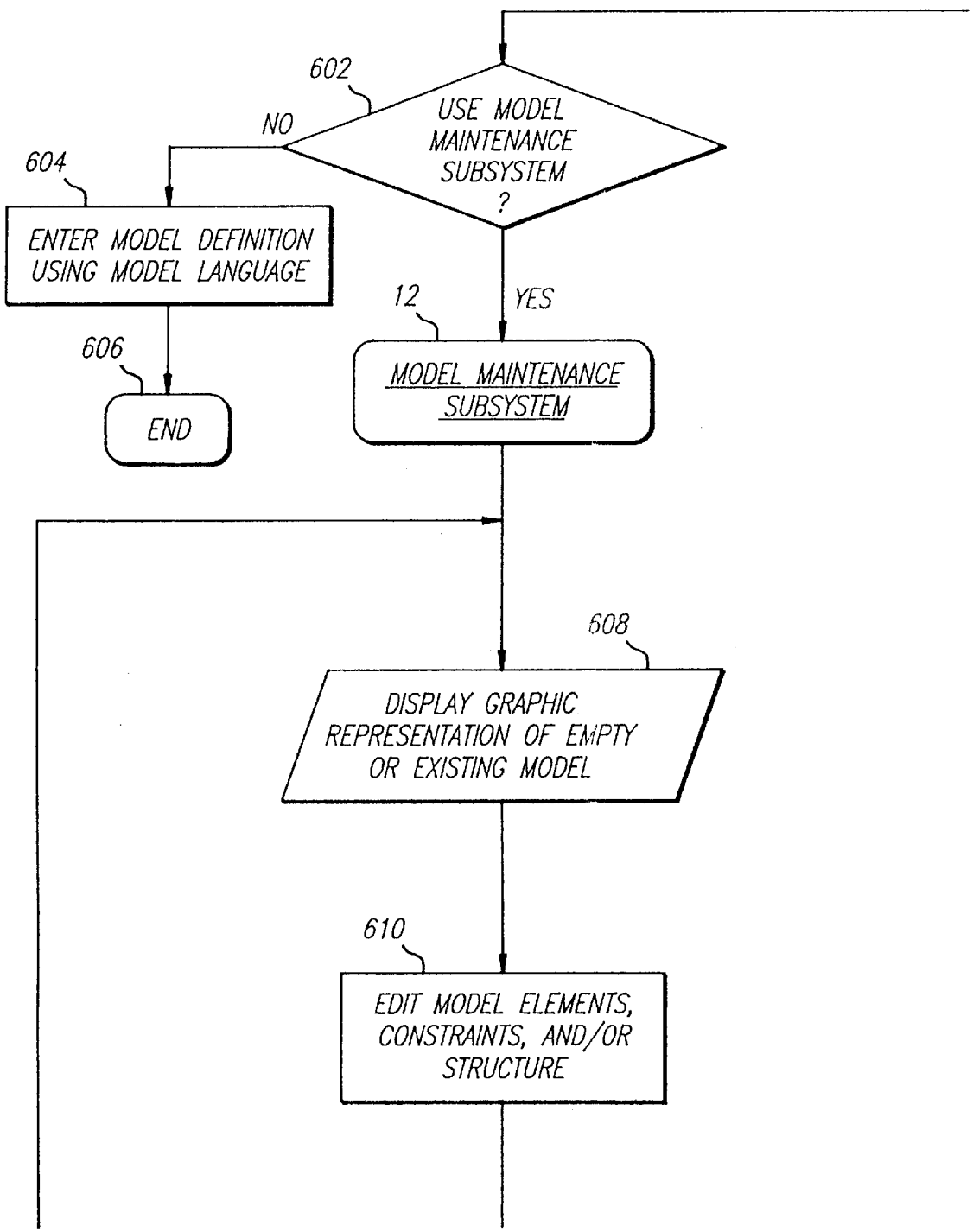
FIGS. 12(1), 12(2), 12(3), 12(4), and 12(5) are flow diagrams illustrating the functional operation of the Configuration System.
Figure 12:
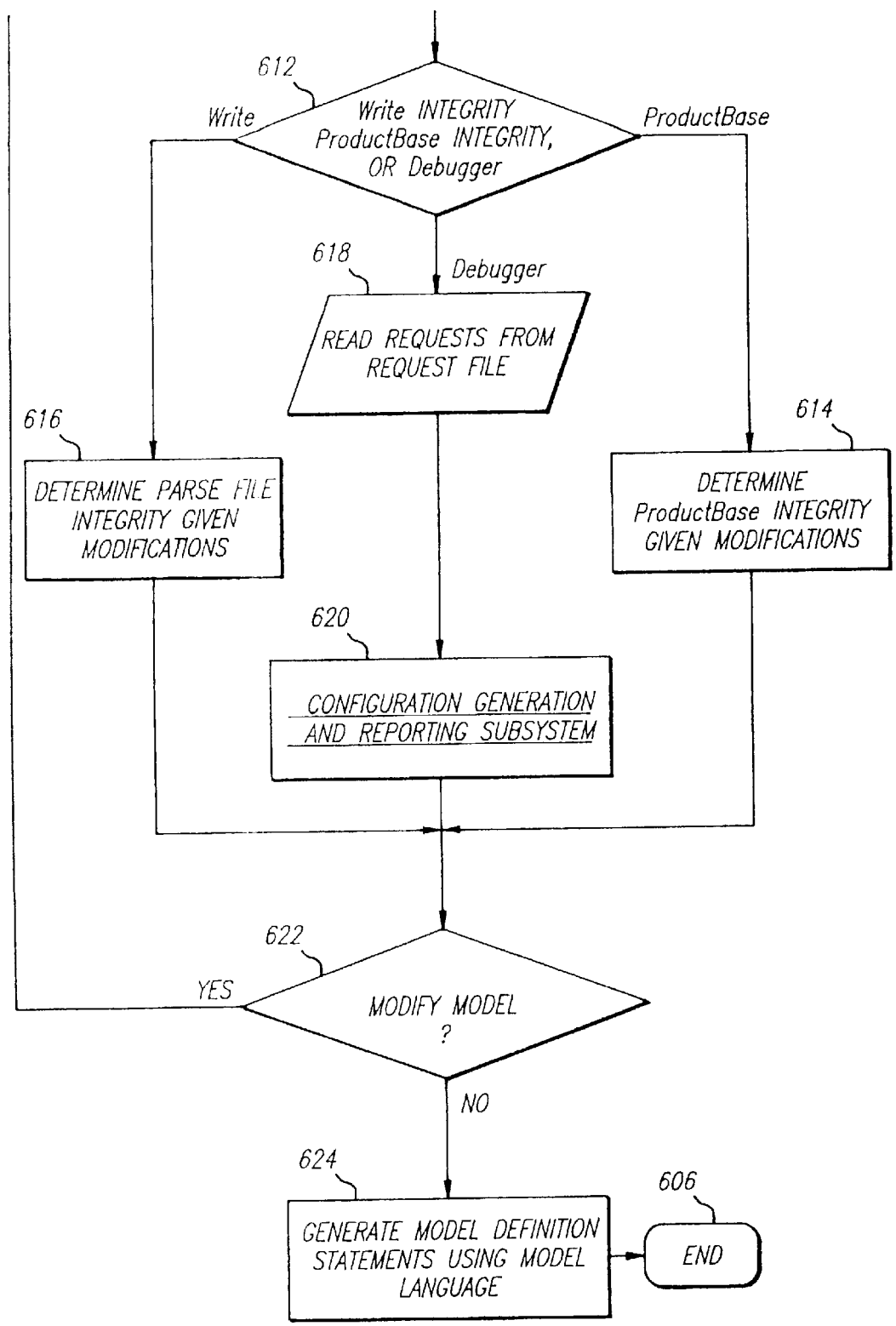
Figure 12:
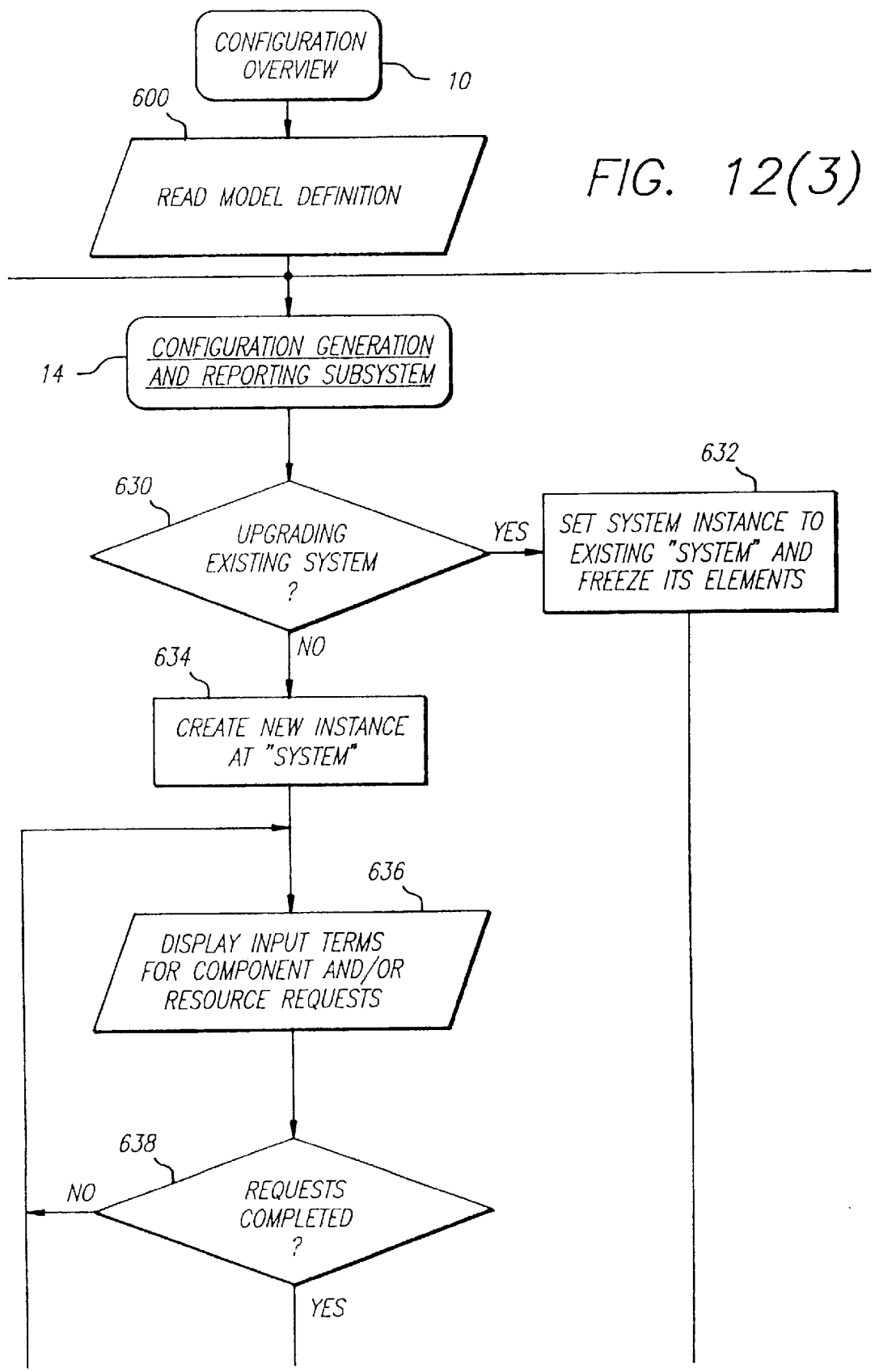
Figure 12:
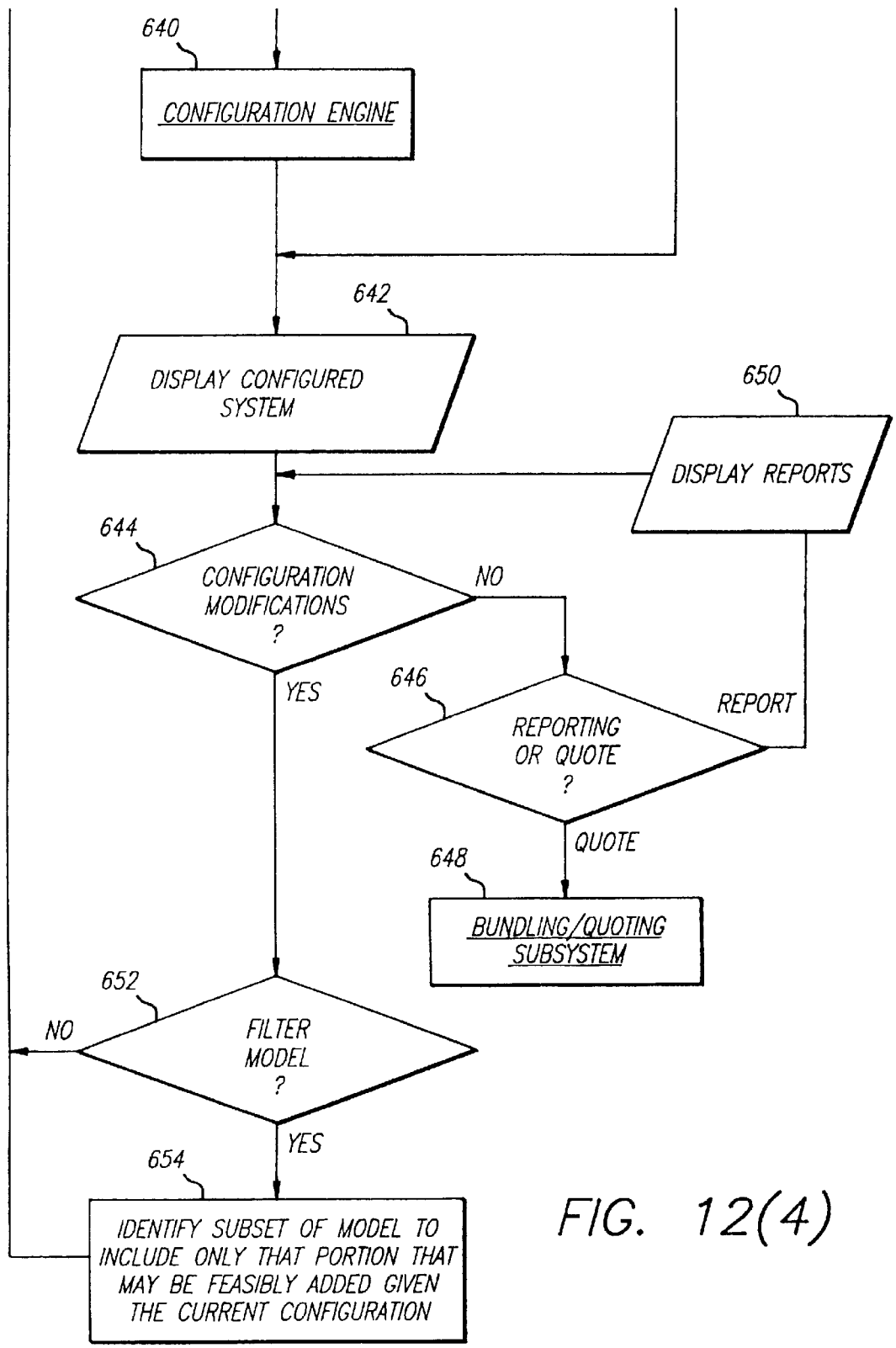
Figure 12:
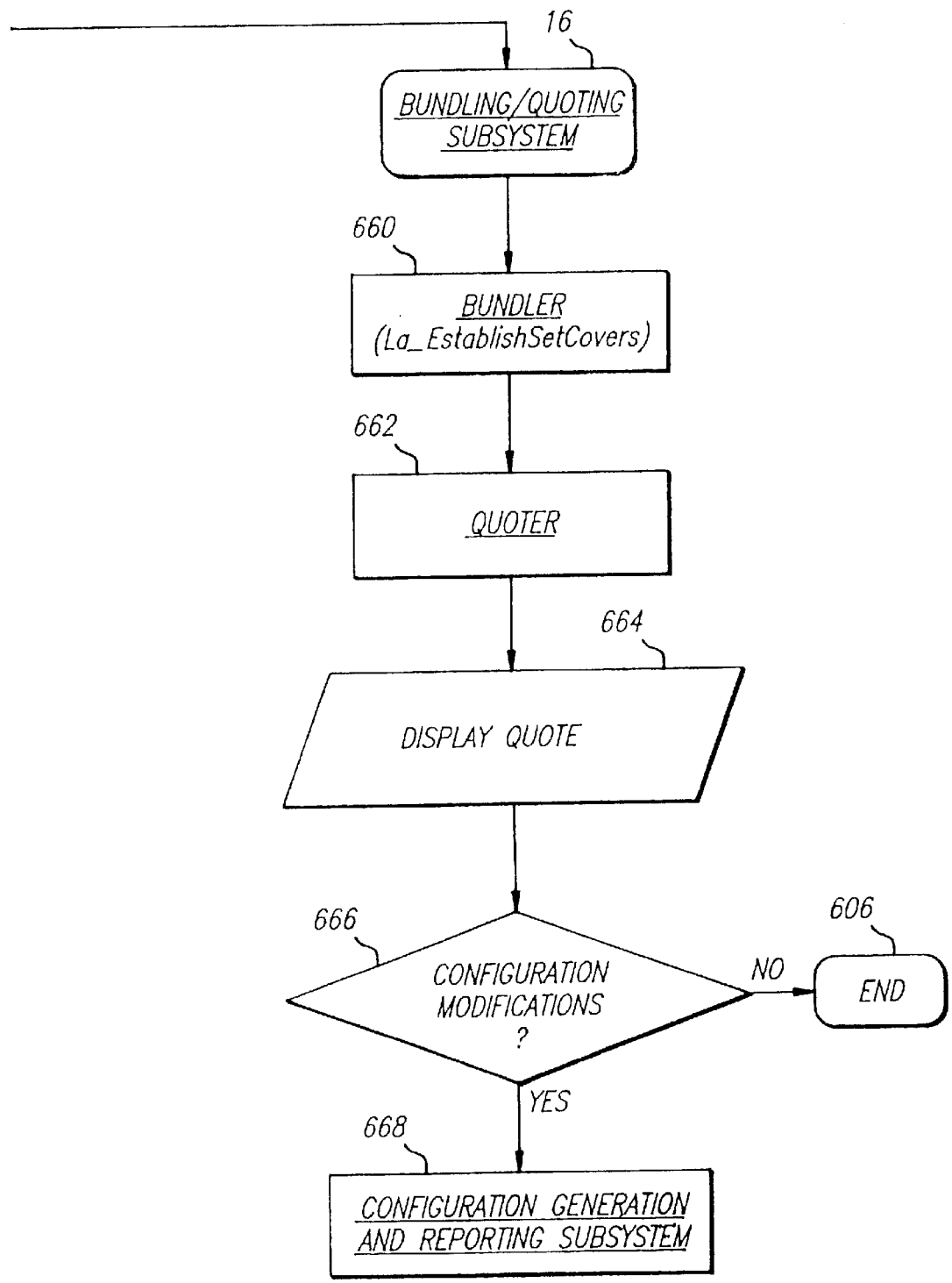

FIGS. 12(1), 12(2), 12(3), 12(4), and 12(5) are flow diagrams illustrating the functional operation of the Configuration System. At block 600, a model base is read. The Configuration System uses a model base that contains information about all of the elements available to configure a system (e.g., components and resources) This model base is referred to as a Product Base.

A model language is used to create the Product Base. The model language provides the syntax, or statements, used to define the model elements, the constraints placed on the model elements, and the structure of the model. At processing block 604, the model definition can be entered using the model language and model definition processing is ended at 606.

Model Maintenance—The process of defining a model can be facilitated if the Model Maintenance Subsystem is chosen at decision block 602 (i.e., "use Model Maintenance Subsystem?"). At block 608, the model, either new or existing, is displayed. At block 610, the model can be edited. The Model Maintenance Subsystem 12 provides the ability to test the validity of and debug the modified model at decision block 612 (i.e., "write integrity, ProductBase integrity, or Debugger?). A "write integrity" selection determines the integrity of the parse file (i.e., subsets of the Product Base) with the addition of the modifications. A "ProductBase integrity" selection determines the integrity of the Product Base with the addition of the modifications.

If the "Debugger" is chosen, benchmark system configuration requests are read from a file at block 618. At block 14, the Configuration Generation and Report System 14 is invoked to configure a system using the modified model and the benchmark configuration requests. A trace of the processing of these requests by the Configuration Generation and Reporting System 14 may be made to examine the configuration process.

If there are additional modifications to the model at decision block 622 (i.e., "modify model?"), a graphic representation of the model is displayed at 608, and the modification process continues at block 610. If there are no other modifications, the model definition is generated at block 624, and the Model Maintenance Subsystem ends at block 606.

Configuration and Reporting System—The Configuration and Reporting System 14 uses the model definition to generate a system configured according to the user-specified requests and needs. The resulting configuration is graphically depicted. Reports are generated to provide information regarding the configuration. If it is determined that an existing configuration is being upgraded at decision block 630 (i.e., "upgrading existing system?"), the existing system is read and its elements marked as existing in block 632. If a new system is being configured, a blank system instance is created at block 634. The forms used to input element requests or needs is displayed at 636. If input is not complete at decision block 638 (i.e., "requests completed?"), processing continues at block 636.

Configuration Engine—Once all of the request and need input is completed, ConfigurationEngine is invoked to generate a configured system based on the input at 640. A graphical representation of the configuration is displayed at 642. The configuration may be modified, reports may be generated, or the components of the configuration may be bundled and a quotation generated. If modifications are intended at decision block 644 (i.e., "configuration modification?"), processing continues at decision block 652 (i.e., "filter model?"). If a filtered model is chosen at decision block 652, a subset of the model is generated at block 654. The model subset includes those model elements that can be selected given the current configuration. Processing continues at 636 to display input forms. If a filtered model is not used, processing continues at 636.

After a system is configured, the elements of the configuration can be bundled into marketing, or manufacturing, products. Bundler 660 maps the configuration components to products. Quoter 662 generates a cost quotation for the configured system. At 664, the quotation is displayed. If there are no configuration modifications at decision block 666 (i.e., "configuration modification?"), processing ends at 606. If there are modifications to the configuration, the Configuration Generation and Reporting Subsystem 14 is invoked at block 668.

STRUCTURAL HIERARCHY

Figure 3:
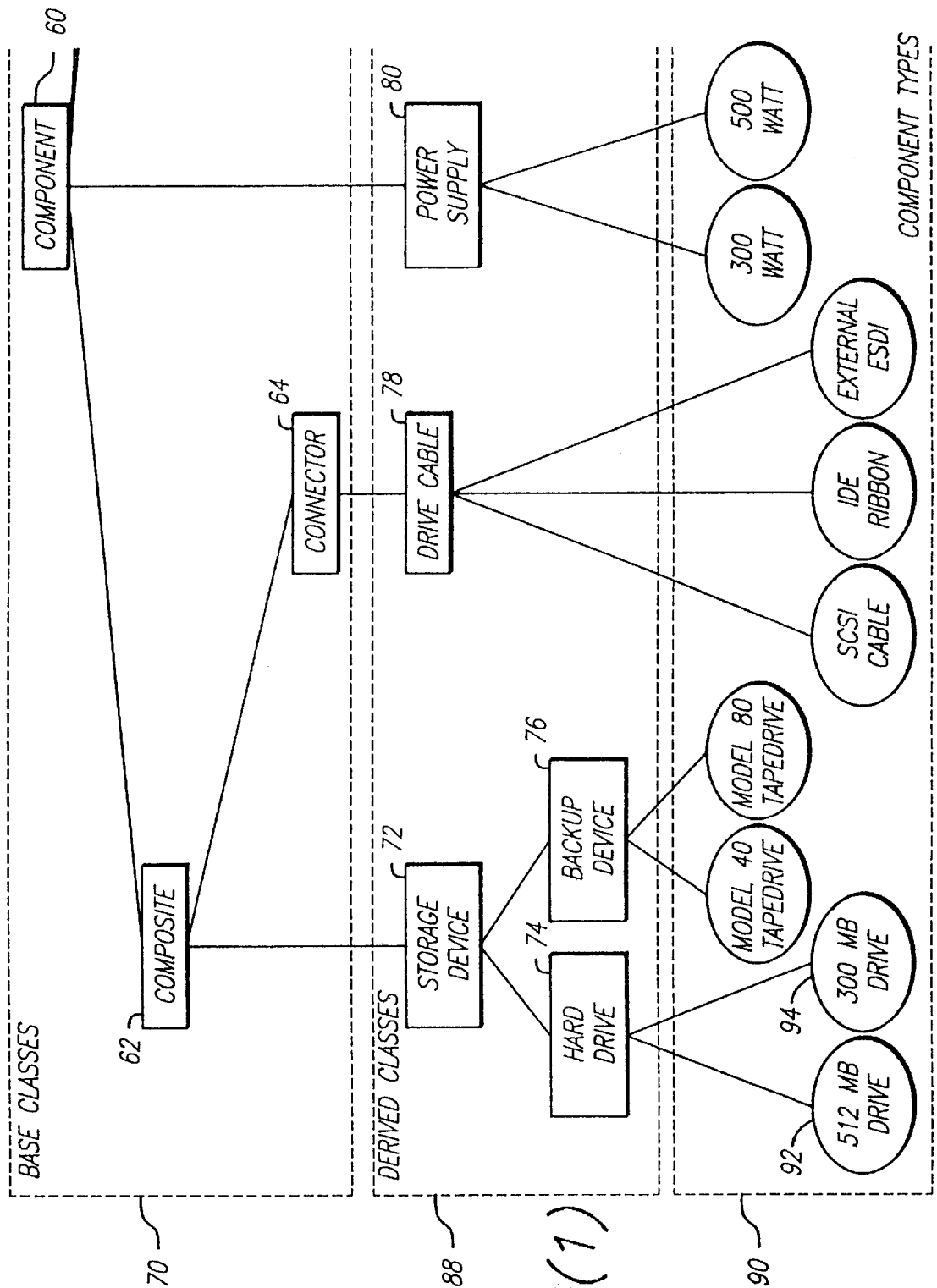
FIGS. 3(1) and 3(2) illustrate the functional, structural hierarchy comprised of the five base classes, derived classes, and component types.
Figure 3:
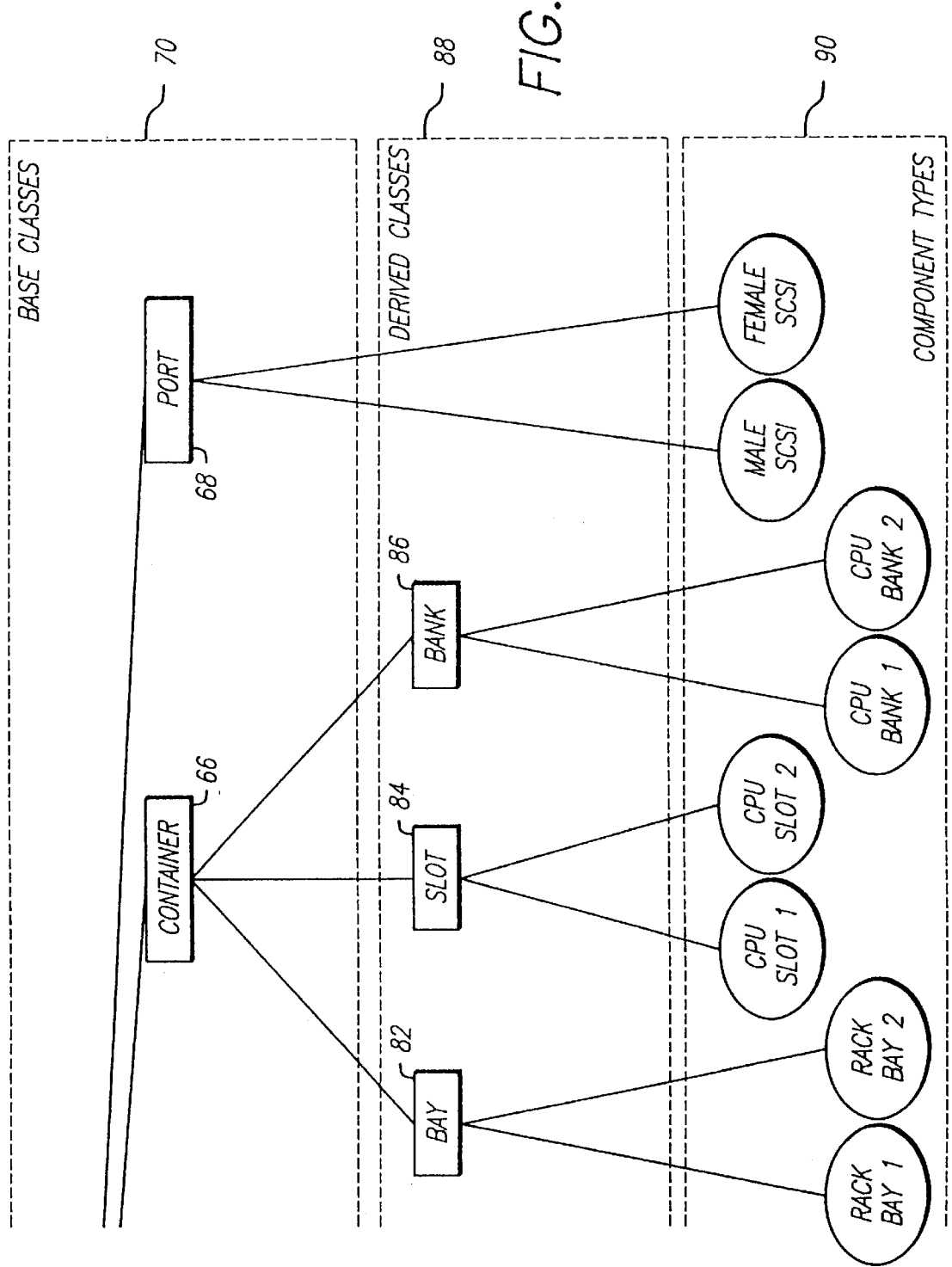

The Configuration System of the present invention is a constraint-based scheme using a functional, structural hierarchy. FIGS. 3(1) and 3(2) illustrate the functional, structural hierarchy and five intrinsic base classes. The functional, structural hierarchy contains a class hierarchy comprised of five intrinsic base classes 780 that define the basic types of model objects. These five base classes are: Component 60, Composite 62, Connector 64, Container 66, and Port 68. The component 62 is the base class from which all other classes and component types are derived. From Component 62, each branch of the hierarchical tree begins with an intrinsic base class and branches into system-specific classes called derived classes 88. Derived classes 88 are definitions of broad component categories, such as storage devices, power supplies, and peripheral cards. Multiple generations of derived classes can descent from the base classes. Each branch terminates with "leaf descendants," or Component Types 90. Component Types 90, represent actual components that can be instantiated and configured.

The Composite class 62 is a static structure (i.e., elements that have substructure). Elements in the class have, or are, subcomponents of a composition. The Connector class 64 branches from the Composite class 62. The class defines the model elements that connect elements. An element in the Container class 66 indicates that the element may contain other elements. Elements in the Port class 68 provide the port alternatives and define a port's datatype. Elements derived from the Port class 68 can be physically connected with other components derived from the Port class 68.

The present invention provides the ability to represent within a structural hierarchy how components of a particular system exists spatially and physically. Within the structural hierarchy, there are three type of substructures: composite hierarchies, container hierarchies, and port relationships. Composite hierarchies identify components as part of other components. For example, a chassis has eight card slots. Container hierarchies identify components as being contained in other components. A Container hierarchy is a dynamic structure in that the structure is dynamically created with a configuration is generated. For example, a CPU card is placed in slot 0 of the chassis). Port relationships identify components that connect to other components. A connection, or port, relationship is dynamically created when a configuration is generated. The relationships between generations within these substructures are expressed by the keywords "childOf," "containedBy," and "connectsWith."

The "childOf" keyword indicates that a component is part of a component that is descended from class Composite. The "containedBy" keyword indicates that a component is contained within a component that is descended from the Container base class. The "connectsWith" keyword indicates that a component connects to a component that is descended from the Port Class.

Container hierarchies typically exhibit an alternating relationship with Composite hierarchies. That is, a container is often a "childOf" a composite component, and the composite component is "containedBy" another container. Each substructure type has a root member that is also a descendant of the base class of the same name (i.e., Composite, Container, or Port). Members of a substructure can be of any class defined in the Class Hierarchy. For example, a component of class bay, descended from Container Class might contain a component of class storage-device (descended from Component Class) or of class card_chassis (descended from Container Class).

Figure 4:
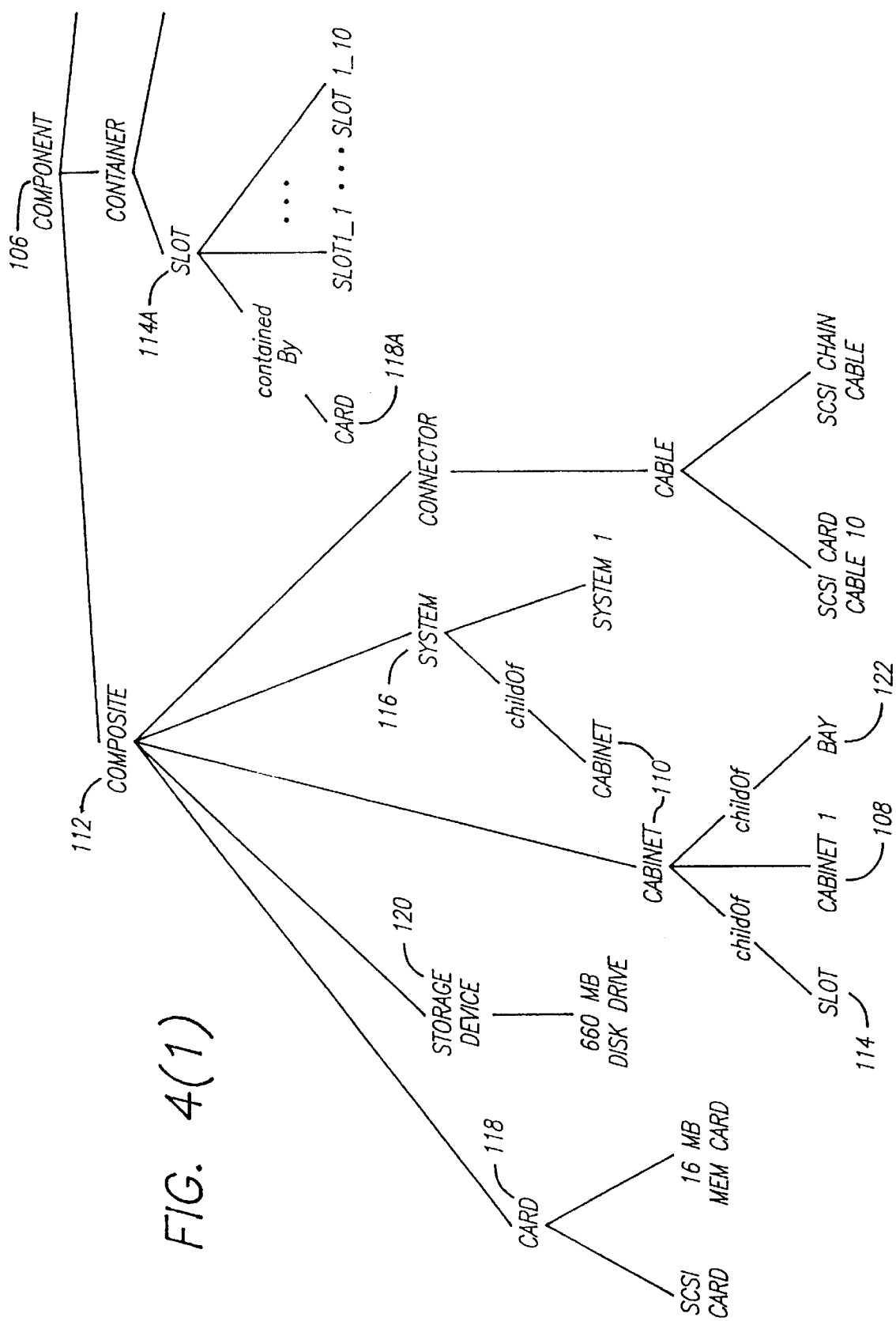
FIGS. 4(1) and 4(2) are the functional, structural hierarchy for a model to configure computer systems.
Figure 4:
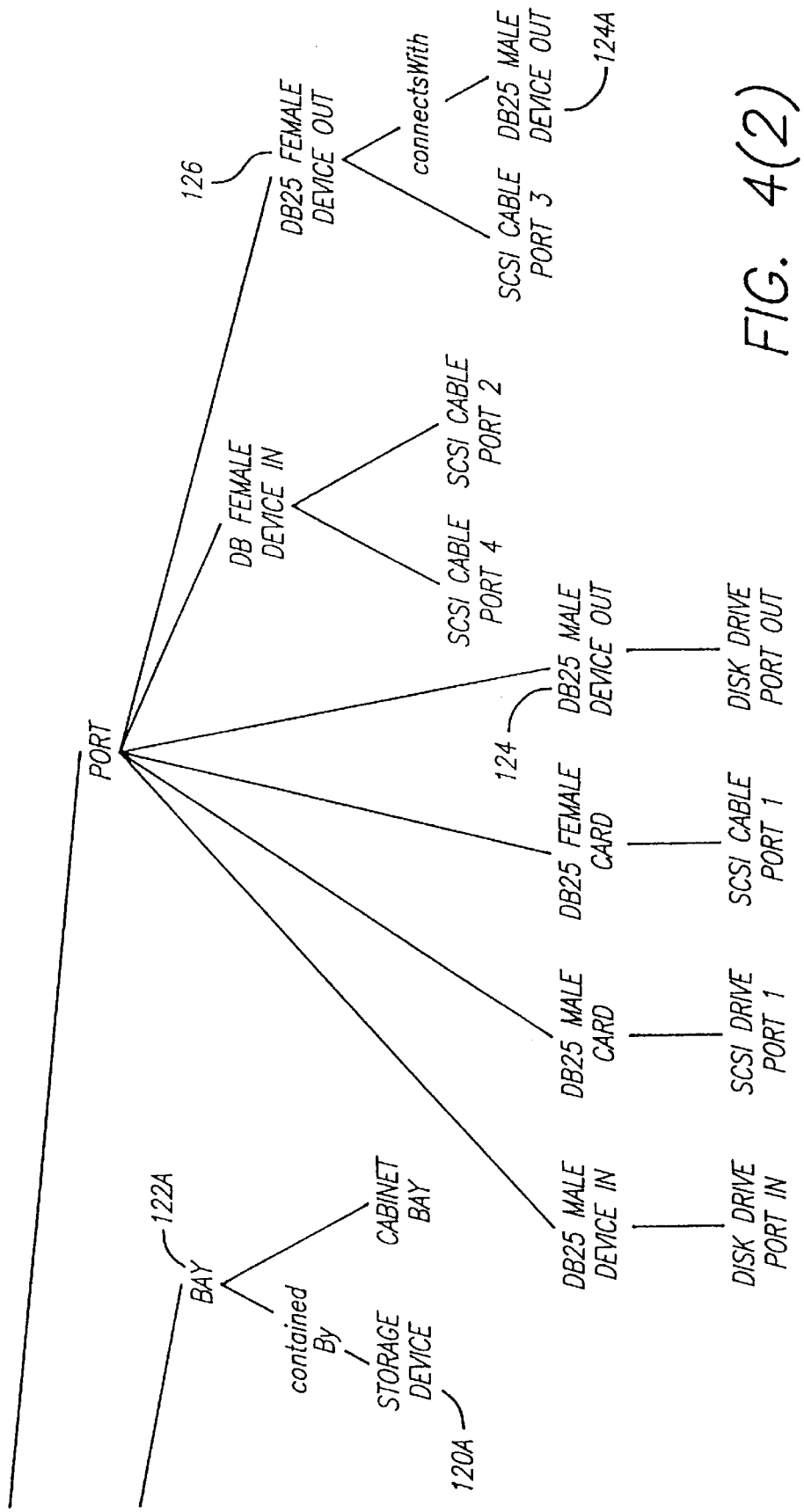

FIGS. 4(1) and 4(2) illustrate a structural hierarchy with the five base classes, derived classes, leaf descendants, the substructure relationships. The structural relationships further define the structural aspects of the model. For example, Slot 114 is a "childOf" Cabinet 110. Therefore, Slot 110 is a subcomponent of the composite component, Cabinet 110. Further, Cabinet 110 is a "ChildOf" System 116. Second occurrences of Card 118 (i.e., 118A) and Slot (i.e., 114A) illustrate the substructural relationship between Card and Slot. Card 118A is "containedBy" Slot 114A. Similarly, StorageDevice 120A is "containedBy" Bay 112A, and DB25MaleDeviceOut 124A "connectsWith" DB25FemaleDeviceOut 126.

The structural aspects of the present inventions's model provides the ability to inherit and pool resources. For example, a container component, Cabinet, may consist of a chasses and two one-hundred watt power supplies, A and B. Each of the elements within the chassis container consume, or require some amount of power. If the chassis component contains two central processing units (CPUs) that together consume one-hundred and ten watts (e.g., fifty-five watts each), random access memory that consumes seventy watts, and multiple cards (e.g., controllers) that consume a total of twenty watts, neighbor of the power supplies independent of the other could supply sufficient power to the chassis and its elements.

However, because the two power supplies are contained in, and are a part of, the Cabinet container, the two power supplies can be pooled together to supply the elements within Cabinet. Therefore, when the resource requisitions are being processed for the elements in this example, one or the other may be used to satisfy the request. In addition, it is possible to satisfy the resource need for any one of the elements by using both power supplies. For example, if one CPU's resource needs are processed first using fifty-five watts of power supply A, and the resource processing for RAM is processed next, the resource needs of the RAM maynot be satisfied by power supply A alone. However, it is possible to satisfy the RAM's resource needs by using 45 watts from power supply A and twenty-five from power supply B. Another resource that may use this resource pooling capability is a heat dissipation resource.

CONTAINERS

The structural hierarchy provides the ability to structure the model such that one model element, or group of model elements, may be contained by another. The use of the contained model element in a configuration will be constrained by the availability of a container model element in the configuration.

Figure 8:
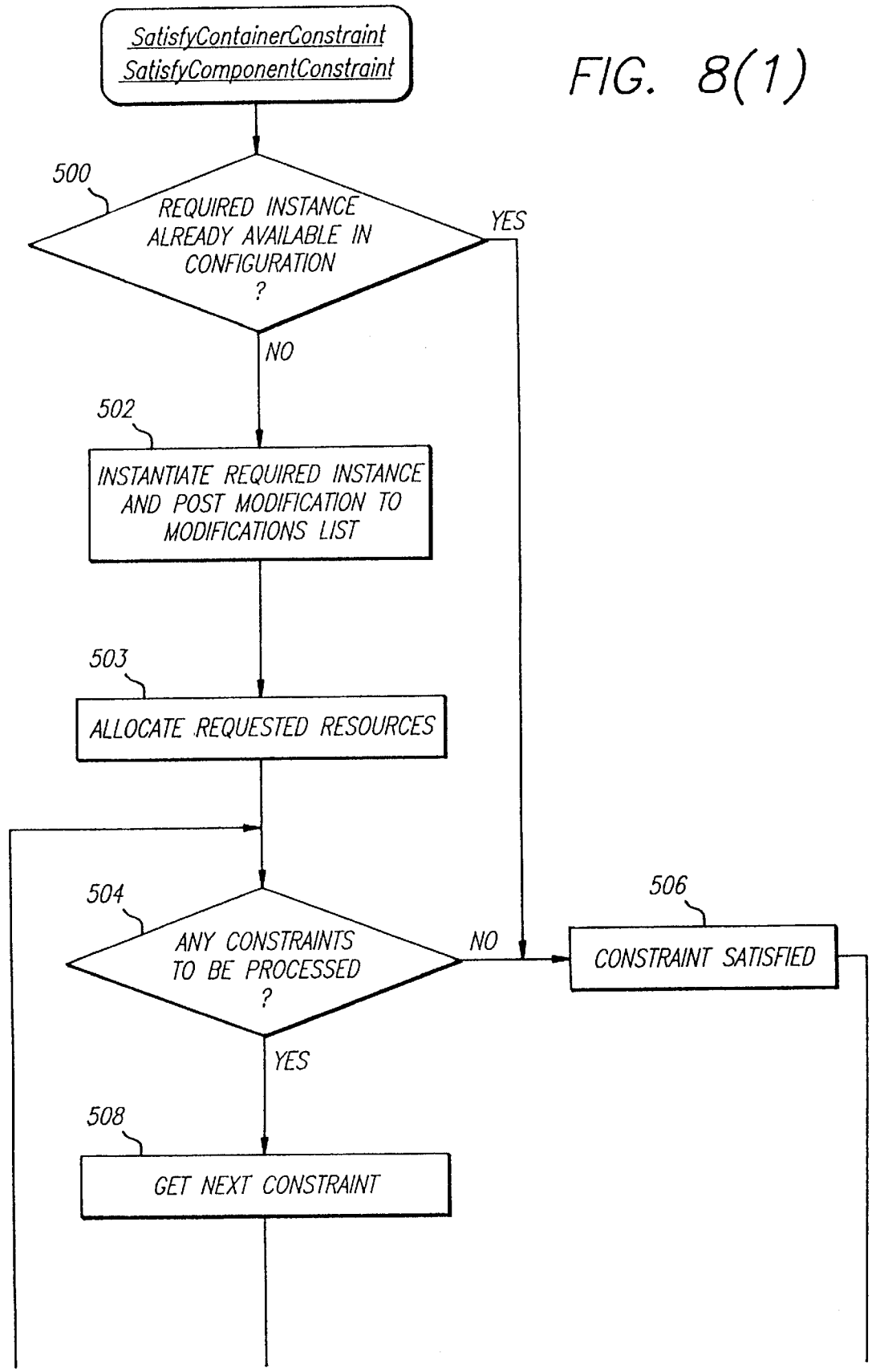
FIGS. 8(1) and 8(2) illustrate the SatisfyContainerConstraint and SatisfyComponentConstraint process flow.
Figure 8:
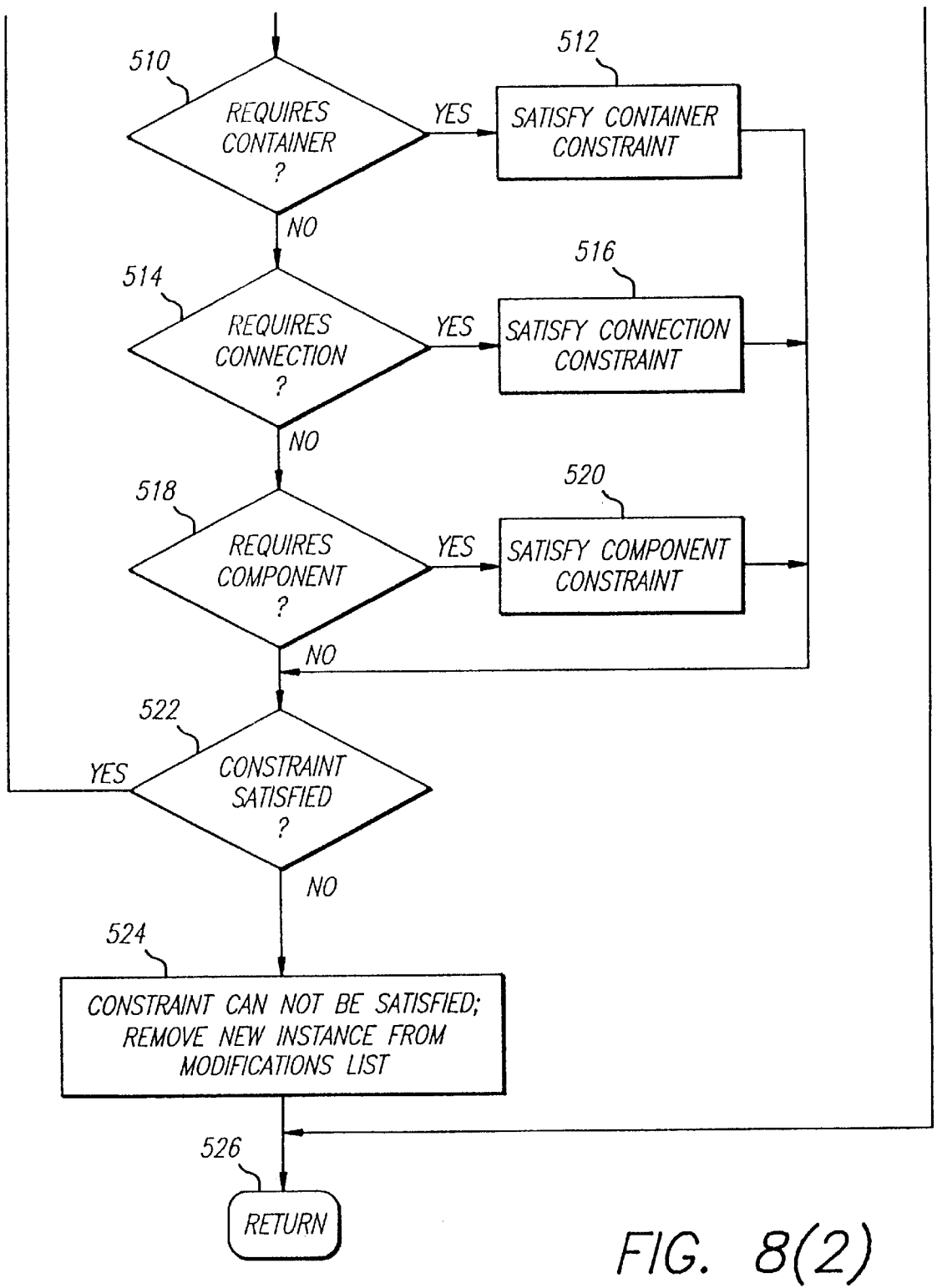

FIGS. 8(1) and 8(2) illustrate the SatisfyContainerConstraint and SatisfyComponentConstraint process flow. At decision block 500 (i.e., "required instance already available in configuration?"), if the required instance exists and is available to satisfy the constraint, the constraint is satisfied by this available instance and processing returns at block 526. If not, the required instance is instantiated, and the Modifications List is updated at processing block 502. At decision block 504 (i.e., "any constraints to be processed?"), if there are no constraints on the new instance, the constraint is satisfied by the new instance, and processing returns at block 526.

If there are constraints to be processed, the next constraint is identified at block 508. If it is determined that it is a requiresContainer constraint at decision block 510 (i.e., "requiresContainer?"), processing continues at processing block 512 (i.e., "satisfyContainerConstraint") to satisfy the requiresContainer constraint, and processing continues at decision block 522 (i.e., "constraint satisfied?").

If it is determined that it is not a requiresContainer constraint at decision block 510, but it is determined that it is a requiresConnection constraint at decision block 514 (i.e., "requiresConnection?"), processing continues at processing block 516 (i.e., "satisfyConnectionConstraint") to satisfy the requiresConnection constraint, and processing continues at decision block 522 (i.e., "constraint satisfied?").

If it is not a requiresContainer constraint at decision block 510 and not a requiresConnection constraint at decision block 514 (i.e., "requiresConnection?"), processing continues at decision block 518 (i.e., requiresComponent?"). If it is determined that it is a requiresComponent constraint at decision block 518 (i.e., "satisfyComponentConstraint") to satisfy the requiresComponent constraint, and processing continues at decision block 522 (i.e., "constraint satisfied?").

At decision block 522 (i.e., "constraint satisfied?"), if the constraint was satisfied, processing continues at decision block 504 (i.e., "any constraints to be processed?"). If the constraint was not satisfied, the constraint is marked as not being satisfied by an existing instance or the new instance, and the new instance is removed from the Modifications List at processing block 524. Processing returns at block 526.

CONNECTION PROCESSING

The use of a model element in a configuration may also be constrained by the ability to establish a connection to another model element. The requiresConnection constraint requires that a physical connection exit between two components. FIGS. 9A(1) and 9A(2) illustrate the process flow for satisfying the requiresConnection constraint. At processing block 280, a target component is selected and a list of ports is created. At processing block 282, the requested resources are allocated. At processing block 284, CandidatePorts(list) is invoked to identify unconnected ports that are accessible from the target component. At processing block 286, candidate local ports (i.e., those ports that are unconnected and have the appropriate datatype) are identified. At processing block 288, candidate connectors are identified.

At decision block 290 (i.e., have all connectors been tested?"), if all of the connectors have been tested, the request is marked as failed, and processing continues at block 306 (i.e., "return"). If not, the next connector is selected at block 294. At decision block 296 (i.e., "can physical type of connector's port1 connect with physical type of target port?"), if port1 of the connector is not the same physical type (e.g., 25 pin) as the target port's physical type, processing continues at decision block 290 (i.e., "have all connectors been tested?").

Otherwise, processing continues at decision block 298. At decision block 298 (i.e., "can physical type of connector's port2 connect with physical type of local port?"), if port2 of the connector is not the same physical type (e.g., 25 pin) as the local port's physical type, processing continues at decision block 290 (i.e., "have all connectors been tested?"). Otherwise, processing continues at decision block 300. At decision block 300 (i.e., "does a transfer path exist between port1 and port2?"), if a transfer path does not exist between port1 and port2, processing continues at decision block 290 (i.e., "have all connectors been tested?"). Otherwise, the requested resource is allocated at block 302. At processing block 304, the target port is connected to the connector's port2, and the local port is connected to the connector's port1. Processing ends at block 306.

Figure 9B:
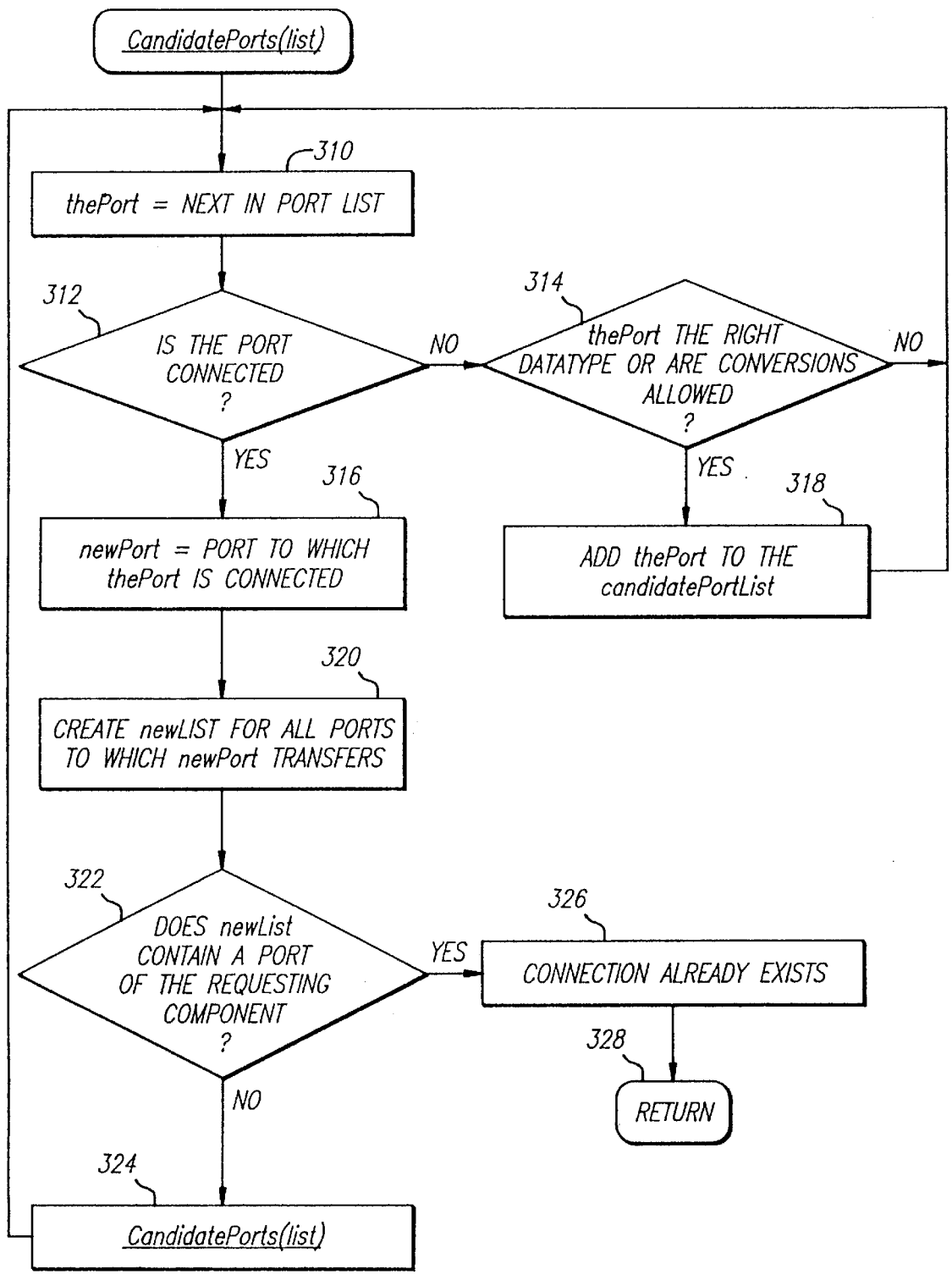
FIG. 9B illustrates the CandidatePorts process flow.

Candidate ports must be identified to satisfy a requiresConnection constraint. FIG. 9B illustrates the CandidatePorts(list) process flow. Processing block 310 of CandidatePorts(list) set thePort variable to the next port in the list. At decision block 312 (i.e., "is the port connected?"), if the port is connected, processing continues at processing block 316. If not, decision block 314 (i.e., "thePort the right datatype or are conversions allowed?") determines if the datatypes are compatible. If not, processing continues to block 310 and the next port is found.

If they are compatible, thePort is added to the port list, and processing continues at block 310. If it is determined that thePort is already connected at decision block 312, processing continues at processing block 316, and newPort is set to the port to which thePort is connected. At block 320, a new port list is created for all ports to which newPort transfers. At decision block 322 (i.e., "does newList contain a port of the requesting component?"), if the newList contains one of the requesting component's ports, the connection is marked as already being in existence at block 326 and processing returns at block 328. If not, CandidatePorts(list) is invoked for the newList.

CONFIGURATION ENGINE

When the user has selected the components for the system to be modeled, the user requests the invocation of the configuration engine. The configurator accesses the Product Base to identify the object class. After certain validation checks are successfully performed, the configurator instantiates (i.e., creates) a member of that class, called an object instance. The configurator only instantiates those objects required to configure the requested system.

The configuration engine processes component and resource requests in the priority specified. As each request is processes, the existing configuration is modified by: (1) adding the requested component and other components required to support the component requested, or (2) identifying existing components and new components required to provide the requested resource. When a request is successfully processed, the configuration modifications are "committed," and this configuration becomes the input configuration in processing the next request.

Figure 6:
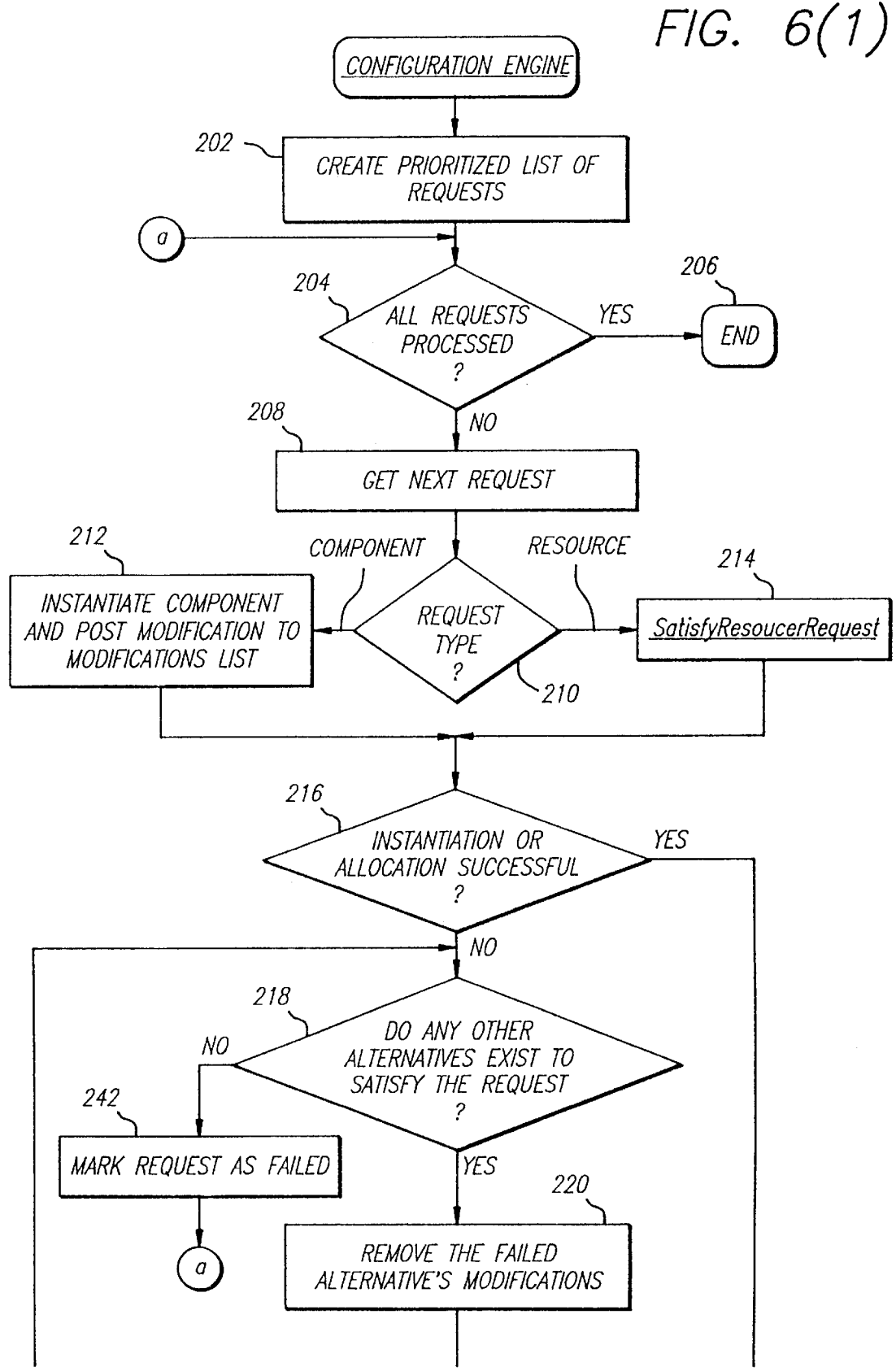
FIGS. 6(1) and 6(2) illustrate the Configuration Engine process flow.
Figure 6:
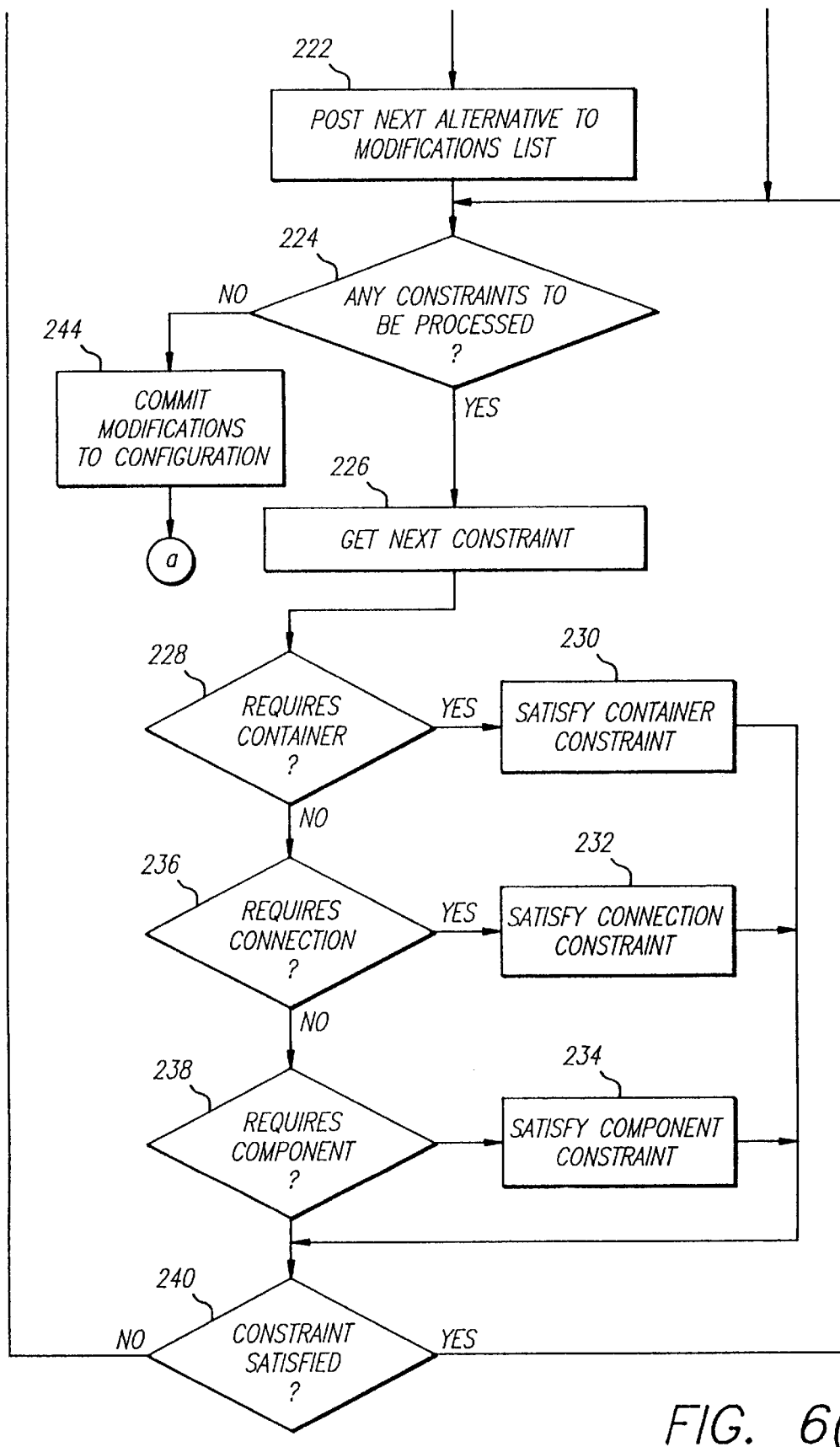

FIGS. 6(1) and 6(2) illustrate the Configuration Engine process flow. Processing block 202 creates a prioritized list of requests. If it is determined that all of the requests have been processed at decision block 204 (i.e., "all requests processed?"), processing ends at block 206. If not, the next request is selected at processing block 208.

The request type is determined at decision block 210 (i.e., "request type?"). If the request is a component request, processing continues at processing block 212. At block 212, the component requested is instantiated and posted to the Modifications List, and processing continues at decision block 216. If the request is a resource request, the component that can supply this resource is identified at processing block 214 (i.e., "SatisfyResourceRequest"), and processing continues at decision block 216. At decision block 216 (i.e., Instantiation or allocation successful?"), if the component instantiation or resource allocation is successful, processing continues at decision block 224 (i.e., "any constraints to be processed?"). If the component instantiation or resource allocation is not successful, processing continues at decision block 218 (i.e., "do any other alternatives exist to satisfy this request?").

If it is determined at decision block 218 (i.e., "do any other alternatives exist to satisfy this request?") that no other alternatives exist to satisfy the request, the request is identified as a failed request, and processing continues at decision block 204 (i.e., all requests processed?"). If there are other alternatives, the failed alternative's modifications are removed from the Modifications List at 220, the next alternative is posted to the Modifications List at 222, and processing continues at decision block 224 (i.e., "any constraints to be processed?").

At decision block 224 (i.e., "any constraints to be processed?"), if there are no constraints to be processed, the modifications are committed to the configuration at processing block 244, and processing continues at decision block 204 (i.e., "all requests processed?"). If there are constraints to be processed, the next constraint is identified at block 226. If it is determined that it is a requiresContainer constraint at decision block 228 (i.e., "requiresContainer?"), processing continues at processing block 230 (i.e., "satisfyContainerConstraint") to satisfy the requiresContainer constraint, and processing continues at decision block 240 (i.e., "constraint satisfied?"). If it is determined that it is not a requiresContainer constraint at decision block 228 but it is determined that it is a requiresConnection constraint at decision block 236 (i.e., "requiresConnection?"), processing continues at processing block 232 (i.e., "satisfyConnectionConstraint") to satisfy the requiresConnection constraint, and processing continues at decision block 240 (i.e., "constraint satisfied?").

If it is not a requiresContainer constraint at decision block 228 and not a requiresConnection constraint at decision block 236 (i.e. "requiresConnection?"), processing continues at decision block 238 (i.e., requiresComponent?"). If it is determined that it is a requiresComponent constraint at decision block 238 (i.e., "requiresComponent?"), processing continues at processing block 234 (i.e., "satisfyComponentConstraint") to satisfy the requiresComponent constraint, and processing continues at decision block 240 (i.e., "constraint satisfied?"). At decision block 240 (i.e., "constraint satisfied?"), if the constraint was satisfied, processing continues at decision block 224 (i.e., "any constraints to be processed?"). If the constraint was not satisfied, processing continues at decision block 218 (i.e., "do any other alternatives exist to satisfy the request?").

Figure 7:
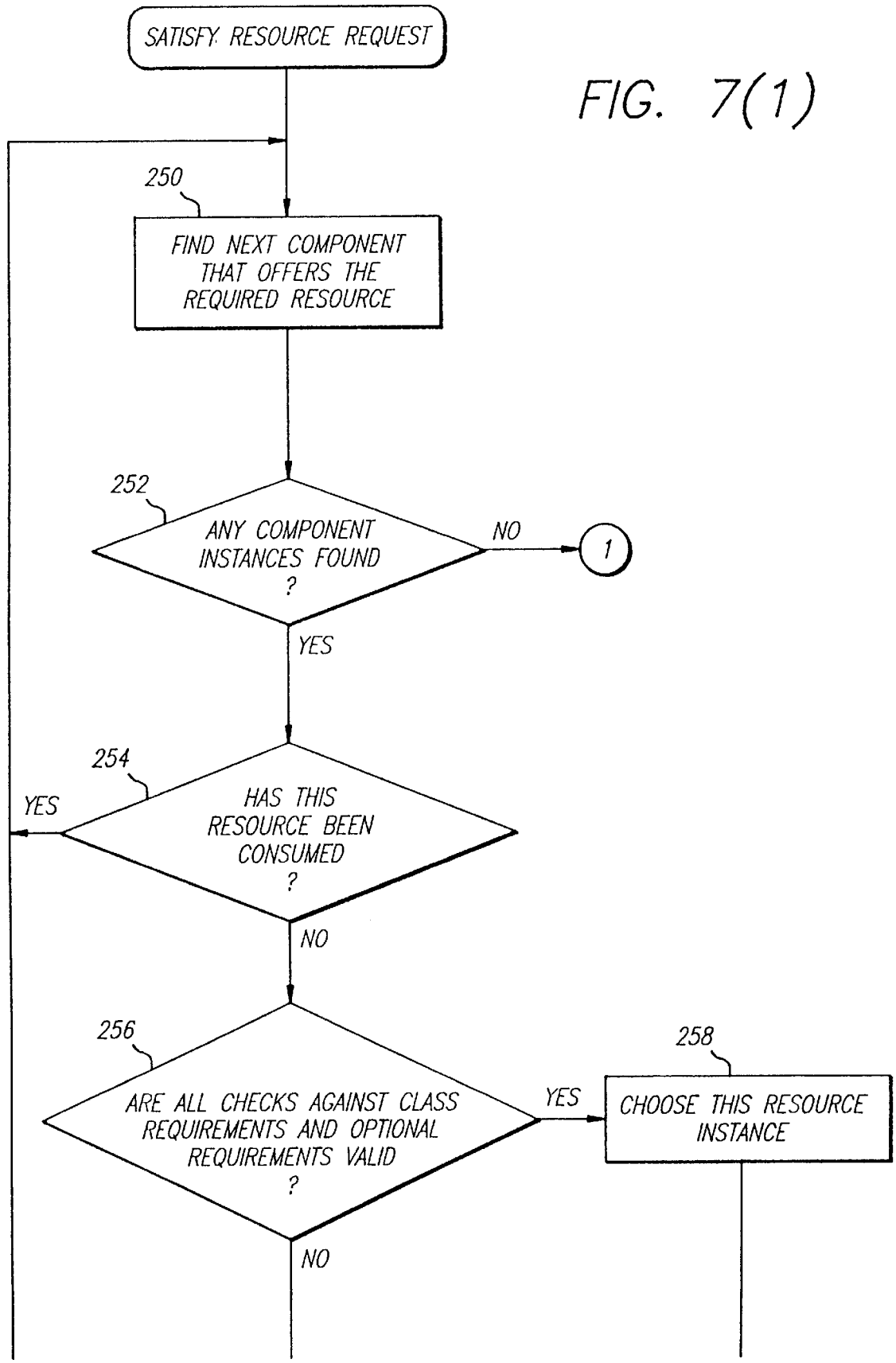
FIGS. 7(1) and 7(2) illustrate the SatisfyResourceRequest process flow.
Figure 7:
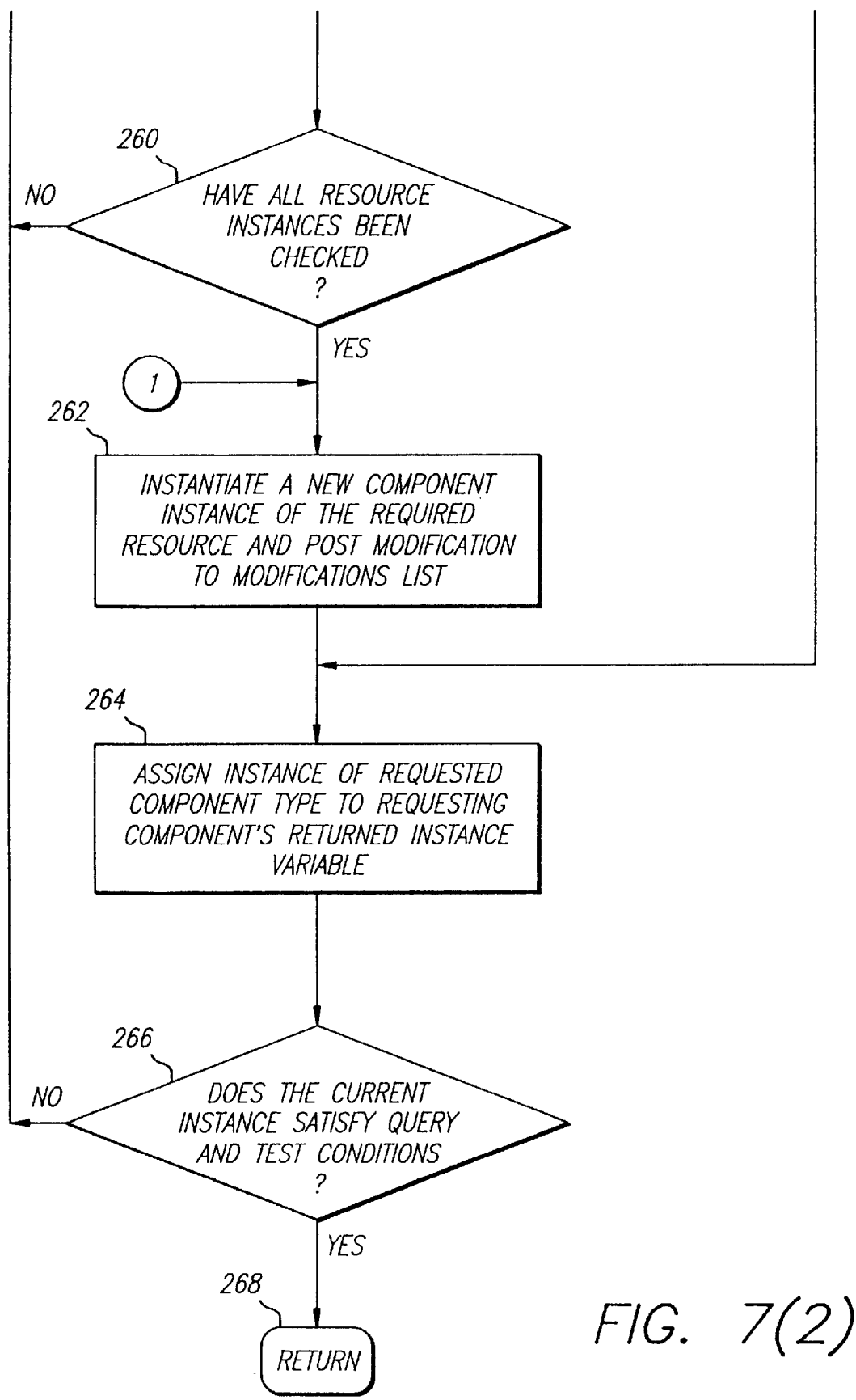

The fact that resources are offered by individual component instances, and are not represented as global system entities, assists in the exploration of alternatives. FIGS. 7(1) and 7(2) the SatisfyResourceRequest process flow. At processing block 250, the next component that offers the required resource is found. If, at decision block 252 (i.e., "any component instances found?"), it is determined that no component offers the resource, processing continues at processing block 262.

If a component is found, processing continues at decision block 254 (i.e., "has this resource been consumed?"). If the resource has been consumed processing continues at processing block 250 (i.e., "Find next component that offers the required resource"). If the resource has not been consumed, a check is made to determine whether class requirements and optional requirements are valid at decision block 256. If all of the checks are valid, the current resource instance is chosen at processing block 258, and processing continues at processing block 264. If one of the checks is invalid, processing continues at decision block 260 (i.e., "have all resource instances been checked?"). If all of the resource instances have not be checked, processing continues at block 250 where the next component offering the resource is found.

If all of the components offering this resource have been checked, or it is determined (at decision block 252) that no existing component offers this resource, processing continues at block 262, and a new component instance that offers the resource is created, the configuration modification is posted to the Modifications List, and processing continues at block 264. At block 264, an instance of the requested component type is assigned to the requesting component's returned instance variable. Processing continues at decision block 266 (i.e., "does the current instance satisfy query and test conditions?") to determine if all query and test functions are satisfied. If not, processing continues to processing block 250. If they are, processing ends at block 268.

MODEL LANGUAGE

The model language provides the ability to define a model (e.g., model elements, model constraints, and model structure). Using the syntax of the model language, statements may be entered to define the model base, or Product Base. The Product Base contains all of the information about a model. The Product Base contains the information used to configure a system.

The Product Base may also contain Hierarchical Product Lines. Product Lines allow a Product Base to be subdivided into groups. An example of such a grouping is marketing divisions, such as DesktopSystems. A DesktopSystem might contain all of the components that are commonly sold as parts of a desktop computer system such as operating system software, modem cards, microprocessor chips, etc. Only components that are part of the same product line can be configured together. However, each component type can be part of several product lines. Product Lines hierarchies may also be declared. A child in a product line hierarchy inherits from the parent, and every component in the parent is inherited by the child. The format of a product line declaration is as follows (Note: reserved words are bold, double-underscores indicate repetitive ports, and portions contained in "<< >>" are required):

productLine <<ProductLineName>>;

Or, to declare product line hierarchies:

productLine <<ProductLineName1>>: <<ProductLineName2>>;

System models are stored in files, called parse files. Collectively, the parse files are known as the Product Base. Parse files contain information about a general category within a system model. Data representations of individual system parts are known as objects. Data representations of individual system parts are known as objects. Cabinets, storage devices and peripheral cards are examples of objects in a Product Base used to configure computer systems. A property provides attributes of an object. For example, in a computer systems' Product Base, capacity, power requirements, and connection interface are properties of a storage device object. Further, a property categorizes an object. That is, objects with similar properties are called a class of objects. Objects can inherit properties from other objects. That is, one class of objects acts as the parent of another class, and the child class exhibits all of the properties of the parent class in addition to others.

Attributes define the aspects of a component that must be considered to successfully configure a component. Examples of attributes of a power supply are the cabinet space required for the supply and the remaining power available after power-consuming components are added to the configuration. Attributes can be assigned at the class level, and descendants of that class inherit the class attributes. In addition, attributes can be associated with particular component types. There is no limit to the number of attributes that can be assigned to a component or class.

Attribute values may be of type floating point, boolean, string, datatype, component, and resource. Attributes may be multivalued. That is, multivalued attributes can have more than one value. For example, with a component that can use either a full height internal bay or a front accessible bay, the attribute "attribute__Bay__type__required" can retain both values. An attribute is declared by the statement (Note: "|" indicates a choice):

AttributeType <<Attribute Name>>; |

Multivalued AttributeType <<AttributeName>>;

An example of attribute declarations are:

| Float | Position |
| Float | throughput__available |
| Float | load__consumed |
| resource | space__type__required |

A resource is a system commodity that is associated with component types. A resource may be assigned to multiple component types. Multiple resources may be assigned to a component. When a component is instantiated, the resource assigned to this component type is made available to the configuration. When a component's resource is consumed, only the resource supplied by its associated component becomes unavailable. The availability of a resource of the same type that is offered by a second component is unaffected by the consumption of the first component's resource. Therefore, if the same resource type is available from a second component, the consumption of the first component's resource does not consume all of this resource type in the modeled system.

Before resource type can be assigned to a component type or used by a component instance, the resource type must be declared. A resource declaration has the following format:

resource <<ResourceName>>;

An example of a resource declaration is as follows:

resource static__RAM__resource;

Datatype declarations define the types of interfaces and data transfer protocols available to connections in a modeled system. SCSI and IDE are examples of datatypes. A datatype is declared as follows:

dataType <<DataTypeName>>;

A derived class is defined by the following statement (Note: the portion with the ¿ symbol is optional):

Class <<ClassName>>: <<BaseClassName | SuperClassName>>
{
displayStatus: <<HIDDEN | LISTED | DRAWN>>
¿attributes:
<<AttributeName=AttributeValue;>> ¿
¿dimensions [Xsize, Ysize]; ¿
¿connectionOrigin <<TRUE | FALSE>>; ¿
}

The display status includes the values Hidden, Listed, and Drawn. Drawn allows the class member to be displayed in the graphical rendering of the configuration. Listed allows the class members to be listed on the additional components list. Hidden is used for members that are Hidden (i.e., not drawn), but have children that are Drawn. An attribute value may be assigned at the time of declaration, but this is not necessary. Connection origin identifies whether or not instances of this class are to be used as starting points for cabling report generation. An example of a derived class declaration is as follows:

```
class Bay: Container
displayStatus: DRAWN;
attributes:
    front_accessible;
    height;
    half_height_compatible;
    position;
}
```

In this example a derived class, bay, is created. It is a member of the Container base class. Therefore, it may contain other elements. Its attributes define its height, half_height compatibility, front_accessibility (i.e., is a component installed in this bay accessible from the front of a system cabinet), height, and position. These attributes will be inherited by each descendant of this derived class.

System components, or component types, are defined by the following declaration:

```
component <<ComponentTypeName>>: <<DerivedClassName>>
{
ɩproductLines: <<ProductLineName;>> ɩ
ɩlabel: <<"LabelName";>> ɩ
ɩdescription: <<"DescriptionString";>> ɩ
ɩresource: <<ResourceName ɩ, IntegerValue ɩ;>> ɩ
ɩdataType: <<DataTypeName;>> ɩ
ɩpartNum: <<"PartNumString";>> ɩ
ɩsubComponents: <<SubcomponentName;>>V
         <<SubcomponentName{Integer};>> ɩ
ɩtransfers: <<SubcomponentName[0]<->SubcomponentName[1];>> ɩ
ɩdimensions: [<<Xsize, Ysize>>]; ɩ
ɩvalues: <<AttributeName=AttributeValue;;>> V
         <<AttributeName = {AttributeValue;;>> V
ɩfillDirection: [ <<TB | BT | LR | RL>> ]; ɩ
}
```

The label field defines the label given to the graphical representation of this component. The description field defines the description that is displayed or reported. The dataType field is used if the component type is descended from a port, and defines the type of data that may be transferred from this component type. The subComponents field defines the structural children of a Composite component type. The transfers field defines the paths that data can travel through a Composite component. Transfers are a mechanism for expressing an internal data path within a Composite component. For example, a cable is represented as a component with two ports, and the cable is used to transfer data from one port to another. The values field provides the ability to establish a component's attributes, or properties. The fillDirection describes the order in which multiple components in a single container are drawn.

The following is an example of a component definition:

```
Component Cabinet1 : Cabinet
{
partNum: "001-001";
Children: Slot1_1;
         Slot1_2;
         Slot1_3;
         . . .
         Slot1_9;
             Slot1_10;
             CabinetBay (4);
Values:
     position = 1;
     resources_provided = {10_Slot_Resource, CPU_Slot_
Resource,
     MCU_Slot_Resource, Mem_Slot_Resource, Bay_Resource};
}
```

This example defines a component type Cabinet1, within Cabinet and Composite classes. FIGS. 4(1) and 4(2) are the structural hierarchy for a model used to configure computer systems. Cabinet1 108 is descended from Cabinet 110 which is a descendant of Composite 112. Therefore, Cabinet1 108 is a composite component type. It has subcomponents, or children, Slot1_1 through Slot1_10 and CabinetBay{4}). The integer "4" indicates that there are four CabinetBay component types within Cabinet1.

The following is an example of a Composite component type that descends from a connector:

```
Component SCSIChainCable: Cable
{
description: "SCSI Chain Cable";
partNum: "003-002";
subComponents:
    SCSICablePort_3;
    SCSICablePort_4;
values:
    length = 2;
transfers:
SCSICablePort_3 <-> SCSICablePort_4;
}
```

The following is an example of a component type definition that provides a resource:

```
Component 16mbMemCard : Card
description: "16mb Memory Card";
partNum: "004-016";
resource: Memory_Resource, 16;
values:
       slot_resource_required = Mem_Slot_Resource;
}
```

Constraints provide conflict resolution information used to determine whether components may be added to the configured system. Constraints can control such things as space allocation, space occlusion, and additional component requirements. Constraints are expressed as component qualifiers and component dependencies. Constraints test the attributes and lineage of components and identify the components that are required for the successful instantiation of components.

```
constraint <<ConstraintName>> on <<ClassName>>
{
<<requiresComponent | requiresContainer>>
(<<ClassName, ResourceName | ClassName | ComponentName>>,
<<?ReturnedInstance>> ɩ , ?ReturnedInstance.AttributeName ɩ
ɩ, Consumed ɩ ɩ, Existing ɩ ɩ, New ɩ);
}
constraint <<ConstraintName>> on <<ClassName>>
{
<<requiresConnection ( ɩStartingComponentName, ɩ
<<ClassName, ResourceName | ClassName | ComponentName>>,
<<DataType>>, ?ReturnedInstance>>, <<%Path>>
ɩ,?ReturnedInstance.AttributeName ɩ
ɩ, Connector ( <<ClassName>>, <<?ConnectorInstance>>,
       <<?ConnectorInstance.AttributeName>>) ɩ
ɩ, Longest ɩ ɩ, Consumed ɩ ɩ, Existing ɩ ɩ, New ɩ ɩ,
Conversions ɩ);
}
```

The Constraint Name and the Class upon which the constraint may be applied are identified in the first line of the declaration. The requiresComponent, requiresContainer and requiresConnection expression identifies additional items (i.e., components, container, or connections) that are required to configure the constrained component. The additional items needed may be identified by a derived class name and resource combination, a derived class name, or the name of the component type. When a request is satisfied during configuration, the configuration engine returns the instance of the requested component type found. The ?ReturnedInstance variable identifies the variable that is associated to the instance of the requested component type found by the configuration engine. A request may further ask that the configuration engine make a choice based on attribute maximization. That is, make a choice that will maximize a given attribute. Therefore, a ?ReturnedInstance.AttributeName declaration will return the requested item with the greatest amount of AttributeName. The attribute maximization option can also be an expression that refers to other returned instances created by previous component request with the current constraint and perform operations with them. A component instance is said to be consumed when it is unavailable to satisfy a constraint requirement. The Consumed keyword can be used to mark an instance returned by a request as unavailable. Once an instance is consumed, the configuration engine will exclude this instance in subsequent searches to satisfy another request. The Existing keyword limits the search to existing instances. The New keyword requests that a new instance be created to satisfy a constraint requirement.

The requiresConnection constraint requirement has additional arguments that describe the requirements for an entire connection path that can contain several different components. The requiresConnection constraint requirement has one requirement that is additional to and different from the requiresComponent and requiresContainer constraints. Like the other two constraint requirements, the requiresConnection requires that the request be satisfied. In addition, the requiresConnection constraint requirement, requires that the constrained instance be connected to the satisfying instance.

The StartingcomponentName field, or variable, refers to the starting component in the connection (i.e., where the connection will begin). If this variable is not set, the starting component is assumed to be the constrained instance. The next line (i.e., "<<ClassName, ResourceName|ClassName|ComponentName>>") identifies the connection component.

The type of data that the connection will carry is specified by the DataType field. The dataType field specifies the data type requirements of a port of the requested instance. Further, the dataType field specifies the data type requirements of a port of the constrained instance. Because the dataType field only requires that the constrained instance's port and the requested instance's port be of data type dataType, a connection constraint can be satisfied by a multiple stage connection. For example, it is possible to connect a SCSI device to a SCSI card through intervening components.

Figure 5:
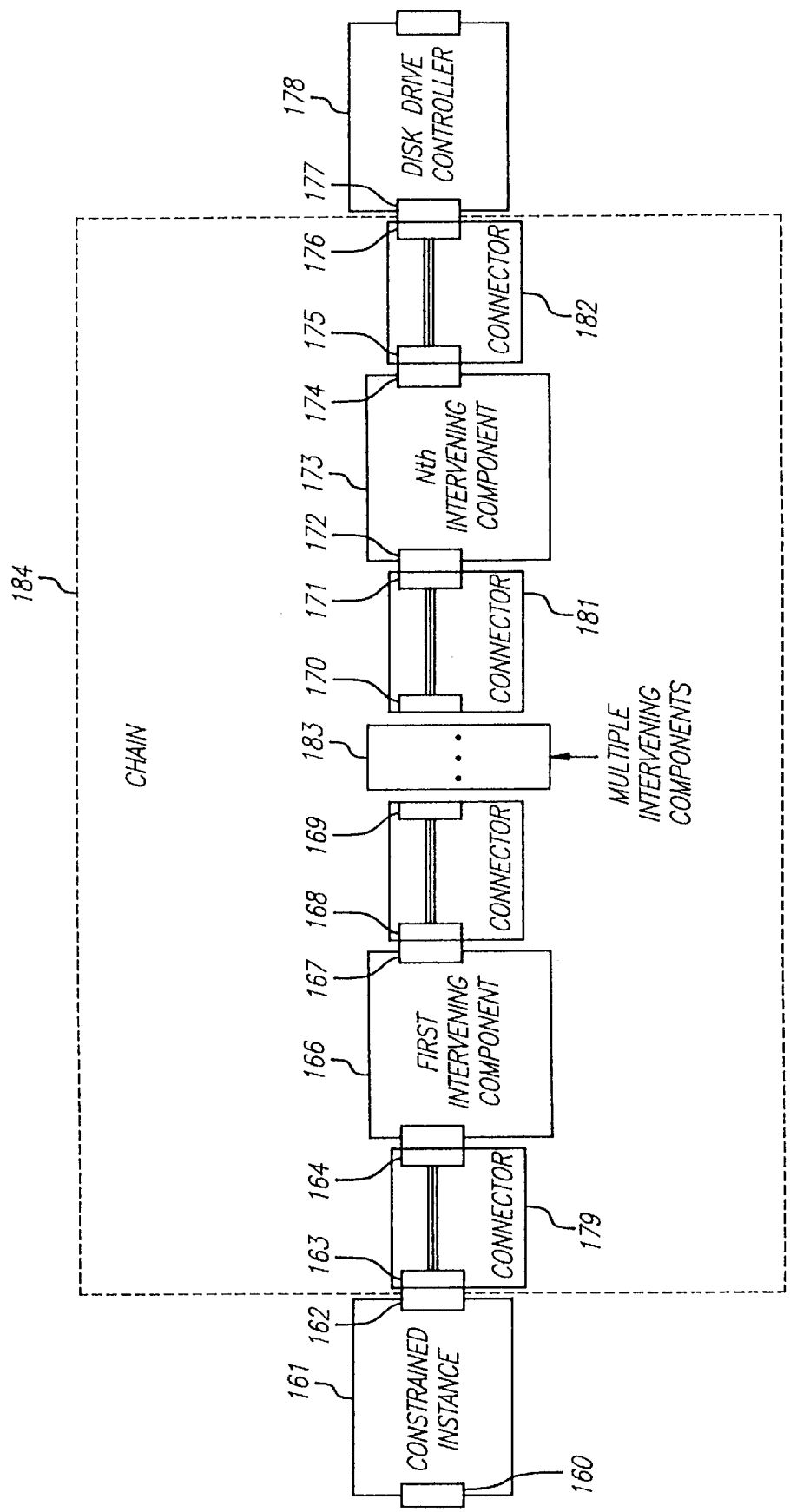
FIG. 5 illustrates component interconnections with multiple intervening components and data types.

FIG. 5 illustrates component interconnections with multiple intervening components and data types. ConstrainedInstance 161 has port 160 and port 162. Port 162 is connected to Connector 179 at Port 163. Port 164 of Connector Block 179 is connected to Port 165 of FirstInterveningComponent 166. Port 167 of FirstInterveningComponent is connected to Port 168 of Connector 180. MultipleInterveningComponents 183 represents some number of intervening components that may be placed between FirstInterveningComponent 166 and NthInterveningComponent 173. Connector 180 and Connector 181 are positioned on either end of the MultipleInterveningComponents 183. Port 171 of Connector 181 is connected Port 172 of NthInterveningComponent 173. Port 174 is connected to Port 175 of Connector 182. Port 176 of Connector 182 is connected to Port 177 of DiskDriveController 178. Chain 184 represents the chained communication or connection path between ConstrainedInstance 161 and DiskDriveController 178.

The ?ReturnedInstance and ?ReturnedInstance.AttributeName fields have the same functionality as in the requiresComponent and requiresContainer constraint expression.

The %Path variable is bound to all of the instances used to make the connection. That is, all of the instances involved in a connection are referred to as the connection path.

With respect to the ?ReturnedInstance.AttributeName and the ?ReturnedInstance instance variables, the maximization option is the same as for the requiresComponent and requiresContainer constraints. There are two maximization options for the path instance variable. The first option is the connector the option. The ClassName field specifies the desired class of connector instances used to build the path. The ?ConnectorInstance field is bound to the returned connector instance, and the AttributeName is the connector instance attribute to be maximized. The request for ?ConnectorInstance is maximized in the same way as the returned instances for requiresComponent and requiresContainer.

The second maximization option provided by requiresConnection is the path length option. This option provides the ability to prioritize choices among paths from the requested component to the requesting component. The length of a path is defined as the number of component instances in the path, including instances of class Connector. The longest path may be specified by using the "Longest" keyword in the constraint declaration. If the longest path option is not chosen, the configuration engine selects the shortest path.

The Consumed, Existing and New specifications of the requiredConnection constraint have the same functionality as in the requiresComponent and requiresContainer constraint declaration. The Conversions option provides the ability to specify that the requested instance can have a datatype that is dissimilar to the constrained instance. That is, if this option is chosen, the request-side port is no longer required to carry data of type DataType. The only requirement is that the datatype specified by the dataType variable be available at the requester-side port. This option expands the alternatives that the configuration engine is allowed to consider in satisfying the connection request, since it does not have to choose the terminal component with the same datatype as the requester instance. Therefore, if a connection constraint allows conversions, satisfaction of a request for a SCSI connection need only deliver SCSI data to the requesting instance.

The following is an example of a constraint definition:

```
constraint Storage_device_constraint on Storage Device
{
    requiresConnection (SCSICard, SCSIDatatype, ?card, %path,
        Connector (Cable, ?c, -?c.length, Longest));
    requiresContainer (Bay, Bay_Resource, ?bay.Consumed);
        *
        *
        *
}
```

The requiresContainer constraint indicates that the StorageDevice component type requires a container (i.e., a bay). In addition, this constraint definition imposes a constraint on the StorageDevice class of the model hierarchy and all of its descendants. It requires the longest cable component type connection to a SCSICard component type. The type of data that will be carried by this connection is of datatype SCSIDatatype. A port of the constrained instance must also be of this datatype. The datatype constraints may be fulfilled with a multiple stage connection. Thus, the SCSI StorageDevice may be connected to the SCSICard through intervening components. The variable ?card identifies the SCSICard instance used. The %path variable contains information regarding the instances used to make the connection.

The model language provides the ability to perform further tests and queries to ensure that the configuration engine returns usable instances or instance sets. If a constraint contains a component request, these queries and tests are placed after that request. If the queries and tests are not satisfied, the configuration engine continues to search for another alternative to satisfy the request. The following are examples of the tests provided in the model language:

| mathematical operators: | |
|---|---|
| + | (addition) |
| − | (subtraction) |
| * | (multiplication) |
| / | (division) |
| ABS | (absolute value) |
| SQRT | (square root) |
| relational operators: | |
| > | (greater than) |
| < | (less than) |
| == | (equality) |
| >= | (greater than or equal to) |
| <= | (less than or equal to) |
| != | (not equal) |
| boolean operators: | |
| OR | (logical inclusive or) |
| AND | (logical conjunction) |
| NOT | (logical negation) |
| assignment operator: | |
| := | (becomes; takes the value of) |

For example, in configuring a computer system, a test may be performed when configuring a floppy disk drive for the computer system. A floppy disk drive requires a bay or slot within the system cabinet. Such a constraint would be expressed as a requiresContainer component request. This request would cause the configuration engine to search for a candidate instance to satisfy this request. Once the engine returns the candidate instance (i.e., ?bay), further testing can be done to determine whether the drive will fit in the returned instance. This can be tested by comparing the height attribute values of the candidate instance (i.e., ?bay) and the constrained instance (i.e., ?this) as follow:

?bay.height>=?this.height

Intrinsic functions provide additional capability to perform tests and queries. Intrinsic functions can be grouped into query functions and predicate functions. The following are examples of query functions:

| ceil | Queries an attribute of type float, or any expression that evaluates to a floating point value, for the smallest integer value greater than or equal to the floating point value. Returns an integer.<br>Syntax: ceil (<<Expression>>) |
|---|---|
| ClassName | Queries a set variable for all instances in the set that belong to the specified class.<br>Syntax: ClassName (<<%InstanceSet>>) |
| ComponentName | Queries a set variable for all instances in the set that belong to the specified component type (i.e., leaf class).<br>Syntax: ComponentName (<<%ReturnedInstance>>) |
| Component | Queries a set variable for all instances that are not descended from class Connector.<br>Syntax: Component (<<%InstanceSet>>) |
| component | Queries an instance for the component type (i.e., class hierarchy leaf class) from which it is descended. Returns the parent component type.<br>Syntax: component (<<%ReturnedInstance>>) |
| COUNT | Queries a set variable for all instances in the set that belong to the specified class.<br>Syntax: COUNT (<<ClassName \| ComponentTypeName>> <<(%InstanceSet)>>) |

The following is an example of a constraint definition using query and predicate functionality:

constraint Storage_device_constraint on Storage_Device
requiresConnection (SCSICard, SCSIDatatype, ?card, %path, Connector (Cable, ?c, -?c.length, Longest);
requiresContainer (Bay, Bay_Resource, ?bay, Consumed);
ancestor (?bay, Cabinet) == ancestor (?card, Cabinet);
FORALL (?inst1, Storage_Device (CONNECTS(FIRST(%path))));
ancestor (?inst1, Cabinet) == ancestor (?this, Cabinet));
}

In this example, Storage_Device requires a connection to a component of type SCSICard. The connection must be of datatype SCSIDatatype. The component instance of type SCSICard is bound to the instance variable ?card, and the components in the connection path are bound (as a set) to the set variable %path. The connector component used to complete the connection must be of type Cable, and is bound to the instance variable ?c. Candidate cables are ordered from shortest to longest, and if alternative paths from the SCSI-Card instance exist, the longest path (in terms of number of components) is preferred.

This example further indicates that Storage_Device must be placed in a container component of type Bay. This instance of type Bay must supply Bay_Resource. The instance of Bay is bound to instance variable ?bay, and the instance is marked as comsumed (i.e., unavailable in subsequent requests for components of type Bay).

In the example, the phrase "ancestor (?bay, Cabinet)== ancestor (?card,Cabinet" requires that the structural ancestor (of type Cabinet) of the instance identified by ?bay must be the same instance as the structural ancestor (of type Cabinet) of the instance identified by ?card. In other words, the card and the bay must be in the same cabinet.

The "Forall" phrase used in the previous example indicates that all component instances of type Storage_Device connected to the first cable in %path must be in the same cabinet as the constrained instance of Storage_Device.

Constraint relationships may be established either at the component level or at the class level. At the component level, constraint relationships specify which component types are constrained by what constraints. The component designated in the constraint relationship may be any of the component types that have been defined by a Component Type declaration. The constraint may be a constraint declared by a Constraint declaration. The following is the syntax for specifying a component level constraint:

<<ComponentTypeName>> constrainedBy <<ConstraintName1>>
{<<OR | AND>> <<ConstraintName2>>}
{,<<OR|AND>> <<ConstraintNameN>>};

Constrains may also be expressed at the class level. A class-level constraint is evaluated as a conjunct in component-level constraint expressions for all component types derived from the constrained class. When a component-level constraint expression is evaluated, class-level constraints are appended to the beginning of the constraint expression and end with that constraint's request and predicate function expressions. If a component inherits class level constraints from several levels in the Class Hierarchy, the constraints are ordered from the most primitive class (i.e., the root class Component) to the most system-specific class (i.e., the user-defined component type). The syntax for a class-level constraint relationship declaration is as follows:

constrain class <<ClassName>> with <<ConstraintName>>

The present invention provides the ability to represent within a structural hierarchy how components of a particular system exist spatially and physically using three type of substructures: composite hierarchies, container hierarchies, and connection relationships. Composite hierarchies identify components as part of other components. Container hierarchies identify components as being contained in other components. Connection relationships identify components that connect to other components. The relationships between generations within the structural hierarchy are expressed by the keywords "childOf," "containedBy," and "connectsWith." Structural relationships are declared as follows:

<<ClassName>> childOf >>ClassName>>
<<ClassName>> containedBy <<ClassName>>
<<ClassName>> connectsWith <<ClassName>>

MODEL MAINTENANCE

A model can be defined by providing statements that syntactically conform to the model language described above. In addition, an interactive facility, the Model Maintenance Subsystem, provides the ability to define, and maintain a model, using a graphical user interface. The Model Maintenance Subsystem provides the ability to interactively define the Product Base using a graphical user interface. The semantic representations, class hierarchies, and structural hierarchies of the model may be viewed (i.e., browsed) and modified (i.e., edited) interactively using a graphical user interface. Further, constraint input is verified. Testing and debugging capabilities are provided to identify problems in the model, and to test and optimize the performance of the modified model. For example, model definition syntax is parsed and verified, and sample requests may be executed. Diagnostics functions may be invoked to monitor the performance of the configuration requests with the modified model.

The browsing capability of the maintenance system provides the ability to view graphic representations of the class and substructural components of the model hierarchy. A Class Tree is used to represent objects descending from base classes within the model hierarchy (i.e., an object class hierarchy). The object class hierarchy is represented by five separate trees, one for each base class. Each branch may have multiple descendants.

A Component Tree is used to depict the Composite, Connector and Container Component substructural interrelationships. Composite Trees are listed first followed by Connector and Container Trees.

A hierarchy member may be selected for modification by double-clicking on the box that contains the hierarchy member. An editor window for the selected hierarchy member is displayed. A List menu may also be used to select the member to be edited. In the preferred embodiment, the List menus are a series of pulldown menus that may be selected from a menu bar of the Maintenance window. The initial menu bar contains a selection for each general element of the ProductBase model (i.e., classes, component types, constraints, etc.). Once a general element is chosen, a new window is displayed that lists the model members of the general type selection. A model member may be chosen along with an operation (i.e., Comment, View, New, or Edit). A Comment operation provides the ability to add a comment to the ProductBase after the selected member. A View operation provides the ability to view the settings for the selected model element. The model member may be modified by choosing either a New or Edit operation.

For example, to modify an attribute of a model member in the preferred embodiment, the attribute type is chosen from the List Menu. Once the attributes are displayed, a New or Edit operation may be chosen to add a new attribute, or modify an existing attribute, respectively. An attribute selection must also be made, if the Edit operation is chosen. After these selections have been made, the Attribute Editor window is displayed. The fields of the window (e.g., name, attribute type, and multivalued) are initialized to either blank or the default settings for a New operation, or initialized to the current attribute settings for an Edit operation. The attribute name field may be selected and modified. The type field may be modified by selecting from a list of valid attribute types. The multivalued field may be toggled on or off. After making modifications, the modifications may be saved or cancelled.

Resources and Datatypes may be added or modified in a manner that is similar to the method for adding or modifying an attribute. Model elements that require relational definitions require additional designations. Examples of these are derived classes, product line (i.e., parent Product Line), constraints (i.e., constrained class), and component types.

In the preferred embodiment, adding a derived class requires an additional initial step to define the location of the new derived class within the model hierarchy. At this point, the New and Edit operations have the same operational characteristics, including the ability to save or cancel. That is, the derived class field values (existing, default, or blank) are displayed in an Editor window. In addition, attributes may be added to all members of the derived classes and their component types; constraints may be specified at the class level for the derived class; structural hierarchy relationships may be defined for the derived class; the System Window display status may be defined; the derived class may be selected as a connection origin (i.e., a starting point of a cabling report); and the component distance (i.e., the average distance from members of the derived class to other objects that are a part of the same composite, and the distance from the member of the derived class to an external port on the composite) may be defined for children of composite objects that are involved in connections.

To add a new component to the model, the class from which the new class is descended must be chosen. The subcomponent field provides the ability to specify the structural hierarchy (i.e., structural children) of a composite component. The New or Edit operations further provide the ability to specify connectivity fields such as transfers (i.e., paths that data can travel through a Composite component), datatype, connection origin. In addition, the following field information may be specified: component type name, associated attributes, products lines (i.e., product lines that contain this component), leaf-level constraints, resources, description, label, part number, fill direction, and display status.

The Maintenance system further provides the capability to test a modified model. The Write integrity option determines whether a ParseFile (i.e.,) can be parsed, and a modified ParseFile written. The ProductBase Integrity option determines whether a ParseFile (i.e.,) can be parsed, and a modified ParseFile written. If not, syntax error messages are displayed. The Debugger (i.e., Configure) option reads component requests from a request file and attempts to configure those components using selected constraints in the current ParseFile. The Debugger provides a tracer capability to provide constraint tracing. A deep trace generates trace output for a traced constraint and all the constraints it spawns. A shallow trace generates a trace output for traced constraints.

NEEDS ANALYSIS

The process of translating customer requirements into specific components and configurations is called "Needs Analysis." The model language provides the ability to express a model in terms of customer needs and requirements.

With a needs analysis approach to modeling, a configuration may also be expressed in terms of capacities (e.g., minimum required response time) or throughput. The needs analysis configuration may be illustrated by a voice messaging system model. A configured voice messaging system may be required to record some specific number of hours of voice data, and provide a response time of less than five seconds for accessing stored messages. To further illustrate, a telecommunications configuration may be specified in terms of traffic load supported and some maximum acceptable failure rte (e.g., dropped calls), or a computer system configuration may be required to support certain processing loads, data storage requirements, and response times.

The model language provides the capability to express a needs analysis model in the configuration modeling language by: (1) interpreting customer requirement quantities (e.g., voice message storage capacity), and (2) identifying associated quantities of configuration components and resources. This provides the ability to make modeling requests in terms of needs in addition to component requests. Components can be identified as satisfying requirements or needs. That is, components may be identified as supplying some quantity of a resource (e.g., megabytes of storage capacity). When a user expresses a system, or some portion of a system, in terms of needs or requirements, one or more components that satisfy the needs may be selected from the ProductBase.

INPUT FORMS

Input forms provide the capability to accept component requests from the user. Input forms allow the user to specify the types and quantities of components in the system to be configured. Input forms consist of standard windowing formats such as listboxes and pushbuttons. A third type of input form provides the ability to specify a quantity of a given component (Note: documentation says this is unique . . . do we need more about this feature for this application?) The user selections on the input forms are called component requests. Input forms provide the ability to associate a default priority for component requests. Default priorities may be overridden by a requestPriority. These priorities provide the ability to designate the order in which component requests are satisfied by the configuration engine.

PRODUCT-COMPONENT MAPPING

Product_component mapping defines discrete and composite components as parts and products in a sales inventory, and then maps those parts and products (i.e., bundles) onto a set of all component instances in a configured system. The product-component map contains representations that define each part and product in terms of its required and optional constituent components. These representations further specify how the products are displayed by the Quoter. A representation is comprised of a the following sections: a Product Header, an Optional Equipment List, and an Option Restriction List.

The Product Header section provides the product name as it appears in the ProductBase. This allows the Bundler to match components in a configured system to products and identify a set cover. This section also includes the following additional information: a Product Description String that describes the product for use by other portions of this invention (e.g., the Quoter); a Product Number String; the Price (i.e., the price of the product); Product Lines String identifies the product lines of which the product is a member, and is used to narrow the set covering search; and a Required Components List that identifies components (i.e., by part number) or products (i.e., by product number) that are required by this product.

The Optional Equipment List is a list of additional product packages that can be included in the base package (i.e., the product described in the Product Header). An Optional Equipment List entry contains: an Option Unique ID to uniquely identify the entry; an Option Description that describes the entry; an Additional Cost to identify an additional cost associated with the inclusion of this entry; and a Constituent Product Number List identifies those products or components, by number, that comprise the entry.

The Option Restriction List is a list of groups of options that are interdependent or that must be chosen according to special criteria. Each entry in the Option Restriction List contains the following: a Group Unique ID to uniquely identify the entry, a Quantity Specifier, and an Option Unique ID List. The Quantity Specifier field specifies the number of members of an option group that may or must be chosen. The Quantifier Specifier field may consist of bound or the atLeastOne, atMostOne, or exactlyOne keywords. The bounds are two integers (enclosed in parentheses and separated by a comma) that express the lower and upper bound. The atLeastOne keyword indicates that one member of the option group must be chosen. The atMostOne keyword indicates that only one member of the option group may be chosen, and that it is not required that any member be chosen. The exactlyOne keyword indicates that at least one member of the option group must be chosen, but no more than one. The Option Unique ID List is a space-separated list of Option Unique ID's.

An example of an entry in a product-component map for a model configuring computer systems is as follows:

```
product base_system
    description: "Base System";
    productNumber: "001-001";
    cost: 10000;
    values:
        category1 = "System";
        category2 = "XXX";
    productLines: Tower;
    required: ("001-001" reference) "002-001" "002-002";
    options:
        COM1 "Comm Option 1" 1 "002-005";
        COM2 "Comm Option 2" 1 "002-006";
    optionGroups:
        g1 atMostOne Com1 Com2;
}
```

BUNDLER

The Bundler bundles components into product (i.e., marketing) packages. The Bundler uses the product-component map to establish a set cover for a configured system. A set cover is a set of many-to-one mappings of component instances in a configured system to product packages in which each component instance is mapped to one product package.

Set covering is the process of covering a set of objects (e.g., component instances in a configuration) with a set of covers (e.g., products). This process is used to associate components created for the current configuration with some grouping or cover (e.g., products). A common problem associated with the set covering process is that as the number of objects and set cover alternatives increase, the number of set covering alternative explodes exponentially. To limit the set covering alternatives, heuristics may be used to identify the minimum set of covers. The Lowest Cost Cover is an example, of a heuristic. Using this heuristic, covering is maximized and cost is minimized. That is, the products providing the most cover for the least amount of cost are selected.

Another heuristic is based on the structural context of the alternatives. That is, in some instances, a product will have structure, and that structure will define a physical unit or grouping of components. This may occur, for instance, when a reduction in manufacturing cost is incurred when components are produced as a unit. This savings may be passed on to the purchaser of a system where the reduced-cost unit is actually being purchased. Therefore, it is necessary to examine the configured components to determine their structure context, and then match these attributes with the structure context of the products. An example of this is a disk array in a computer configuration model. The disk array is physically configured, or manufactured, with a chassis, power supply, controller and five disk drives. Therefore, it is necessary to examine the structure context of any disk drive component requests. The process of selecting instances as "covered" by the disk array product must include a determination that the "covered" instances were configured to be inside the chassis, or as a disk array unit.

Figure 10:
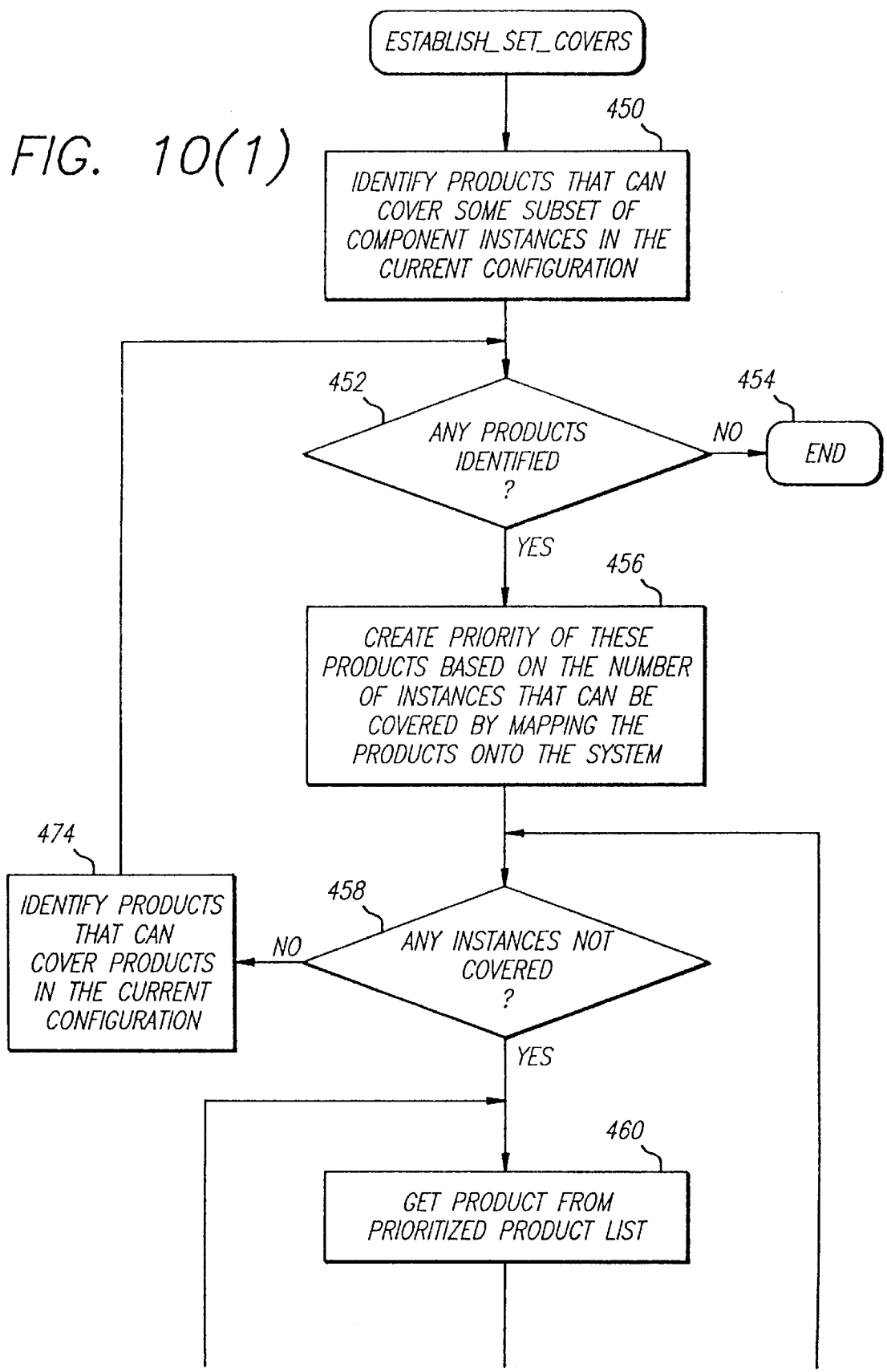
FIGS. 10(1) and 10(2) illustrate the EstablishSetCover process flow.
Figure 10:
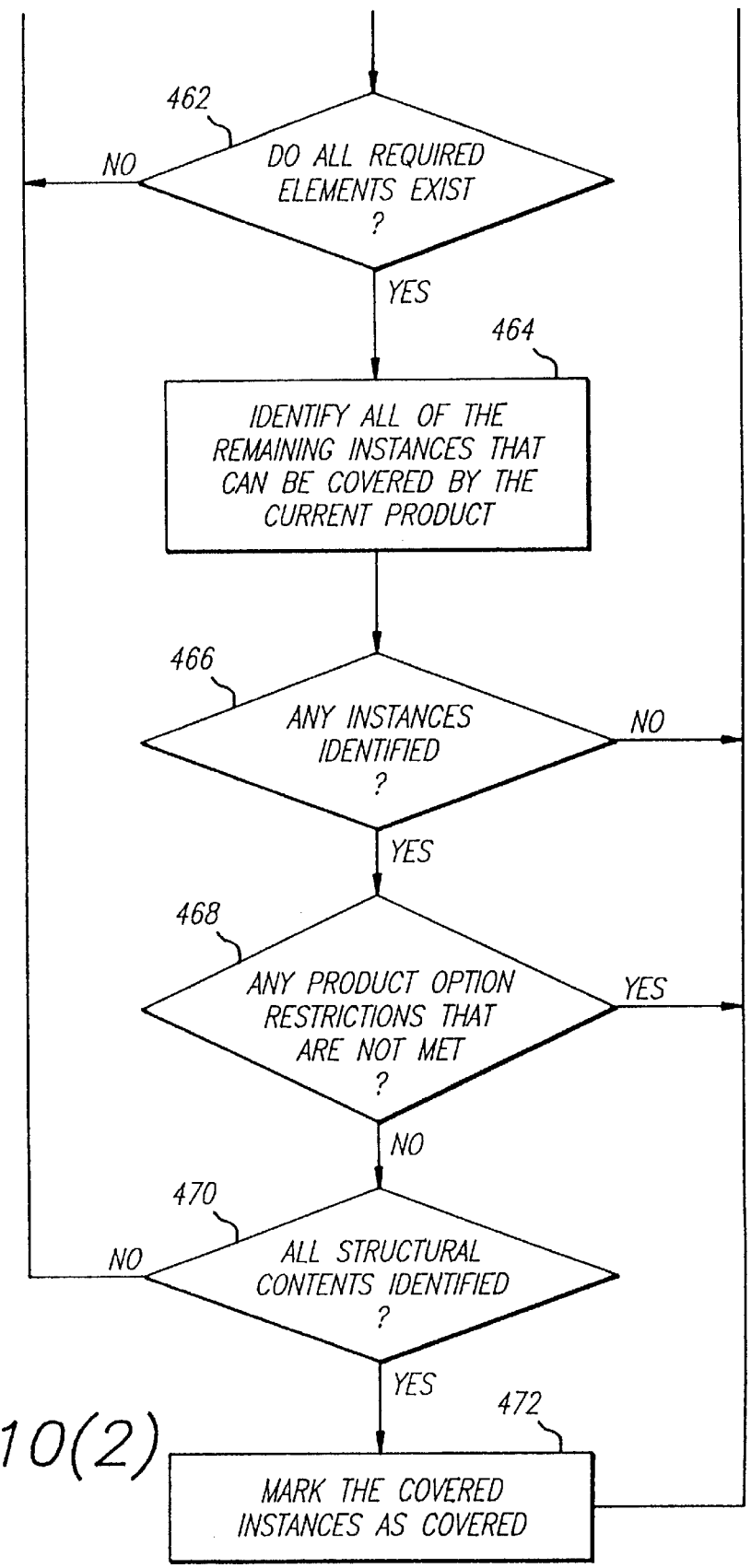

FIG. 10 illustrates the EstablishSetCover process flow. At processing block 450, the products that can cover some or all of the component instances in the current configuration are identified. At decision block 452 (i.e., "any products identified?"), if no products have been identified, processing ends at block 454. If products were identified, the products are prioritized based on the number of instances that can be covered by the product at processing block 456. At decision block 458 (i.e., "any instances not covered?"), if all of the instances have been mapped to the current prioritized product list, a new product list is created that covers products in the current configuration at block 474, and processing continues at decision block 452 (i.e., "any products identified?").

If not, the next product is selected from the list at block 460. At decision block 462 (i.e., "do all required elements exist?"), if all of the elements of the product do not exist in the configured system, processing continues at processing block 460. If they do exist, the instances that have not been previously mapped and that can be covered by the current product are identified at processing block 464. At decision block 466 (i.e., "any instances identified?"), if no instances can be covered by the product processing continues at decision block 458 (i.e., "any instances not covered?").

If some instances were identified, it is determined whether any product option restrictions can not be met at decision block 468 (i.e., "any product option restrictions that are not met?"). If there are, processing continues at decision block 458 (i.e., "any instances not covered?"). If not, processing continues at decision block 470 (i.e., "all structural contexts satisfied?"). If they are not, processing continues at block 460 and the next product is obtained. If they are, the mapped component instances are marked as covered by the current product at block 472 and processing continues at decision block 458 (i.e., "any instances not covered?").

REPRESENTATION OF MODELED SYSTEM

Once a system has been configured based on the requests made, various reporting tools are employed to provide information regarding the configured system. In the preferred embodiment, these tools include a graphical depiction of the general layout of the system, a list of materials, a list of spare parts, and a list of any component request that could not be satisfied.

The present invention provides the ability to express a model in structural terms. That is, components are defined in terms of their structural parents (i.e., containers), interconnections, and compositions. Therefore, the present invention has the ability to graphically display the configured system along with its structural characteristics.

Figure 11:
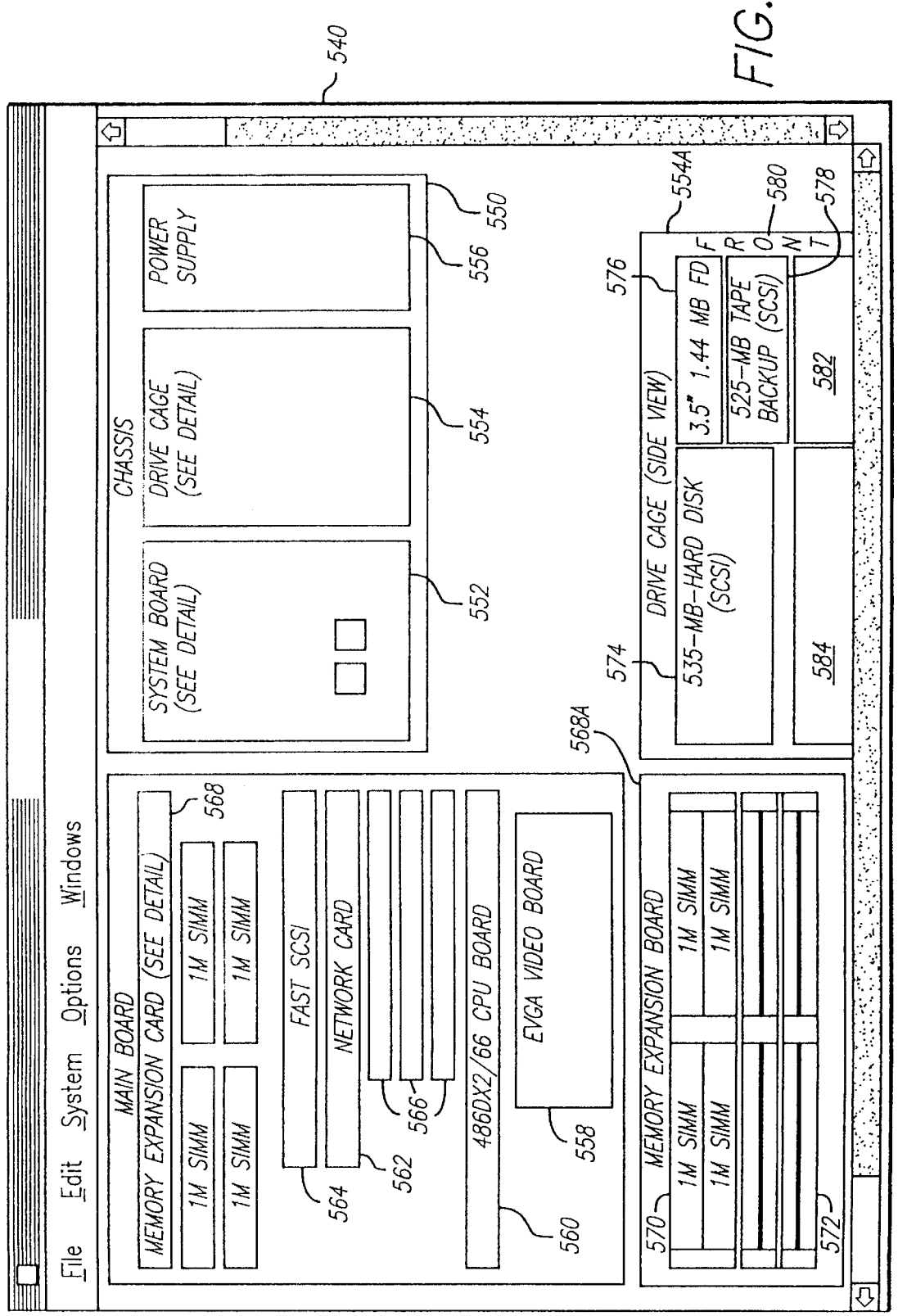
FIG. 11 illustrates a system window for a desktop computer system configuration.

The graphical depiction of the configured system and its structural characteristics, called the system window, provides a depiction of the general layout of the configured system. In the preferred embodiment, the system window for a model that configures computer systems shows the interior and front of all cabinets used in the system, and shows the placement of cards, power supplies, and storage devices. FIG. 11 illustrates a system window for a desktop computer system configuration. System Window 540 illustrates the configured system's components and their relative locations within the system. Chassis 550 contains System Board 552, DriveCage 554 and Power Supply 556. Main Board 552A is a detailed depiction of System Board 552.

Main Board 552A illustrates the physical placement of other components on the system board and their relative positions. For example, EVGA Video Board 558 is located below CPU Board 560. Further, the placement of Network Card 562 and FAST SCSI 564 in slots relative to CPU Board 560 can be determined from System Window 540. Free slots 566 can be viewed as being open and the closest slots to CPU Board 560. Memory Expansion Board 568A is a detailed depiction of Memory Expansion Card 568. 1M Simm chips 570 are located on Memory Exapansion Board 568A. Eight memory banks 572 remain unused. Drive Cage (Side View) 554A is a detailed depiction of the Drive Cage 554. 535 MB Hard Drive (SCSI) 574, 3.5" 1.44 MB FD 576, and a 525 MB Tape Backup (SCSI) 578 are contained within the Drive Cage 554. Front 580 indicates the location of the front side of Drive Cage (Side View) 554A. Therefore, 3.5" 1.44 MB FD 576 and 525 MB Tape Backup 578 have been configured to be front-accessible components. Bay 582 is a front-accessible bay that does not contain any device. Bay 584 is a free bay located in the back of the Drive Cage 554.

The system window further provides the ability to interactively edit the graphically rendered structures. The present invention provides the ability to modify the structural aspects of the configured system by adding, deleting or replacing components within a configured structure. The present invention further provides the ability to modify the configured structure by modifying the structural interconnections and compositions.

This capability to graphically display and edit can be used on a newly configured system, or an existing configuration, or system. That is, any upgrades to an existing configured system may be performed graphically. A "freeze and fill" capability allows the user to freeze some portion of the existing system, and fill, or modify the unfrozen portion. This "freeze and fill" capability further provides the ability to generate a quote for the new configuration that represents only those components added to the original configuration, and that incorporate any credit for the deleted or replaced components.

In the preferred embodiment, the list of materials, called the Bill of Materials (BOM) provides a list of all of the configured components and spare parts that are used in the system since the last request to configure the system. The part number and description is provided for each component and spare part.

In the preferred embodiment, the parts list provides information regarding additional components (i.e., spare parts), resource totals, failed requests, and failed optional requests. Resource totals provides a total of all components and resources requested directly from the user. Failed Requests and Failed Optional Requests are those component requests that could not be satisfied because of a lack of space, connector availability, etc.

QUOTER

The Quoter calculates the cost of the individual product packages and determines the cost of all product packages required to complete the system. The Quoter provides the ability to display the quote in various ways. For example, the quote may be displayed by product with the capability to expand or collapse the product information to show pricing for individual product parts or for the entire package, respectively. The way in which products are presented or prices are calculated may be customized.

We claim:

1. A method of generating a configuration for a system comprising the steps of:

defining in a computer system an element model consisting of elements used to configure said system and structural relationships between said elements in said model;

creating in said computer system a plurality of components of said system that are instances of one or more elements of said model in response to configuration requests.

2. The method of claim 1 such that said configuration requests are element requests, resource requests, and needs identifications.

3. The method of claim 1 including the step of generating by said computer system a Bill of Materials report containing a part number and description for each component and spare part in said system configuration, resource totals, failed requests, and failed optional requests.

4. The method of claim 1 further including the step of:

bundling by said computer system said elements of said system configuration into product groupings; and generating a price quotation for said system configuration.

5. The method of claim 1 further comprising the steps of:

identifying one or more of said plurality of components that can satisfy constraints of said plurality of components;

creating a second plurality of components to satisfy constraints if said constraints cannot be satisfied by said one or more of said plurality of components.

6. An article of manufacturing comprising:

a computer usable medium having computer readable program code embodied therein for generating a configuration for a system, said system configuration specifying a plurality of components that comprise said system comprising:

computer readable program code configured to cause a computer to receive a configuration request;

computer readable program code configured to cause a computer to create an instance of a component in said system configuration in response to said configuration request;

computer readable program code configured to cause a computer to satisfy a plurality of constraints of said component.

7. The article of manufacture of claim 6 wherein said configuration request is a request for a component.

8. The article of manufacture of claim 6 wherein said configuration request is a request that identifies a need in said system.

9. The article of manufacture of claim 6 wherein said configuration request is a request for a resource for said system.

10. The article of manufacture of claim 6 further comprising:

computer readable program code configured to cause a computer to define a model that includes a definition for each of a plurality of components selectable for inclusion in said system configuration and constraints on said plurality of components.

11. The article of manufacture of claim 10 wherein said computer readable code configured to cause a computer to create an instance of a component further comprises:

computer readable program code configured to cause a computer to examine said model to select said component using said component's definition in said model;

computer readable program code configured to cause a computer to create an instance of said component in said system configuration using said component's definition in said model.

12. The article of manufacture of claim 10 wherein said computer readable code configured to cause a computer to satisfy said plurality of constraints of said component further comprises:

computer readable program code configured to cause a computer to identify said plurality of constraints of said component by examining said model;

computer readable program code configured to cause a computer to identify one or more components of said system configuration satisfy said plurality of constraints;

computer readable program code configured to cause a computer to create a new component in said system configuration to satisfy said plurality of constraints if said system configuration cannot satisfy said plurality of constraints.

13. An article of manufacture comprising:

a computer usable medium having computer readable program code embodied therein for satisfying a constraint in a system configuration comprising:

computer readable program code configured to cause a computer to identify a component of said system configuration having a constraint;

computer readable program code configured to cause a computer to determine whether said system configuration can satisfy said constraint;

computer readable program code configured to cause a computer to create a new component in said system configuration to satisfy said constraint if said system configuration cannot satisfy said constraint.

14. The article of manufacture of claim 13 wherein said computer readable code configured to cause a computer to identify a component of said system configuration having a constraint further comprises:
   computer readable program code configured to cause a computer to define a model that includes definitions for a plurality of components selectable for inclusion in said system configuration and constraints on said plurality of components;
   computer readable program code configured to cause a computer to examine said model to determine whether said constraints on said plurality of components includes said constraint.

15. The article of manufacture of claim 13 wherein said computer readable code configured to cause a computer to determine whether said system configuration can satisfy said constraint further comprises:
   computer readable program code configured to cause a computer to examine said system configuration to determine whether another component of said system configuration is available to satisfy said constraint.

16. The article of manufacture of claim 15 wherein said computer readable code configured to cause a computer to examine said system configuration to determine whether another component of said system configuration is available to satisfy said constraint further comprises:
   computer readable program code configured to cause a computer to identify a destination component of said system configuration having available ports;
   computer readable program code configured to cause a computer to determine whether one of said available ports is compatible with a port of said component;
   computer readable program code configured to cause a computer to connect said one of said available ports with said port of said component if said compatibility exists.

17. The article to manufacture of claim 16 wherein said computer readable code configured to cause a computer to determine whether one of said available ports is compatible with a port of said component further comprises:
   computer readable program code configured to cause a computer to determine whether the physical type and logical type of said one of said available ports is compatible with said port of said component.

18. The article of manufacture of claim 16 wherein said computer readable code configured to cause a computer to determine whether one of said available ports is compatible with a port of said component further comprises:
   computer readable program code configured to cause a computer to determine whether a transfer path exists between said one of said available ports and said port of said component.

19. An article of manufacturing comprising:
   a computer usable medium having computer readable program code embodied therein for generating a configuration for a system comprising:
   computer readable program code configured to cause a computer to define a model that comprises a definition for each of a plurality of components available to inclusion in said system configuration;
   computer readable program code configured to cause a computer to examine said model to select one of said plurality of components using said definition in said model of said one of said plurality of components in response to a configuration request;
   computer readable program code configured to cause a computer to create an instance of said one of said plurality of components in said system configuration using said definition of said one of said plurality of components.

20. The article of manufacture of claim 19 further comprising:
   computer readable program code configured to cause a computer to satisfy a plurality of constraints of said one of said plurality of components.

21. The article of manufacture of claim 20 wherein said computer readable code configured to cause a computer to satisfy a plurality of constraints of said component further comprises:
   computer readable program code configured to cause a computer to identify said plurality of constraints of said component;
   computer readable program code configured to cause a computer to determine whether said system configuration can satisfy said plurality of constraints;
   computer readable program code configured to cause a computer to satisfy said plurality of constraints using at least one component of said system configuration when said system configuration can satisfy said plurality of constraints;
   computer readable program code configured to cause a computer to create a new component in said system configuration to satisfy said plurality of constraints if said system configuration cannot satisfy said plurality of constraints.

22. The article of manufacture of claim 21 wherein said definition for each of a plurality of components includes said plurality of constraints, said computer readable program code configured to cause a computer to identify said plurality of constraints of said component further comprises:
   computer readable program code configured to cause a computer to examine a definition of said component in said model to identify said plurality of constraints.

23. An article of manufacturing comprising:
   computer usable medium having computer readable program code embodied therein for generating a configuration for a system, said system configuration specifying a plurality of components of said system, said article of manufacturing comprising:
   computer readable program code configured to cause a computer to define a model that includes a definition for each of a plurality of components selectable for inclusion in said system configuration and constraints on said plurality of components;
   computer readable program code configured to cause a computer to receive a configuration request;
   computer readable program code configured to cause a computer to examine said model to select one of said plurality of components using said component's definition in said model in response to said configuration request;
   computer readable program code configured to cause a computer to create an instance of said one of said plurality of components in said system configuration using said component's definition in said model;
   computer readable program code configured to cause a computer to satisfy a plurality of constraints of said one of said plurality of components.

24. An article of manufacturing comprising:

a computer usable medium having computer readable program code embodied therein for generating a configuration for a system, said system configuration specifying a plurality of components that comprise said system, said article of manufacturing comprising:

computer readable program code configured to cause a computer to define a model that includes a definition for each of a plurality of components selectable for inclusion in said system configuration and constraints on said plurality of components, computer readable program code configured to cause a computer to receive a configuration request;

computer readable program code configured to cause a computer to create an instance of a component in said system configuration in response to said configuration request;

computer readable program code configured to cause a computer to identify a plurality of constraints of said component by examining said model;

computer readable program code configured to cause a computer to identify one or more components of said system configuration that can satisfy said plurality of constraints;

computer readable program code configured to cause a computer to create a new component in said system configuration to satisfy said plurality of constraints if said system configuration cannot satisfy said plurality of constraints.

25. An article of manufacturing comprising:

a computer usable medium having computer readable program code embodied therein for satisfying a constraint in a system configuration comprising:

computer readable program code configured to cause a computer to define a model that includes definitions for a plurality of components selectable for inclusion in said system configuration and constraints on said plurality of components;

computer readable program code configured to cause a computer to examine said model to determine whether a component of said system configuration has a constraint;

computer readable program code configured to cause a computer to determine whether said system configuration can satisfy said constraint;

computer readable program code configured to cause a computer to create a new component in said system configuration to satisfy said constraint if said system configuration cannot satisfy said constraint.

26. An article of manufacturing comprising:

a computer usable medium having computer readable program code embodied therein for satisfying a constraint in a system configuration comprising:

computer readable program code configured to cause a computer to identify a component of said system configuration having a constraint;

computer readable program code configured to cause a computer to examine said system configuration to determine whether another component of said system configuration is available to satisfy said constraint, computer readable program code configured to cause a computer to create a new component in said system configuration to satisfy said constraint if said system configuration cannot satisfy said constraint.

27. The article of manufacture of claim 26 wherein said computer readable code configured to cause a computer to examine said system configuration to determine whether another component of said system configuration is available to satisfy said constraint further comprises:

computer readable program code configured to cause a computer to identify a destination component of said system configuration having available ports;

computer readable program code configured to cause a computer to determine whether one of said available ports is compatible with a port of said component;

computer readable program code configured to cause a computer to connect said one of said available ports with said port of said component if said compatibility exists.

28. The article of manufacture of claim 27 wherein said computer readable code configured to cause a computer to determine whether one of said available ports is compatible with a port of said component further comprises:

computer readable program code configured to cause a computer to determine whether the physical type and logical type of said one of said available ports is compatible with said port of said component.

29. The article of manufacture of claim 27 wherein said computer readable code configured to cause a computer to determine whether one of said available ports is compatible with a port of said component further comprises:

computer readable program code configured to cause a computer to determine whether a transfer path exists between said one of said available ports and said port of said component.

30. A configuration apparatus comprising:

a central processing unit (CPU);

a modeling system coupled to said CPU, said modeling system configured to define a model having information about elements available for inclusion in a system configuration;

a configurator coupled to said CPU, said configurator configured to select a plurality of said elements of said model for inclusion in said system configuration in response to configuration requests.

31. The configuration apparatus of claim 30 wherein said model further comprises a plurality of product definitions, said configuration apparatus further comprising:

a bundling system configured to identify a plurality of products that comprise said plurality of said elements.

32. The configuration apparatus of claim 30 wherein said model contains a class hierarchy, said plurality of elements belonging to a class of said class hierarchy.

33. The configuration apparatus of claim 32 wherein said class hierarchy includes a plurality of component, composite, connector, container, and port classes.

34. The configuration apparatus of claim 32 wherein said class hierarchy is comprised of a plurality of connection, container and composite hierarchies.

35. The configuration apparatus of claim 34 wherein said container hierarchy is comprised of elements that are contained within other elements.

36. The configuration apparatus of claim 34 wherein said connection hierarchy is comprised of elements that are connectable to other elements.

37. The configuration apparatus of claim 34 wherein said composite hierarchy is comprised of elements as part of other elements.

38. In a computer system, a method of generating a configuration for a system comprising the steps of:

defining an element model consisting of elements used to configure a system and structural relationships between said elements in said model;

creating system a plurality of components of said system that are instances of one or more elements of said model in response to configuration requests;

generating a Bill of Materials report containing a part number and description for each component and spare part in said system configuration, resource totals, failed requests, and failed optional requests.

39. In a computer system, a method of generating a configuration for a system comprising the steps of:

defining an element model consisting of elements used to configure said system and structural relationships between said elements in said model;

creating a plurality of components of said system that are instances of one or more elements of said model in response to configuration requests;

bundling said elements of said system configuration into product groupings;

generating a price quotation for said system configuration.

40. In a computer system, a method of generating a configuration for a system comprising the steps of:

defining an element model consisting of elements used to configure said system and structural relationships between said elements in said model;

creating a plurality of components of said system that are instances of one or more elements of said model in response to configuration requests;

identifying one or more of said plurality of components that can satisfy constraints of said plurality of components;

creating a second plurality of components to satisfy constraints if said constraints cannot be satisfied by said one or more of said plurality of components.

41. An article of manufacture comprising:

a computer usable medium having computer readable program code embodied therein for generating a configuration for a system, said system configuration specifying a plurality of components that comprise said system comprising:

computer readable program code configured to cause a computer to define a model that includes a definition for each of a plurality of components selectable for inclusion in said system configuration and constraints on said plurality of components, computer readable program code configured to cause a computer to receive a configuration request;

computer readable program code configured to cause a computer to create an instance of a component in said system configuration in response to said configuration request;

computer readable program code configured to cause a computer to satisfy a plurality of constraints of said component.

42. The article of manufacture of claim 41 wherein said computer readable code configured to cause a computer to create an instance of a component further comprises:

computer readable program code configured to cause a computer to examine said model to select said component using said component's definition in said model;

computer readable program code configured to cause a computer to create an instance of said component in said system configuration using said component's definition in said model.

43. The article of manufacture of claim 41 wherein said computer readable code configured to cause a computer to satisfy said plurality of constraints of said component further comprises:

computer readable program code configured to cause a computer to identify said plurality of constraints of said component by examining said model;

computer readable program code configured to cause a computer to identify one or more components of said system configuration satisfy said plurality of constraints;

computer readable program code configured to cause a computer to create a new component in said system configuration to satisfy said plurality of constraints if said system configuration cannot satisfy said plurality of constraints.

44. An article of manufacture comprising:

a computer usable medium having computer readable program code embodied therein for satisfying a constraint in a system configuration comprising:

computer readable program code configured to cause a computer to define a model that includes definitions for a plurality of components selectable for inclusion in said system configuration and constraints on said plurality of components;

computer readable program code configured to cause a computer to examine said model to determine whether a definition of said component in said model identifies a constraint;

computer readable program code configured to cause a computer to determine whether said system configuration can satisfy said constraint;

computer readable program code configured to cause a computer to create a new component in said system configuration to satisfy said constraint if said system configuration cannot satisfy said constraint.

45. An article of manufacture comprising:

a computer usable medium having computer readable program code embodied therein for satisfying a constraint in a system configuration comprising:

computer readable program code configured to cause a computer to identify a destination component of said system configuration having available ports;

computer readable program code configured to cause a computer to examine said system configuration to determine whether a component of said system configuration is available to satisfy said constraint, computer readable program code configured to cause a computer to create a new component in said system configuration to satisfy said constraint if said system configuration cannot satisfy said constraint.

46. The article of manufacture of claim 45 wherein said computer readable code configured to cause a computer to examine said system configuration to determine whether another component of said system configuration is available to satisfy said constraint further comprises:

computer readable program code configured to cause a computer to identify a destination component of said system configuration having available ports;

computer readable program code configured to cause a computer to determine whether one of said available ports is compatible with a port of said component;

computer readable program code configured to cause a computer to connect said one of said available ports with said port of said component if said compatibility exists.

47. The article of manufacture of claim 46 wherein said computer readable code configured to cause a computer to determine whether one of said available ports is compatible with a port of said component further comprises:

computer readable program code configured to cause a computer to determine whether the physical type and logical type of said one of said available ports is compatible with said port of said component.

48. The article of manufacture of claim 46 wherein said computer readable code configured to cause a computer to determine whether one of said available ports is compatible with a port of said component further comprises:

computer readable program code configured to cause a computer to determine whether a transfer path exists between said one of said available ports and said port of said component.

49. An article of manufacture comprising:

a computer usable medium having computer readable program code embodied therein for generating a configuration for a system comprising:

computer readable program code configured to cause a computer to define a model that comprises a definition for each of a plurality of components available for inclusion in said system configuration;

computer readable program code configured to cause a computer to examine said model to select one of said plurality of components using said definition in said model of said one of said plurality of components in response to a configuration request;

computer readable program code configured to cause a computer to create an instance of said one of said plurality of components in said system configuration using said definition of said one of said plurality of components; and computer readable program code configured to cause a computer to satisfy a plurality of constraints of said one of said plurality of components.

50. The article of manufacture of claim 49 wherein said computer readable code configured to cause a computer to satisfy a plurality of constraints of said component further comprises:

computer readable program code configured to cause a computer to identify said plurality of constraints of said component;

computer readable program code configured to cause a computer to determine whether said system configuration can satisfy said plurality of constraints;

computer readable program code configured to cause a computer to satisfy said plurality of constraints using at least one component of said system configuration when said system configuration can satisfy said plurality of constraints;

computer readable program code configured to cause a computer to create a new component in said system configuration to satisfy said plurality of constraints if said system configuration cannot satisfy said plurality of constraints.

51. The article of manufacturing of claim 50 wherein said definition for each of a plurality of components includes said plurality of constraints, said computer readable program code configured to cause a computer to identify said plurality of constraints of said component further comprises:

computer readable program code configured to cause a computer to examine a definition of said component in said model to identify said plurality of constraints.

52. An article of manufacturing comprising:

a computer usable medium having computer readable program code embodied therein for satisfying a constraint in a system configuration comprising:

computer readable program code configured to cause a computer to identify a component of said system configuration having a connection constraint;

computer readable program code configured to cause a computer to identify a destination component of said system configuration having available ports;

computer readable program code configured to cause a computer to determine whether one of said available ports is compatible with a port of said component;

computer readable program code configured to cause a computer to connect said one of said available ports with said port of said component if said compatibility exists, computer readable program code configured to cause a computer to create a new component in said system configuration to satisfy said connection constraint if said system configuration cannot satisfy said connection constraint.

53. The article of manufacture of claim 52 wherein said computer readable code configured to cause a computer to determine whether one of said available ports is compatible with a port of said component further comprises:

computer readable program code configured to cause a computer to determine whether the physical type and logical type of said one of said available ports is compatible with said port of said component.

54. The article of manufacture of claim 52 wherein said computer readable code configured to cause a computer to determine whether one of said available ports is compatible with a port of said component further comprises:

computer readable program code configured to cause a computer to determine whether a transfer path exists between said one of said available ports and said port of said component.

* * * * *

US006002854C1

(12) EX PARTE REEXAMINATION CERTIFICATE (9395th)
United States Patent
Lynch et al.

(10) Number: US 6,002,854 C1
(45) Certificate Issued: *Nov. 5, 2012

(54) METHOD AND APPARATUS FOR CONFIGURING SYSTEMS

(75) Inventors: John Lynch, Austin, TX (US); David Franke, Austin, TX (US)

(73) Assignee: Versata Development Group, Inc., Austin, TX (US)

Reexamination Request:
No. 90/010,173, May 22, 2008

Reexamination Certificate for:
Patent No.: 6,002,854
Issued: Dec. 14, 1999
Appl. No.: 08/815,399
Filed: Mar. 10, 1997

( * ) Notice: This patent is subject to a terminal disclaimer.

Related U.S. Application Data

(63) Continuation of application No. 08/484,947, filed on Jun. 7, 1995, now Pat. No. 5,708,798, which is a continuation of application No. 08/039,949, filed on Mar. 29, 1993, now Pat. No. 5,515,524.

(51) Int. Cl.
*G06F 17/50* (2006.01)
(52) U.S. Cl. .................. 703/1; 703/2; 703/6; 703/13
(58) Field of Classification Search .................. None
See application file for complete search history.

(56) References Cited

To view the complete listing of prior art documents cited during the proceeding for Reexamination Control Number 90/010,173, please refer to the USPTO's public Patent Application Information Retrieval (PAIR) system under the Display References tab.

*Primary Examiner* — William H. Wood

(57) ABSTRACT

The present invention employs a generative approach for configuring systems such that a system may be configured based on component or resource requests, or input in the form of need. The present invention provides a constraint-based configuration system using a structural model hierarchy. The structural aspects of the model provide the ability to define a model element as being contained in, or by, another model element. In addition, the structural model provides the ability to identify logical datatype and physical interconnections between elements and establish connections between elements. To configure a system, the present invention accepts input in the form of requests (e.g., component or resource) or needs, such as an expression of a need for a desktop computer system to be used in a CAD (i.e., computer-aided design) environment. Using this information, the present invention configures a system by identifying the resource and component needs, constraints imposed on or by the resources or components identified, and the structural aspects of the system.

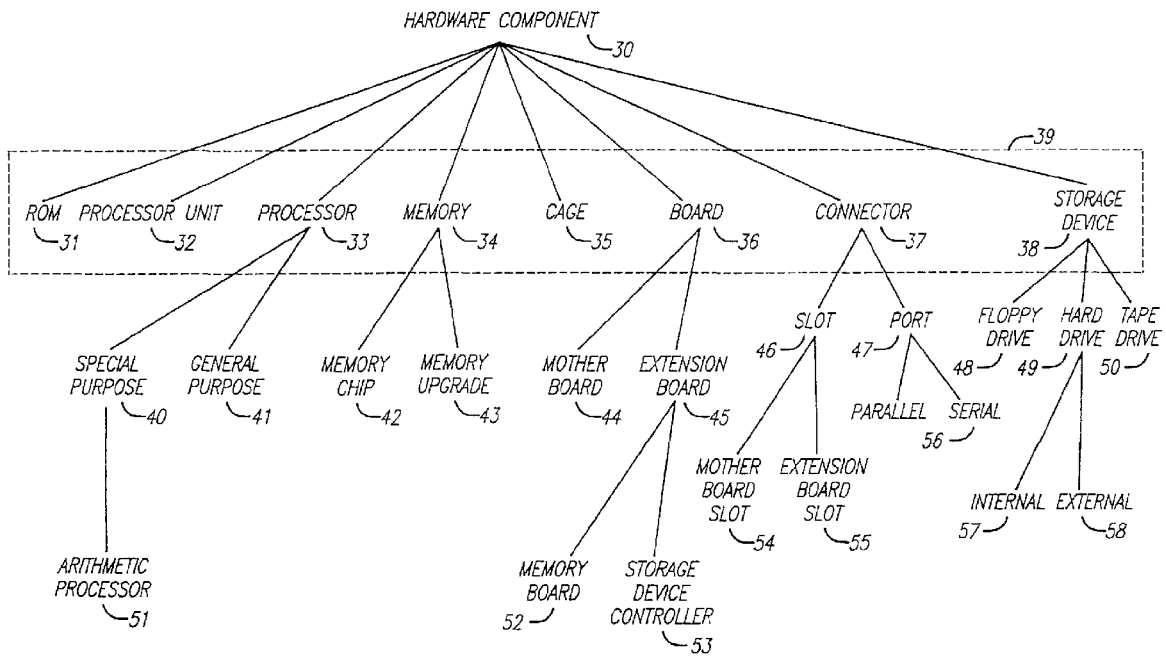

US 6,002,854 C1

EX PARTE
REEXAMINATION CERTIFICATE
ISSUED UNDER 35 U.S.C. 307

THE PATENT IS HEREBY AMENDED AS
INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 6, 13, 19, 23-26, 30, 39, 40, 41, 44, 45 and 49 are determined to be patentable as amended.

Claims 2, 4-5, 7-12, 14-15, 20-22, 31-37, 42, 43, 50 and 51, dependent on an amended claim, are determined to be patentable.

New claims 55-98 and 99 are added and determined to be patentable.

Claims 3, 16-18, 27-29, 38, 46-48, 52-53 and 54 were not reexamined.

1. A method of generating a configuration for a system comprising the steps of:
   defining in a computer system an element model consisting of elements used to configure said system and structural relationships between said elements in said model *wherein said elements comprise (i) only one container base class, (ii) one or more container derived classes, and (iii) one or more container component types, and wherein all container classes and container component types descend from said container base class*; and
   creating in said computer system a plurality of components of said system that are instances of one or more elements of said model in response to configuration requests, *wherein a first of said components is derived from said container base class to allow a second component to be contained by said first component and creating in said computer system a plurality of components further comprises creating said second component and instantiating a 'contained by' relationship indication between said second component and said first component.*

6. An article of manufacture comprising:
   a computer usable medium having computer readable program code embodied therein for generating a configuration for a system, said system configuration specifying a plurality of components that comprise said system comprising:
      computer readable program code configured to cause a computer to receive a configuration request;
      computer readable program code configured to cause a computer to create an instance of a component in said system configuration in response to said configuration request;
      computer readable program code configured to cause a computer to satisfy a plurality of constraints of said component;
      *computer readable program code comprising (i) only one container base class, (ii) one or more container derived classes, and (iii) one or more container component types, and wherein all container classes and container component types descend from said container base class; and*
      *computer readable program code configured to cause a computer to (i) create an instance of a first component that is derived from said container base class, (ii) create an instance of a second component as contained by said instance of said first component, and (iii) instantiate a 'contained by' relationship indication between a second component and said first component.*

13. An article of manufacture comprising:
    a computer usable medium having computer readable program code embodied therein for satisfying a constraint in a system configuration comprising:
       computer readable program code configured to cause a computer to identify a component of said system configuration having a constraint;
       computer readable program code configured to cause a computer to determine whether said system configuration can satisfy said constraint;
       computer readable program code configured to cause a computer to create a new component in said system configuration to satisfy said constraint if said system configuration cannot satisfy said constraint*;*
       *computer readable program code comprising (i) only one container base class, (ii) one or more container derived classes, and (iii) one or more container component types, and wherein all container classes and container component types descend from said container base class; and*
       *computer readable program code configured to cause a computer to (i) create an instance of a first component that is derived from said container base class, (ii) create an instance of a second component as contained by said instance of said first component, and (iii) instantiate a 'contained by' relationship indication between a second component and said first component.*

19. An article of manufacturing comprising:
    a computer usable medium having computer readable program code embodied therein for generating a configuration for a system comprising:
       computer readable program code configured to cause a computer to define a model that comprises a definition for each of a plurality of components available to inclusion in said system configuration;
       computer readable program code configured to cause a computer to examine said model to select one of said plurality of components using said definition in said model of said one of said plurality of components in response to a configuration request;
       computer readable program code configured to cause a computer to create an instance of said one of said plurality of components in said system configuration using said definition of said one of said plurality of components*;*
       *computer readable program code comprising (i) only one container base class, (ii) one or more container derived classes, and (iii) one or more container component types, and wherein all container classes and container component types descend from said container base class; and*
       *computer readable program code configured to cause a computer to (i) create an instance of a first component that is derived from said container base class, (ii) create an instance of a second component as contained by said instance of said first component, and (iii) instantiate a 'contained by' relationship indication between a second component and said first component.*

23. An article of manufacturing comprising:
computer usable medium having computer readable program code embodied therein for generating a configuration for a system, said system configuration specifying a plurality of components of said system, said article of manufacturing comprising:
  computer readable program code configured to cause a computer to define a model that includes a definition for each of a plurality of components selectable for inclusion in said system configuration and constraints on said plurality of components;
  computer readable program code configured to cause a computer to receive a configuration request;
  computer readable program code configured to cause a computer to examine said model to select one of said plurality of components using said component's definition in said model in response to said configuration request;
  computer readable program code configured to cause a computer to create an instance of said one of said plurality of components in said system configuration using said component's definition in said model;
  computer readable program code configured to cause a computer to satisfy a plurality of constraints of said one of said plurality of components;
  *computer readable program code comprising (i) only one container base class, (ii) one or more container derived classes, and (iii) one or more container component types, and wherein all container classes and container component types descend from said container base class; and*
  *computer readable program code configured to cause a computer to (i) create an instance of a first component that is derived from said container base class, (ii) create an instance of a second component as contained by said instance of said first component, and (iii) instantiate a 'contained by' relationship indication between a second component and said first component.*

24. An article of manufacturing comprising:
a computer usable medium having computer readable program code embodied therein for generating a configuration for a system, said system configuration specifying a plurality of components that comprise said system, said article of manufacturing comprising:
  computer readable program code configured to cause a computer to define a model that includes a definition for each of a plurality of components selectable for inclusion in said system configuration and constraints on said plurality of components,
  computer readable program code configured to cause a computer to receive a configuration request;
  computer readable program code configured to cause a computer to create an instance of a component in said system configuration in response to said configuration request;
  computer readable program code configured to cause a computer to identify a plurality of constraints of said component by examining said model;
  computer readable program code configured to cause a computer to identify one or more components of said system configuration that can satisfy said plurality of constraints;
  computer readable program code configured to cause a computer to create a new component in said system configuration to satisfy said plurality of constraints if said system configuration cannot satisfy said plurality of constraints;
  *computer readable program code comprising (i) only one container base class, (ii) one or more container derived classes, and (iii) one or more container component types, and wherein all container classes and container component types descend from said container base class; and*
  *computer readable program code configured to cause a computer to (i) create an instance of a first component that is derived from said container base class, (ii) create an instance of a second component as contained by said instance of said first component, and (iii) instantiate a 'contained by' relationship indication between a second component and said first component.*

25. An article of manufacturing comprising:
a computer usable medium having computer readable program code embodied therein for satisfying a constraint in a system configuration comprising:
  computer readable program code configured to cause a computer to define a model that includes definitions for a plurality of components selectable for inclusion in said system configuration and constraints on said plurality of components;
  computer readable program code configured to cause a computer to examine said model to determine whether a component of said system configuration has a constraint;
  computer readable program code configured to cause a computer to determine whether said system configuration can satisfy said constraint;
  computer readable program code configured to cause a computer to create a new component in said system configuration to satisfy said constraint if said system configuration cannot satisfy said constraint;
  *computer readable program code comprising (i) only one container base class, (ii) one or more container derived classes, and (iii) one or more container component types, and wherein all container classes and container component types descend from said container base class; and*
  *computer readable program code configured to cause a computer to (i) create an instance of a first component that is derived from said container base class, (ii) create an instance of a second component as contained by said instance of said first component, and (iii) instantiate a 'contained by' relationship indication between a second component and said first component.*

26. An article of manufacturing comprising:
a computer usable medium having computer readable program code embodied therein for satisfying a constraint in a system configuration comprising:
  computer readable program code configured to cause a computer to identify a component of said system configuration having a constraint;
  computer readable program code configured to cause a computer to examine said system configuration to determine whether another component of said system configuration is available to satisfy said constraint,
  computer readable program code configured to cause a computer to create a new component in said system configuration to satisfy said constraint if said system configuration cannot satisfy said constraint;

computer readable program code comprising (i) *only one container base class*, (ii) *one or more container derived classes, and* (iii) *one or more container component types, and wherein all container classes and container component types descend from said container base class;* and computer readable program code configured to cause a computer to (i) create an instance of a *first* component that is derived from said container base class, (ii) create an instance of a second component as contained by said instance of said first component, and (iii) instantiate a 'contained by' relationship indication between a second component and said first component.

30. A configuration apparatus comprising:
a central processing unit (CPU);
a modeling system coupled to said CPU, said modeling system configured to define a model having information about elements available for inclusion in a system configuration; *wherein said modeling system includes* (i) *only one container base class,* (ii) *one or more container derived classes, and* (iii) *one or more container component types, and wherein all container classes and container component types descend from said container base class*;
a configurator coupled to said CPU, said configurator configured to select a plurality of said elements of said model for inclusion in said system configuration in response to configuration requests *and further configured to select a first element of said model for inclusion in said system that is derived from said container base class to allow a second element to be contained by said first element and to select said second element for inclusion in said system and contained by said first element.*

39. In a computer system, a method of generating a configuration for a system comprising the steps of:
*performing by said computer system:*
defining an element model consisting of elements used to configure said system and structural relationships between said elements in said model, *wherein said element model includes* (i) *only one container base class,* (ii) *one or more container derived classes, and* (iii) *one or more container component types, and wherein all container classes and container component types descend from said container base class*;
creating a plurality of components of said system that are instances of one or more elements of said model in response to configuration requests *including creating an instance of a first component that is derived from said container base class to allow an instance of a second component to be contained by said first component and instantiating a 'contained by' relationship indication between said instance of said second component and said instance of said first component*;
bundling said elements of said system configuration into product groupings;
generating a price quotation for said system configuration.

40. In a computer system, a method of generating a configuration for a system comprising the steps of:
*performing by said computer system:*
defining an element model consisting of elements used to configure said system and structural relationships between said elements in said model, *wherein said element model includes* (i) *only one container base class,* (ii) *one or more container derived classes, and* (iii) *one or more container component types, and wherein all container classes and container component types descend from said container base class*;
creating a plurality of components of said system that are instances of one or more elements of said model in response to configuration requests *including creating an instance of a first component that is derived from said container base class to allow an instance of a second component to be contained by said first component and instantiating a 'contained by' relationship indication between said instance of said second component and said instance of said first component*;
identifying one or more of said plurality of components that can satisfy constraints of said plurality of components;
creating a second plurality of components to satisfy constraints if said constraints cannot be satisfied by said one or more of said plurality of components.

41. An article of manufacturing comprising:
a computer usable medium having computer readable program code embodied therein for generating a configuration for a system, said system configuration specifying a plurality of components that comprise said system comprising:
computer readable program code configured to cause a computer to define a model that includes a definition for each of a plurality of components selectable for inclusion in said system configuration and constraints on said plurality of components, *wherein said model includes* (i) *only one container base class,* (ii) *one or more container derived classes, and* (iii) *one or more container component types, and wherein all container classes and container component types descend from said container base class;*
computer readable program code configured to cause a computer to receive a configuration request;
computer readable program code configured to cause a computer to create an instance of a *first* component in said system configuration in response to said configuration request *wherein said instance of said first component is derived from said container base class to allow an instance of a second component to be contained by said first component;*
*computer readable code configured to cause a computer to create an instance of a second component that is contained by said first component;*
*computer readable code configured to cause a computer to instantiate a 'contained by' relationship indication between said instance of said second component and said instance of said first component*;
computer readable program code configured to cause a computer to satisfy a plurality of constraints of said component.

44. An article of manufacturing comprising:
a computer usable medium having computer readable program code embodied therein for satisfying a constraint in a system configuration comprising:
computer readable program code configured to cause a computer to define a model that includes definitions for a plurality of components selectable for inclusion in said system configuration and constraints on said plurality of components, *wherein said model includes* (i) *only one container base class,* (ii) *one or more container derived classes, and* (iii) *one or more container component types, and wherein all container classes and container component types descend from said container base class*;

computer readable program code configured to cause a computer to examine said model to determine whether a definition of said component in said model identifies a constraint;

computer readable program code configured to cause a computer to determine whether said system configuration can satisfy said constraint;

computer readable program code configured to cause a computer to create a new component in said system configuration to satisfy said constraint if said system configuration cannot satisfy said constraint;

*computer readable program code configured to cause a computer to create an instance of a first component in said system configuration in response to said configuration request wherein said instance of said first component is derived from said container base class to allow an instance of a second component to be contained by said first component; and*

*computer readable code configured to cause a computer to create an instance of a second component that is contained by said first component.*

45. An article of manufacturing comprising:

a computer usable medium having computer readable program code embodied therein for satisfying a constraint in a system configuration *wherein said computer readable program code includes (i) only one container base class, (ii) one or more container derived classes, and (iii) one or more container component types, and wherein all container classes and container component types descend from said container base class*, said computer readable program code further comprising:

computer readable program code configured to cause a computer to identify a destination component of said system configuration having available ports;

computer readable program code configured to cause a computer to examine said system configuration to determine whether a component of said system configuration is available to satisfy said constraint, computer readable program code configured to cause a computer to create a new component in said system configuration to satisfy said constraint if said system configuration cannot satisfy said constraint;

*computer readable program code configured to cause a computer to create an instance of a first component in said system configuration in response to said configuration request wherein said instance of said first component is derived from said container base class to allow an instance of a second component to be contained by said first component; and*

*computer readable code configured to cause a computer to create an instance of a second component that is contained by said first component.*

49. An article of manufacture comprising:

a computer usable medium having computer readable program code embodied therein for generating a configuration for a system comprising:

computer readable program code configured to cause a computer to define a model that comprises a definition for each of a plurality of components available for inclusion in said system configuration, *wherein said model includes (i) only one container base class, (ii) one or more container derived classes, and (iii) one or more container component types, and wherein all container classes and container component types descend from said container base class*;

computer readable program code configured to cause a computer to examine said model to select one of said plurality of components using said definition in said model of said one of said plurality of components in response to a configuration request;

computer readable program code configured to cause a computer to create an instance of said one of said plurality of components in said system configuration using said definition of said one of said plurality of components; [and]

computer readable program code configured to cause a computer to satisfy a plurality of constraints of said one of said plurality of components;

*computer readable program code configured to cause a computer to create an instance of a first component in said system configuration in response to said configuration request wherein said instance of said first component is derived from said container base class to allow an instance of a second component to be contained by said first component; and*

*computer readable code configured to cause a computer to create an instance of a second component that is contained by said first component.*

*55. The method of claim 1 wherein one of said elements further comprises (i) only one composite base class, (i) one or more composite derived classes, and (iii) one or more composite component types, and wherein all composite classes and composite component types descend from said composite base class, a third component of said components is derived from said composite base class to allow a fourth component to be a child of said third component and creating in said computer system a plurality of components further comprises creating said fourth component as a child of said third component.*

*56. The method of claim 1 wherein one of said elements further comprises (i) only one port base class, (ii) one or more port derived classes, and (iii) one or more port component types, and wherein all port classes and port component types descend from said port base class, a third component of said components is derived from said port base class to allow a fourth component to connect with said third component, and creating in said computer system a plurality of components further comprises creating said fourth component as connected with said third component.*

*57. The method of claim 1 wherein:*

*one of said elements further comprises (i) only one composite base class, (ii) one or more composite derived classes, and (iii) one or more composite component types, and wherein all composite classes and composite component types descend from said composite base class, a third component of said components is derived from said composite base class to allow a fourth component to be a child of said third component, and creating in said computer system a plurality of components further comprises creating said fourth component as a child of said third component; and*

*one of said elements further comprises (i) only one port base class, (ii) one or more port derived classes, and (iii) one or more port component types, and wherein all port classes and port component types descend from said port base class and a fifth component of said components is derived from said port base class to allow a sixth component to connect with said fifth component and creating in said computer system a plurality of components further comprises creating said sixth component as connected with said fifth component.*

*58. The article of manufacturing of claim 6 further comprising:* computer readable program code comprising (i) only one composite base class, (ii) one or more composite derived classes, and (iii) one or more composite component types, and wherein all composite classes and composite component types descend from said composite base class; and computer readable program code configured to cause a computer to (i) create an instance of a third component that is derived from said composite base class to allow an instance of a fourth component to be a child of said instance of said third component and (ii) create said instance of said fourth component as a child of said instance of said third component.

59. The article of manufacturing of claim 6 further comprising:

computer readable program code comprising a port base class; and computer readable program code configured to cause a computer to (i) create an instance of a third component that is derived from said port base class to allow an instance of a fourth component to connect with said instance of said third component and (ii) create said instance of said fourth component connected with said instance of said third component.

60. The article of manufacturing of claim 6 further comprising:

computer readable program code comprising a composite base class;

computer readable program code configured to cause a computer to (i) create an instance of a third component that is derived from said composite base class to allow an instance of a fourth component to be a child of said instance of said third component and (ii) create said instance of said fourth component as a child of said instance of said third component;

computer readable program code comprising a port base class; and computer readable program code configured to cause a computer to (i) create an instance of a fifth component that is derived from said port base class to allow an instance of a sixth component to connect with said instance of said fifth component and (ii) create said instance of said sixth component connected with said instance of said fifth component.

61. The article of manufacturing of claim 13 further comprising:

computer readable program code comprising (i) only one composite base class, (ii) one or more composite derived classes, and (iii) one or more composite component types, and wherein all composite classes and composite component types descend from said composite base class; and computer readable program code configured to cause a computer to (i) create an instance of a third component that is derived from said composite base class to allow an instance of a fourth component to be a child of said instance of said third component and (ii) create said instance of said fourth component as a child of said instance of said third component.

62. The article of manufacturing of claim 13 further comprising:

computer readable program code comprising a port base class; and computer readable program code configured to cause a computer to (i) create an instance of a third component that is derived from said port base class to allow an instance of a fourth component to connect with said instance of said third component and (ii) create said instance of said fourth component connected with said instance of said third component.

63. The article of manufacturing of claim 13 further comprising:

computer readable program code comprising a composite base class;

computer readable program code configured to cause a computer to (i) create an instance of a third component that is derived from said composite base class to allow an instance of a fourth component to be a child of said instance of said third component and (ii) create said instance of said fourth component as a child of said instance of said third component;

computer readable program code comprising a port base class; and computer readable program code configured to cause a computer to (i) create an instance of a fifth component that is derived from said port base class to allow an instance of a sixth component to connect with said instance of said fifth component and (ii) create said instance of said sixth component connected with said instance of said fifth component.

64. The article of manufacturing of claim 19 further comprising:

computer readable program code comprising (i) only one composite base class, (ii) one or more composite derived classes, and (iii) one or more composite component types, and wherein all composite classes and composite component types descend from said composite base class; and computer readable program code configured to cause a computer to (i) create an instance of a third component that is derived from said composite base class to allow an instance of a fourth component to be a child of said instance of said third component and (ii) create said instance of said fourth component as a child of said instance of said third component.

65. The article of manufacturing of claim 19 further comprising:

computer readable program code comprising a port base class; and computer readable program code configured to cause a computer to (i) create an instance of a third component that is derived from said port base class to allow an instance of a fourth component to connect with said instance of said third component and (ii) create said instance of said fourth component connected with said instance of said third component.

66. The article of manufacturing of claim 19 further comprising:

computer readable program code comprising a composite base class;

computer readable program code configured to cause a computer to (i) create an instance of a third component that is derived from said composite base class to allow an instance of a fourth component to be a child of said instance of said third component and (ii) create said instance of said fourth component as a child of said instance of said third component;

computer readable program code comprising a port base class; and computer readable program code configured to cause a computer to (i) create an instance of a fifth component that is derived from said port base class to allow an instance of a sixth component to connect with said instance of said fifth component and (ii) create said instance of said sixth component connected with said instance of said fifth component.

67. The article of manufacturing of claim 23 further comprising:

computer readable program code comprising (i) only one composite base class, (ii) one or more composite derived classes, and (iii) one or more composite component types, and wherein all composite classes and composite component types descend from said composite base class; and computer readable program code configured to cause a computer to (i) create an instance of a third component that is derived from said composite base class to allow an instance of a fourth component to be a child of said instance of said third component and (ii) create said instance of said fourth component as a child of said instance of said third component.

68. The article of manufacturing of claim 23 further comprising:

computer readable program code comprising a port base class; and computer readable program code configured to cause a computer to (i) create an instance of a third component that is derived from said port base class to allow an instance of a fourth component to connect with said instance of said third component and (ii) create said instance of said fourth component connected with said instance of said third component.

69. The article of manufacturing of claim 23 further comprising:

computer readable program code comprising a composite base class;

computer readable program code configured to cause a computer to (i) create an instance of a third component that is derived from said composite base class to allow an instance of a fourth component to be a child of said instance of said third component and (ii) create said instance of said fourth component as a child of said instance of said third component;

computer readable program code comprising a port base class; and computer readable program code configured to cause a computer to (i) create an instance of a fifth component that is derived from said port base class to allow an instance of a sixth component to connect with said instance of said fifth component and (ii) create said instance of said sixth component connected with said instance of said fifth component.

70. The article of manufacturing of claim 24 further comprising:

computer readable program code comprising (i) only one composite base class, (ii) one or more composite derived classes, and (iii) one or more composite component types, and wherein all composite classes and composite component types descend from said composite base class; and computer readable program code configured to cause a computer to (i) create an instance of a third component that is derived from said composite base class to allow an instance of a fourth component to be a child of said instance of said third component and (ii) create said instance of said fourth component as a child of said instance of said third component.

71. The article of manufacturing of claim 24 further comprising:

computer readable program code comprising a port base class; and computer readable program code configured to cause a computer to (i) create an instance of a third component that is derived from said port base class to allow an instance of a fourth component to connect with said instance of said third component and (ii) create said instance of said fourth component connected with said instance of said third component.

72. The article of manufacturing of claim 24 further comprising:

computer readable program code comprising a composite base class;

computer readable program code configured to cause a computer to (i) create an instance of a third component that is derived from said composite base class to allow an instance of a fourth component to be a child of said instance of said third component and (ii) create said instance of said fourth component as a child of said instance of said third component;

computer readable program code comprising a port base class; and computer readable program code configured to cause a computer to (i) create an instance of a fifth component that is derived from said port base class to allow an instance of a sixth component to connect with said instance of said fifth component and (ii) create said instance of said sixth component connected with said instance of said fifth component.

73. The article of manufacturing of claim 25 further comprising:

computer readable program code comprising (i) only one composite base class, (ii) one or more composite derived classes, and (iii) one or more composite component types, and wherein all composite classes and composite component types descend from said composite base class; and computer readable program code configured to cause a computer to (i) create an instance of a third component that is derived from said composite base class to allow an instance of a fourth component to be a child of said instance of said third component and (i) create said instance of said fourth component as a child of said instance of said third component.

74. The article of manufacturing of claim 25 further comprising:

computer readable program code comprising a port base class; and computer readable program code configured to cause a computer to (i) create an instance of a third component that is derived from said port base class to allow an instance of a fourth component to connect with said instance of said third component and (ii) create said instance of said fourth component connected with said instance of said third component.

75. The article of manufacturing of claim 25 further comprising:

computer readable program code comprising a composite base class;

computer readable program code configured to cause a computer (i) create an instance of a third component that is derived from said composite base class to allow an instance of a fourth component to be a child of said instance of said third component and (ii) create said instance of said fourth component as a child of said instance of said third component;

computer readable program code comprising a port base class; and computer readable program code configured to cause a computer to (i) create an instance of a fifth component that is derived from said port base class to allow an instance of a sixth component to connect with said instance of said fifth component and (ii) create said instance of said sixth component connected with said instance of said fifth component.

76. The article of manufacturing of claim 26 further comprising:
computer readable program code comprising (i) only one composite base class, (ii) one or more composite derived classes, and (iii) one or more composite component types, and wherein all composite classes and composite component types descend from said composite base class; and
computer readable program code configured to cause a computer to (i) create an instance of a third component that is derived from said composite base class to allow an instance of a fourth component to be a child of said instance of said third component and (ii) create said instance of said fourth component as a child of said instance of said third component.

77. The article of manufacturing of claim 26 further comprising:
computer readable program code comprising a port base class; and
computer readable program code configured to cause a computer to (i) create an instance of a third component that is derived from said port base class to allow an instance of a fourth component to connect with said instance of said third component and (ii) create said instance of said fourth component connected with said instance of said third component.

78. The article of manufacturing of claim 26 further comprising:
computer readable program code comprising a composite base class;
computer readable program code configured to cause a computer to (i) create an instance of a third component that is derived from said composite base class to allow an instance of a fourth component to be a child of said instance of said third component and (ii) create said instance of said fourth component as a child of said instance of said third component;
computer readable program code comprising a port base class; and
computer readable program code configured to cause a computer to (i) create an instance of a fifth component that is derived from said port base class to allow an instance of a sixth component to connect with said instance of said fifth component and (ii) create said instance of said sixth component connected with said instance of said fifth component.

79. The configuration apparatus of claim 30 wherein:
said modeling system further includes (i) only one composite base class, (ii) one or more composite derived classes, and (iii) one or more composite component types, and wherein all composite classes and composite component types descend from said composite base class; and
said configurator is further configured to select a third element of said model for inclusion in said system that is derived from said composite base class to allow a fourth element to be a child of said third element and to select said fourth element for inclusion in said system to be a child of said third element.

80. The configuration apparatus of claim 30 wherein:
said modeling system further includes (i) only one port base class, (ii) one or more port derived classes, and (iii) one or more port component types, and wherein all port classes and port component types descend from said port base class; and
said configurator is further configured to select a third element of said model for inclusion in said system that is derived from said port base class to allow a fourth element to connect with said third element and to select said fourth element for inclusion in said system to connect with said third element.

81. The configuration apparatus of claim 30 wherein:
said modeling system further includes (i) only one composite base class, (ii) one or more composite derived classes, and (iii) one or more composite component types, and wherein all composite classes and composite component types descend from said composite base class and further includes (iv) only one port base class, (v) one or more port derived classes, and (vi) one or more port component types, and wherein all port classes and port component types descend from said port base class;
said configurator is further configured to select a third element of said model for inclusion in said system that is derived from said composite base class to allow a fourth element to be a child of said third element and to select said fourth element for inclusion in said system to be a child of said third element; and
said configurator is further configured to select a fifth element of said model for inclusion in said system that is derived from said port base class to allow a sixth element to connect with said fifth element and to select said sixth element for inclusion in said system to connect with said fifth element.

82. The method of claim 39 wherein said element model includes (i) only one composite base class, (ii) one or more composite derived classes, and (iii) one or more composite component types, and wherein all composite classes and composite component types descend from said composite base class and creating a plurality of components of said system further comprises:
creating an instance of a third component that is derived from said composite base class to allow an instance of a fourth component to be a child of said third component and creating said instance of said fourth component as a child of said instance of said third component.

83. The method of claim 39 wherein said element model (i) only one port base class, (ii) one or more port derived classes, and (iii) one or more port component types, and wherein all port classes and port component types descend from said port base class and creating a plurality of components of said system further comprises:
creating an instance of a third component that is derived from said port base class to allow an instance of a fourth component to connect with said third component and creating said instance of said fourth component to connect with said instance of said third component.

84. The method of claim 39 wherein said element model includes (i) only one composite base class, (ii) one or more composite derived classes, and (iii) one or more composite component types, and wherein all composite classes and composite component types descend from said composite base class and further (iv) only one port base class, (v) one or more port derived classes, and (vi) one or more port component types, and wherein all port classes and port component types descend from said port base class and creating a plurality of components of said system further comprises:
 creating an instance of a third component that is derived from said composite base class to allow an instance of a fourth component to be a child of said third component and creating said instance of said fourth component as a child of said instance of said third component; and
 creating an instance of a fifth component that is derived from said port base class to allow an instance of a sixth component to connect with said fifth component and creating said instance of said sixth component to connect with said instance of said fifth component.

85. The method of claim 40 wherein said element model includes (i) only one composite base class, (ii) one or more composite derived classes, and (iii) one or more composite component types, and wherein all composite classes and composite component types descend from said composite base class and creating a plurality of components of said system further comprises:
 creating an instance of a third component that is derived from said composite base class to allow an instance of a fourth component to be a child of said instance of said third component and creating said instance of said fourth component as a child of said instance of said third component.

86. The method of claim 40 wherein said element model includes (i) only one port base class, (ii) one or more port derived classes, and (iii) one or more port component types, and wherein all port classes and port component types descend from said port base class and creating a plurality of components of said system further comprises:
 creating an instance of a third component that is derived from said port base class to allow an instance of a fourth component to connect with said instance of said third component and creating said instance of said fourth component connected with said instance of said third component.

87. The method of claim 40 wherein said element model includes (i) only one composite base class, (ii) one or more composite derived classes, and (iii) one or more composite component types, and wherein all composite classes and composite component types descend from said composite base class and further includes (iv) only one port base class, (v) one or more port derived classes, and (vi) one or more port component types, and wherein all port classes and port component types descend from said port base class and creating a plurality of components of said system further comprises:
 creating an instance of a third component that is derived from said composite base class to allow an instance of a fourth component to be a child of said instance of said third component and creating said instance of said fourth component as a child of said instance of said third component; and
 creating an instance of a fifth component that is derived from said port base class to allow an instance of a sixth component to connect with said instance of said fifth component and creating said instance of said sixth component connected with said instance of said fifth component.

88. The article of manufacturing of claim 41 wherein said model includes (i) only one composite base class, (ii) one or more composite derived classes, and (iii) one or more composite component types, and wherein all composite classes and composite component types descend from said composite base class, said article of manufacture further comprising:
 computer readable program code configured to cause a computer to create an instance of a third component in said system configuration in response to said configuration request wherein said instance of said third component is derived from said composite base class to allow an instance of a fourth component to be a child of said third component; and
 computer readable code configured to cause a computer to create an instance of said fourth component that is a child of said third component.

89. The article of manufacturing of claim 41 wherein said model includes (i) only one port base class, (ii) one or more port derived classes, and (iii) one or more port component types, and wherein all port classes and port component types descend from said port base class, said article of manufacture further comprising:
 computer readable program code configured to cause a computer to create an instance of a third component in said system configuration in response to said configuration request wherein said instance of said third component is derived from said port base class to allow an instance of a fourth component to connect with said third component; and
 computer readable code configured to cause a computer to create an instance of said fourth component that connects with said third component.

90. The article of manufacturing of claim 41 wherein said model includes (i) only one composite base class, (ii) one or more composite derived classes, and (iii) one or more composite component types, and wherein all composite classes and composite component types descend from said composite base class and further includes (iv) only one port base class, (v) one or more port derived classes, and (vi) one or more port component types, and wherein all port classes and port component types descend from said port base class, said article of manufacture further comprising:
 computer readable program code configured to cause a computer to create an instance of a third component in said system configuration in response to said configuration request wherein said instance of said third component is derived from said composite base class to allow an instance of a fourth component to be a child of said third component;
 computer readable code configured to cause a computer to create an instance of said fourth component that is a child of said third component;
 computer readable program code configured to cause a computer to create an instance of a fifth component in said system configuration in response to said configuration request wherein said instance of said fifth component is derived from said port base class to allow an instance of a sixth component to connect with said fifth component; and
 computer readable code configured to cause a computer to create an instance of said sixth component that connects with said fifth component.

91. The article of manufacturing of claim 44 wherein said model includes (i) only one composite base class, (ii) one or more composite derived classes, and (iii) one or more composite component types, and wherein all composite classes and composite component types descend from said composite base class, said article of manufacture further comprising:
 computer readable program code configured to cause a computer to create an instance of a third component in said system configuration in response to said configuration request wherein said instance of said third component is derived from said composite base class to allow an instance of a fourth component to be a child of said third component; and computer readable code configured to cause a computer to create an instance of said fourth component that is a child of said third component.

92. The article of manufacturing of claim 44 wherein said model includes (i) only one port base class, (ii) one or more port derived classes, and (iii) one or more port component types, and wherein all port classes and port component types descend from said port base class, said article of manufacture further comprising:

computer readable program code configured to cause a computer to create an instance of a third component in said system configuration in response to said configuration request wherein said instance of said third component is derived from said port base class to allow an instance of a fourth component to be connected with said third component; and computer readable code configured to cause a computer to create an instance of said fourth component that connects with said third component.

93. The article of manufacturing of claim 44 wherein said model includes (i) only one composite base class, (ii) one or more composite derived classes, and (iii) one or more composite component types, and wherein all composite classes and composite component types descend from said composite base class and further includes (iv) only one port base class, (v) one or more port derived classes, and (vi) one or more port component types, and wherein all port classes and port component types descend from said port base class, said article of manufacture further comprising:

computer readable program code configured to cause a computer to create an instance of a third component in said system configuration in response to said configuration request wherein said instance of said third component is derived from said composite base class to allow an instance of a fourth component to be a child of said third component;

computer readable code configured to cause a computer to create an instance of said fourth component that is a child of said third component;

computer readable program code configured to cause a computer to create an instance of a fifth component in said system configuration in response to said configuration request wherein said instance of said fifth component is derived from said port base class to allow an instance of a sixth component to be connected with said fifth component; and computer readable code configured to cause a computer to create an instance of said sixth component that connects with said fifth component.

94. The article of manufacturing of claim 45 wherein said model includes (i) only one composite base class, (ii) one or more composite derived classes, and (iii) one or more composite component types, and wherein all composite classes and composite component types descend from said composite base class, said article of manufacture further comprising:

computer readable program code configured to cause a computer to create an instance of a third component in said system configuration in response to said configuration request wherein said instance of said third component is derived from said composite base class to allow an instance of a fourth component to be a child of said third component; and computer readable code configured to cause a computer to create an instance of said fourth component that is a child of said third component.

95. The article of manufacturing of claim 45 wherein said model includes (i) only one port base class, (ii) one or more port derived classes, and (iii) one or more port component types, and wherein all port classes and port component types descend from said port base class, said article of manufacture further comprising:

computer readable program code configured to cause a computer to create an instance of a third component in said system configuration in response to said configuration request wherein said instance of said third component is derived from said port base class to allow an instance of a fourth component to be connected with said third component; and computer readable code configured to cause a computer to create an instance of said fourth component that connects with said third component.

96. The article of manufacturing of claim 45 wherein said model includes (i) only one composite base class, (ii) one or more composite derived classes, and (iii) one or more composite component types, and wherein all composite classes and composite component types descend from said composite base class and further includes (iv) only one port base class, (v) one or more port derived classes, and (vi) one or more port component types, and wherein all port classes and port component types descend from said port base class, said article of manufacture further comprising:

computer readable program code configured to cause a computer to create an instance of a third component in said system configuration in response to said configuration request wherein said instance of said third component is derived from said composite base class to allow an instance of a fourth component to be a child of said third component;

computer readable code configured to cause a computer to create an instance of said fourth component that is a child of said third component;

computer readable program code configured to cause a computer to create an instance of a fifth component in said system configuration in response to said configuration request wherein said instance of said fifth component is derived from said port base class to allow an instance of a sixth component to be connected with said fifth component; and computer readable code configured to cause a computer to create an instance of said sixth component that connects with said fifth component.

97. The article of manufacturing of claim 49 wherein said model includes (i) only one composite base class, (ii) one or more composite derived classes, and (iii) one or more composite component types, and wherein all composite classes and composite component types descend from said composite base class, said article of manufacture further comprising:

computer readable program code configured to cause a computer to create an instance of a third component in said system configuration in response to said configuration request wherein said instance of said third component is derived from said composite base class to allow an instance of a fourth component to be a child of said third component; and computer readable code configured to cause a computer to create an instance of said fourth component that is a child of said third component.

98. The article of manufacturing of claim 49 wherein said model includes (i) only one port base class, (ii) one or more port derived classes, and (iii) one or more port component types, and wherein all port classes and port component types descend from said port base class, said article of manufacture further comprising:

computer readable program code configured to cause a computer to create an instance of a third component in said system configuration in response to said configuration request wherein said instance of said third component is derived from said port base class to allow an instance of a fourth component to be connected with said third component; and computer readable code configured to cause a computer to create an instance of said fourth component that connects with said third component.

99. The article of manufacturing of claim 49 wherein said model includes (i) only one composite base class, (ii) one or more composite derived classes, and (iii) one or more composite component types, and wherein all composite classes and composite component types descend from said composite base class and further includes (iv) only one port base class, (v) one or more port derived classes, and (vi) one or more port component types, and wherein all port classes and port component types descend from said port base class, said article of manufacture further comprising:

computer readable program code configured to cause a computer to create an instance of a third component in said system configuration in response to said configuration request wherein said instance of said third component is derived from said composite base class to allow an instance of a fourth component to be a child of said third component;

computer readable code configured to cause a computer to create an instance of said fourth component that is a child of said third component;

computer readable program code configured to cause a computer to create an instance of a fifth component in said system configuration in response to said configuration request wherein said instance of said fifth component is derived from said port base class to allow an instance of a sixth component to be connected with said fifth component; and computer readable code configured to cause a computer to create an instance of said sixth component that connects with said fifth component.

* * * * *